United States Patent
Mori et al.

(10) Patent No.: US 7,577,297 B2
(45) Date of Patent: Aug. 18, 2009

(54) PATTERN IDENTIFICATION METHOD, DEVICE THEREOF, AND PROGRAM THEREOF

(75) Inventors: Katsuhiko Mori, Kawasaki (JP); Masakazu Matsugu, Yokohama (JP); Mie Ishii, Machida (JP); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 561 days.

(21) Appl. No.: 10/539,882

(22) PCT Filed: Dec. 16, 2003

(86) PCT No.: PCT/JP03/16095

§ 371 (c)(1),
(2), (4) Date: Mar. 15, 2006

(87) PCT Pub. No.: WO2004/055735

PCT Pub. Date: Jul. 1, 2004

(65) Prior Publication Data

US 2006/0204053 A1    Sep. 14, 2006

(30) Foreign Application Priority Data

Dec. 16, 2002 (JP) ............................. 2002-364369
Dec. 15, 2003 (JP) ............................. 2003-416236

(51) Int. Cl.
*G06K 9/46* (2006.01)

(52) U.S. Cl. ............... 382/190; 382/118; 382/243; 375/E7.084

(58) Field of Classification Search .............. 382/118, 382/243, 285, 233, 173, 190; 324/687, 663; 375/E7.026, E7.084, E7.209, E7.255, E7.261, 375/E5.042; 250/385.1
See application file for complete search history.

(56) References Cited

U.S. PATENT DOCUMENTS 5,570,434 A * 10/1996 Badique ............... 382/279

(Continued)

FOREIGN PATENT DOCUMENTS

EP    0552770    1/1993

(Continued)

OTHER PUBLICATIONS

Rowley, H. et al., "Rotation Invariant Neural Network-Based Face Detection", Proc. of Computer Vision and Pattern Recognition, pp. 38-44, 1998.

(Continued)

*Primary Examiner*—Sheela C Chawan
(74) *Attorney, Agent, or Firm*—Fitzpatrick, Cella, Harper & Scinto

(57) ABSTRACT

In a pattern identification device performing pattern identification of data which has been input by hierarchically extracting features, a primary feature is extracted and distribution of at least one feature extraction result extracted is analyzed, a secondary feature is extracted according to this analysis result. Thus, it is possible to perform pattern identification robustly against fluctuations of the input pattern at a reduced processing cost while reducing the probability of occurrence of incorrect identification.

30 Claims, 41 Drawing Sheets

U.S. PATENT DOCUMENTS

| | | |
|---|---|---|
| 6,611,613 B1 | 8/2003 | Kang et al. |
| 7,039,233 B2 * | 5/2006 | Mori et al. .................. 382/181 |
| 7,054,850 B2 | 5/2006 | Matsugu ...................... 706/48 |
| 2002/0181775 A1 | 12/2002 | Matsugu ...................... 382/195 |
| 2006/0074653 A1 | 4/2006 | Mitari et al. ................. 704/240 |
| 2006/0115157 A1 | 6/2006 | Mori et al. .................. 382/190 |
| 2006/0228005 A1 | 10/2006 | Matsugu et al. ............. 382/116 |

FOREIGN PATENT DOCUMENTS

| | | |
|---|---|---|
| EP | 0784285 | 7/1997 |
| EP | 1262908 | 12/2002 |
| JP | 7-11819 | 2/1995 |
| JP | 7-220090 | 8/1995 |
| JP | 8-147469 | 6/1996 |
| JP | 2-573126 | 10/1996 |
| JP | 9-44676 | 2/1997 |
| JP | 9-251534 | 9/1997 |
| JP | 10-11543 | 1/1998 |
| JP | 2-767814 | 4/1998 |
| JP | 11-15973 | 1/1999 |
| JP | 2-973676 | 9/1999 |
| JP | 11-250267 | 9/1999 |
| JP | 11-283036 | 10/1999 |
| JP | 2001-175869 | 6/2001 |
| JP | 2001-202516 | 7/2001 |
| JP | 2002-358500 | 12/2002 |

OTHER PUBLICATIONS

LeCun et al., "Convolutional Networks for Images Speech, and Time Series" in Handbook of Brain Theory and Neural Networks (M. Arbib, Ed.), MIT Press, pp. 255-258.

Office Action, dated Jun. 13, 2008, in JP 2003-416236.

Office Action, dated Sep. 30, 2008, in JP 2002-364369.

\* cited by examiner a　　b　　c　　d

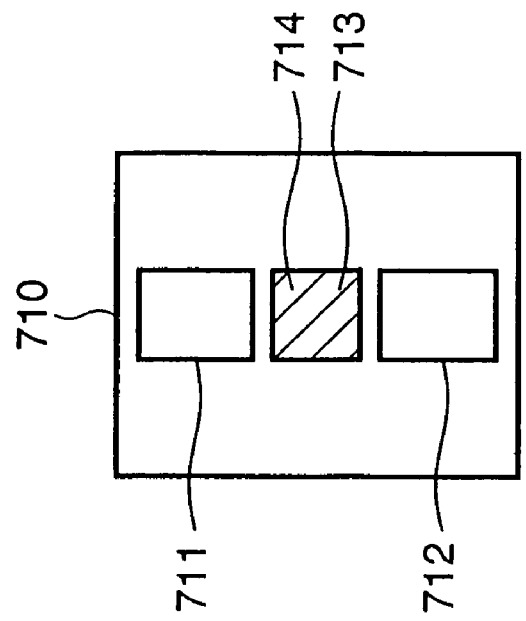
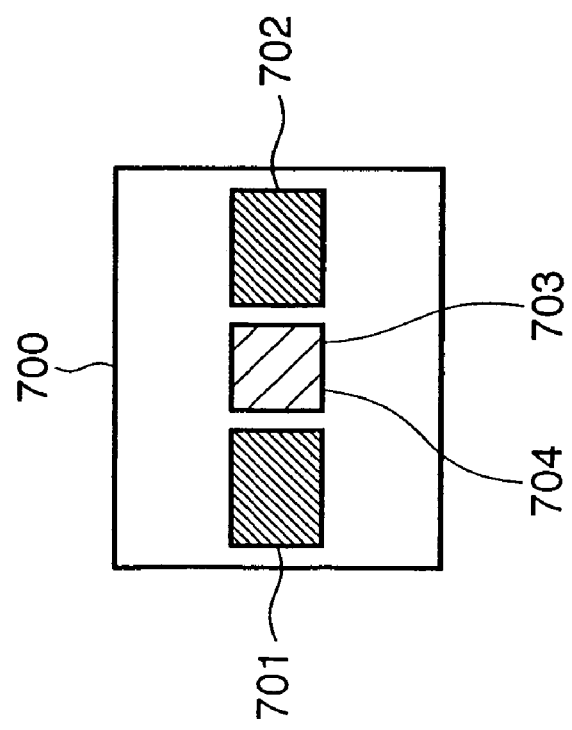

PATTERN IDENTIFICATION METHOD, DEVICE THEREOF, AND PROGRAM THEREOF

TECHNICAL FIELD

The present invention relates to a method of recognizing the pattern of an input signal, a device thereof, and a program thereof.

BACKGROUND ART

Conventionally, in the fields of image recognition and speech recognition, a technique for detecting an object to be recognized from an image including this object and a background by implementing a recognition processing algorithm specialized to a specific object to be recognized by computer software or hardware using a dedicated parallel image processing processor is known.

Especially, as a technique for detecting a face as the specific object to be recognized, Japanese Patent Laid-Open No. 9-251534 discloses a technique that searches an input image for a face region using a template called a standard face, and then applies partial templates to feature point candidates such as eyes, nostrils, mouth, and the like to authenticate a person. Japanese Patent No. 2767814 discloses a technique which obtains eye and mouth candidate groups from a face image, and collates face candidate groups formed by combining these groups with a pre-stored face structure to find regions corresponding to the eyes and mouth. Furthermore, Japanese Patent Laid-Open No. 9-44676 discloses a technique that obtains a plurality of eye, nose, and mouth candidates, and detects a face on the basis of the positional relationship among feature points, which are prepared in advance.

Also, Japanese Patent No. 2973676 discloses a technique that changes shape data upon checking matching levels between shape data of respective parts of a face and an input image, and determines search regions of respective face parts based on the previously obtained positional relationship of parts. Japanese Patent Laid-Open No. 11-283036 discloses a technique that recognizes a face by moving a region model set with a plurality of judgment element acquisition regions in an input image to judge the presence/absence of each judgment element within each of these judgment element acquisition regions.

As techniques for detecting a rotated object, those which are disclosed in Japanese Patent Laid-Open No. 11-15973 and "Rotation Invariant Neural Network-Based Face Detection" (H. Rowley, T. Kanade, CVPR98, p 38-44) are known. The former technique applies polar conversion to an object from its central coordinate position to cope with rotation of the object, so as to transform rotation into shift, thereby detecting rotation. The latter technique prepares a neural network (to be abbreviated as "NN" hereinafter) that detects the rotation angle of a face as a pre-stage of face detection, rotates an input image in accordance with the output angle of that NN, and inputs the rotated input image to the NN that implements face detection.

However, pattern detection using the aforementioned prior arts suffers the following problems.

That is, the technique described in Japanese Patent Laid-Open No. 9-251534 is vulnerable to a plurality of face sizes and a change in face direction, since the standard face is initially used to match the entire face to detect the face region. In order to support various sizes and face directions, a plurality of standard faces suited to respective cases must be prepared to perform detection using them. However, in order to implement such process, comparison processes with a large number of templates are required, resulting in high processing cost.

The technique described in Japanese Patent No. 2767814 collates face candidate groups in the input image with pre-stored face structure, but the number of faces in the input image is limited to one or a few. Also, the face size is large to some extent, and an image in which a most region in the input image corresponds to a face, and which has a small background region is assumed as the input image. With such input image, even when face candidates are generated from all eye and mouth candidate groups, the number of face candidates is limited. However, in case of an image photographed by a normal camera or video, the face size becomes small and the background area becomes large in some cases. In such cases, a large number of eye and mouth candidates are erroneously detected from the background. Therefore, when face candidates are generated from all the eye and mouth candidate groups by the method described in Japanese Patent No. 2767814, the number of face candidates becomes huge, thus increasing the processing cost required for collation with the face structure.

Also, with the inventions described in Japanese Patent Laid-Open No. 9-44676 and Japanese Patent No. 2973676, when the background includes a large number of eye, nose, and mouth candidates, the processing cost required to collate their positional relationship becomes huge.

Furthermore, the technique described in Japanese Patent No. 2973676 holds shape data of an iris, mouth, nose, and the like. Upon obtaining two irises first, and then a mouth, nose, and the like, search regions of face parts such as a mouth, nose, and the like are limited on the basis of the positions of the irises (eyes). That is, this algorithm finds the irises (eyes) first in place of parallelly detecting face parts such as irises (eyes), a mouth, nose, and the like that form a face, and detects face parts such as a mouth and nose using the detection result of the irises. This method assumes a case wherein an image includes only one face, and the irises (eyes) are accurately obtained. If the irises (eyes) are erroneously detected, search regions of other features such as a mouth, nose, and the like cannot be normally set.

With the invention described in Japanese Patent Laid-Open No. 11-283036, in order to cope with faces with different sizes or rotated faces, region models with different sizes and rotated region models must be prepared. However, if a face with a given size or a given rotation angle is not present in practice, many wasteful calculations are made. Furthermore, in the polar coordinate transformation in the technique described in Japanese Patent Laid-Open No. 11-15973, the precision of the central coordinate position is important. However, it is difficult to detect the central coordinate position in a process of detecting the location of an object in an image.

Moreover, in the invention described in "Rotation Invariant Neural Network-Based Face Detection", the precision of the face detection NN of the latter half depends on that of the NN of the former stage which detects the rotation angle. If the output from the NN of the former stage is wrong, face detection becomes difficult to attain. When an image includes a plurality of objects, which have different rotation angles, the input image undergoes rotation transformation using a plurality of rotation angles, and the transformed images are input to the face detection NN to perform face detection of the entire images. Hence, compared to detection of an image free from rotation, the processing cost increases considerably.

Also, a technique for identifying the pattern of an input signal by hierarchically extracting features is known. With this method, upon extracting a feature of high order, feature extraction is made using features, which form the feature to be extracted and have lower orders than that feature, thus allowing identification robust against variations of patterns to be identified. However, in order to improve the robustness against pattern variations, the number of types of features to be extracted must be increased, resulting in an increase in processing cost. However, when the number of types of features to be extracted is not increased, identification errors are more likely to occur.

To solve the aforementioned problems, Japanese Patent Publication No. 7-11819 discloses the following pattern recognition method. That is, a dictionary pattern is prepared by arranging feature vectors of patterns of respective classes in descending order of variance of a vector component, feature vectors are generated from an input pattern, feature vectors up to upper N dimensions undergo matching with the dictionary pattern, and matching with lower dimensions is conducted based on the former matching result, thus reducing the processing cost.

Japanese Patent Laid-Open No. 10-11543 discloses a pattern recognition dictionary generation device and pattern recognition apparatus, which extract feature vectors from input data, classify into clusters based on coincidence levels with standard vectors of respective clusters, and classify into categories based on coincidence levels between category standard vectors and feature vectors in clusters to which input patterns are classified, thus reducing the processing cost of matching.

DISCLOSURE OF INVENTION

The present invention has been made in consideration of the above situation, and has as its object to allow identification robust against variations of input patterns and to implement pattern recognition with lower processing cost while reducing the possibility of identification errors.

According to one aspect of the present invention, a pattern identification method for hierarchically extracting features of input data, and identifying a pattern of the input data, comprises a first feature extraction step of extracting features of a first layer, a determination step of determining a method of extracting features of a second layer higher than the first layer on the basis of feature extraction results in the first feature extraction step, and a second feature extraction step of extracting features of the second layer on the basis of the method determined in the determination step.

According to another aspect of the present invention, a pattern identification device for hierarchically extracting features of input data, and identifying a pattern of the input data, comprises first feature extraction means for extracting features of a first layer, determination means for determining a method of extracting features of a second layer higher than the first layer on the basis of feature extraction results in the first feature extraction step, and second feature extraction means for extracting features of the second layer on the basis of the method determined by the determination means.

According to still another aspect of the present invention, a pattern identification program, which makes a computer hierarchically extract features of input data, and identify a pattern of the input data, comprises a first feature extraction step of extracting features of a first layer, a determination step of determining a method of extracting features of a second layer higher than the first layer on the basis of feature extraction results in the first feature extraction step, and a second feature extraction step of extracting features of the second layer on the basis of the method determined in the determination step.

Other features and advantages of the present invention will become apparent from the following description taken in conjunction with the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 19A and 19B show examples of eye detection models used to detect eye features in a tertiary feature detection section 1303;

BEST MODE FOR CARRYING OUT THE INVENTION

Embodiments of the present invention will be described hereinafter with reference to the accompanying drawings.

First Embodiment

As the first embodiment of the present invention, a method which uses two-dimensional image data as input data and identifies whether or not that image data belongs to a specific category will be described.

Figure 4:
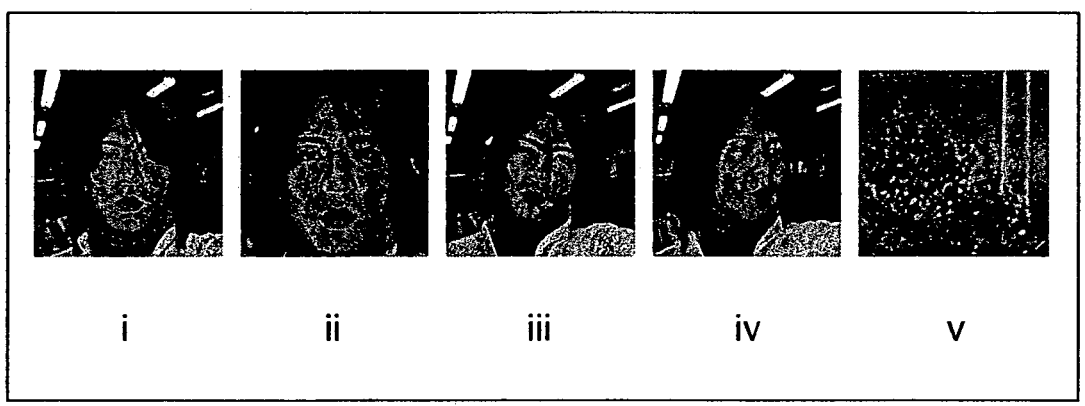
FIG. 4 shows face-present images as identification categories in the first embodiment.

This embodiment assumes, as identification categories, face-present images, in each of which the vicinity of the center of a face is present at nearly the center of an input image, like images i to iv in FIG. 4, and a face-absent image as an image other than the face-present images like an image v in FIG. 4, and a method of identifying to which of the two categories input image data belongs will be described.

This embodiment makes identification as to whether or not an image includes a face. However, the present invention is not limited to this, and may be applied to a case wherein input data is audio data. This embodiment also makes identification as to whether or not input image data belongs to a single category, i.e., a face. However, the present invention can be applied to a case wherein identification is to be done for a plurality of categories in place of such single category.

Figure 1A:
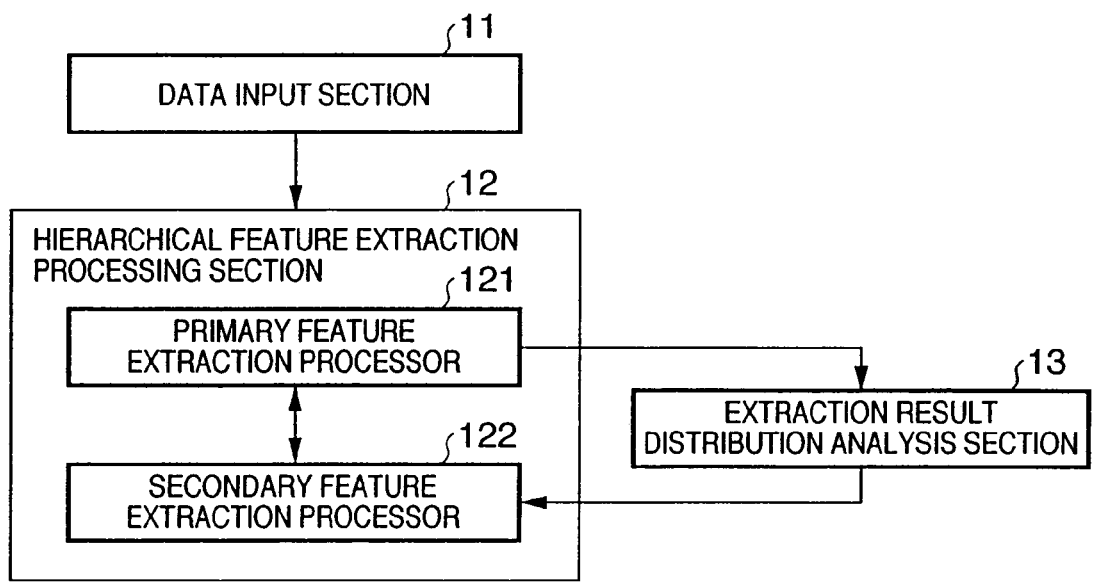
FIGS. 1A and 1B are block diagrams showing the basic arrangements of a pattern identification device according to the first embodiment.

FIG. 1A shows the basic arrangement of a pattern identification device. An overview of this pattern identification device will be explained below using FIG. 1A.

A data input section 11 in FIG. 1A inputs input data which is to undergo pattern identification. A hierarchical feature extraction processing section 12 is a processing section that makes pattern identification of input data by hierarchically extracting features from input data. The hierarchical feature extraction processing section 12 comprises a primary feature extraction processor 121 that executes a primary feature extraction process, and a secondary feature extraction processor 122 that executes a secondary feature extraction process. An extraction result distribution analysis section 13 analyzes the distribution of feature extraction results extracted by the primary feature extraction processor 121.

In this pattern identification device, the data input section 11 inputs data which is to undergo an identification process. The hierarchical feature extraction processing section 12 applies a hierarchical feature extraction process to the input data. In this hierarchical extraction process, the primary feature extraction processor 121 hierarchically extracts a plurality of primary features from input data. The extraction result distribution analysis section 13 analyzes the distribution of at least one type of primary features extracted by the primary feature extraction processor 121, and the secondary feature extraction processor 122 executes secondary feature extraction based on the analysis result.

Figure 1B:
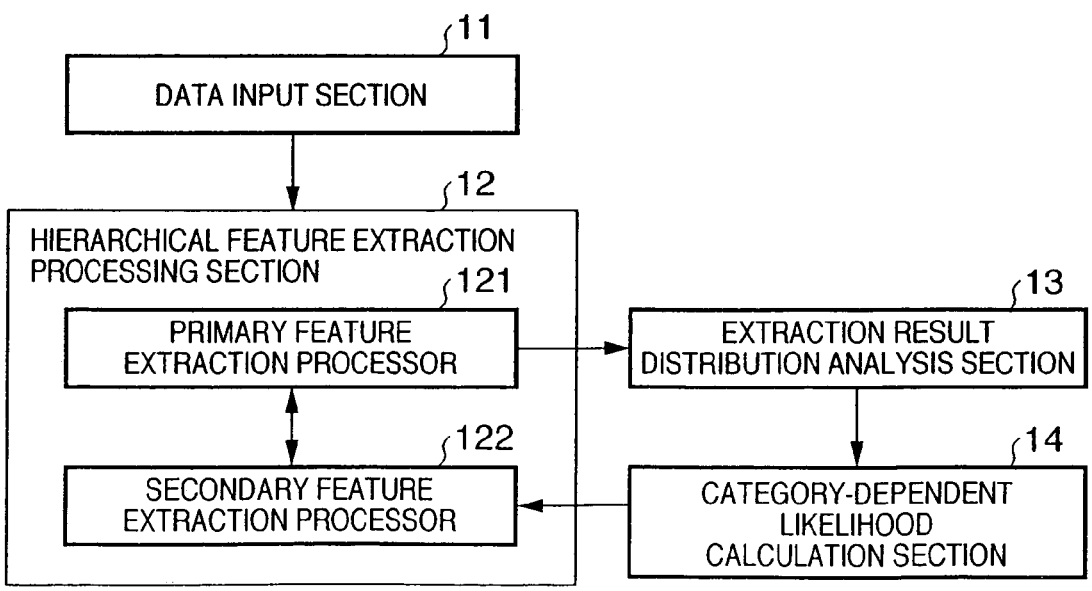

FIG. 1B shows another basic arrangement of a pattern identification device. An overview of this pattern identification device will be described below using FIG. 1B.

Referring to FIG. 1B, a data input section 11 inputs input data which is to undergo pattern identification. A hierarchical feature extraction processing section 12 is a processing section that makes pattern identification of input data by hierarchically extracting features from input data. The hierarchical feature extraction processing section 12 comprises a primary feature extraction processor 121 that executes a primary feature extraction process, and a secondary feature extraction processor 122 that executes a secondary feature extraction process. An extraction result distribution analysis section 13 analyzes the distribution of feature extraction results extracted by the primary feature extraction processor 121. A category-dependent likelihood calculation section 14 is a processing section that calculates likelihood values of respective categories of secondary features on the basis of the analysis result analyzed by the extraction result distribution analysis section 13.

In this pattern identification device, the data input section 11 inputs data which is to undergo an identification process. The hierarchical feature extraction processing section 12 applies a hierarchical feature extraction process to the input data. In this hierarchical extraction process, the primary feature extraction processor 121 hierarchically extracts a plurality of primary features from input data. The extraction result distribution analysis section 13 analyzes the distribution of at least one type of primary features extracted by the primary feature extraction processor 121. The category-dependent likelihood calculation section calculates likelihood values of respective categories of secondary features to be extracted by the secondary feature extraction processor 122 on the basis of the analysis result of the extraction result distribution analysis section 13, and the secondary feature extraction processor 122 extracts secondary features which belong to categories which have calculated likelihood values equal to or larger than a predetermined value.

Figure 2:
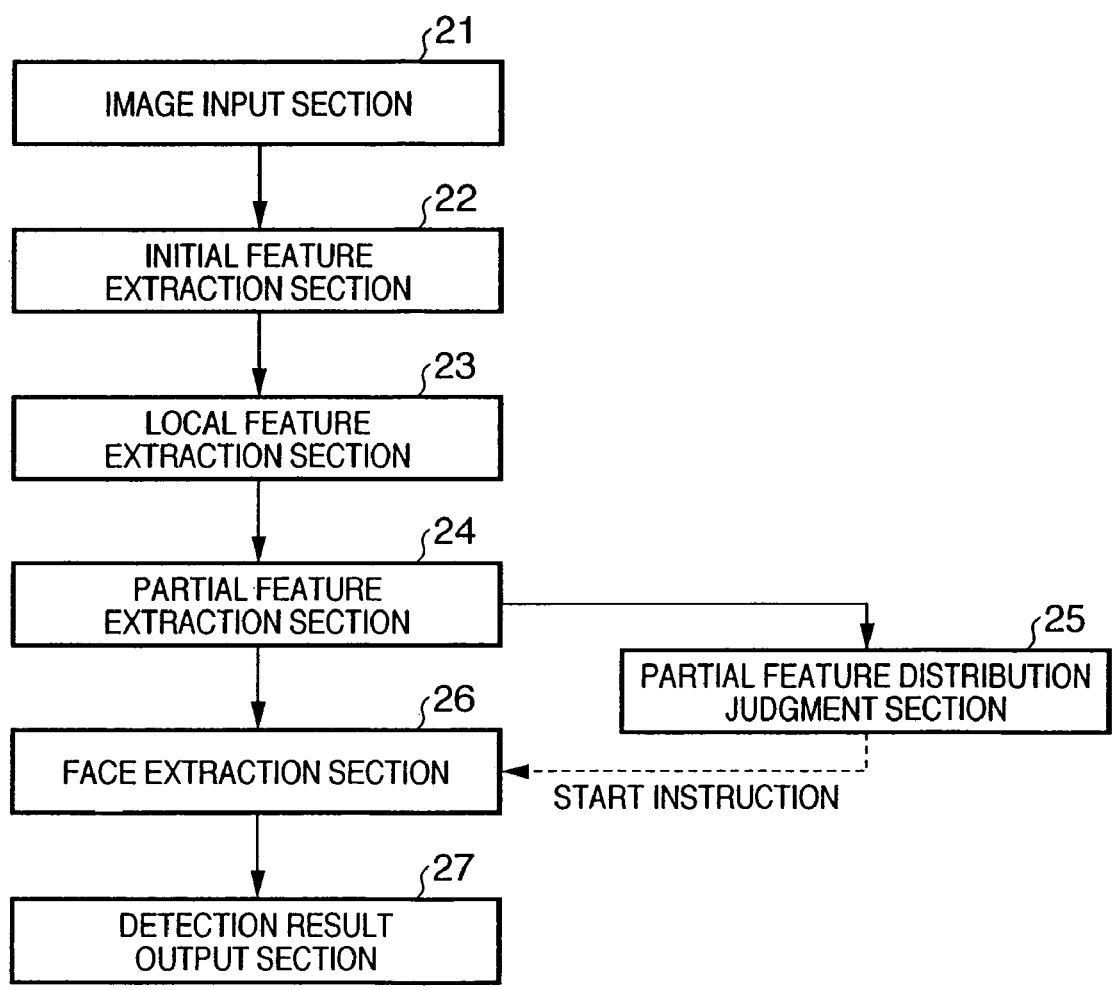
FIG. 2 is a block diagram showing the functional arrangement of a pattern identification device in the first embodiment.
Figure 3:
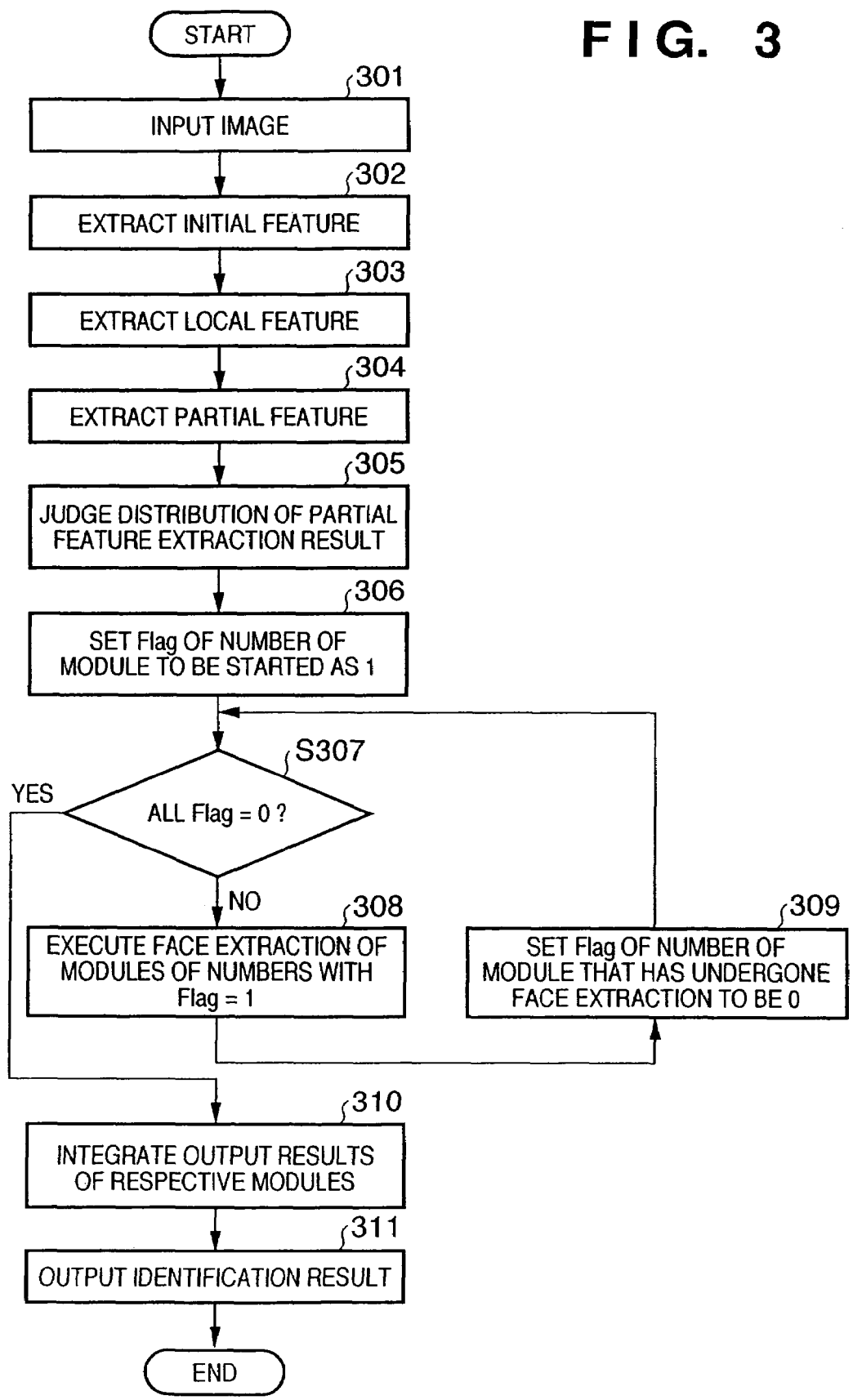
FIG. 3 is a flowchart showing the flow of processes in the first embodiment.

FIG. 2 shows the functional arrangement of a pattern identification device in this embodiment. FIG. 3 shows the flow of processes in this embodiment. The processes in this embodiment will be described below using FIGS. 2 and 3. The solid arrows in FIG. 2 indicate the flow of actual signal data, and the broken arrow indicates the flow of an instruction signal such as an operation instruction or the like in place of actual signal data. The same applies to FIGS. 8 and 10 to be described later.

In step S301, an image input section 21 inputs image data to be identified. As image data to be input, this embodiment uses a grayscale image, but an RGB color image or the like may be used instead.

In step S302, an initial feature extraction section 22 extracts at least one initial feature such as an edge or the like in a specific direction in the input image. In step S303, a local feature extraction section 23 extracts local features such as edge line segments having specific lengths, end points of the edge line segments, and the like using the initial feature extracted by the initial feature extraction section 22. In step S304, a partial feature extraction section 24 extracts partial features such as eyes, a mouth, and the like using the local features extracted by the local feature extraction section 23.

In step S305, a partial feature distribution judgment section 25 analyzes the distribution of the partial features extracted by the partial feature extraction section 24 in the image. In step S306, the partial feature distribution judgment section 25 issues a start instruction to a face extraction section 26 in accordance with the analysis result, and turns on a flag of a face extraction module to be started.

The face extraction section 26 is a processing section that extracts a face using the partial features extracted by the partial feature extraction section 24. The face extraction section 26 includes a plurality of modules each of which makes face extraction corresponding to a specific size or direction, and only a module which receives the start instruction extracts a face. In steps S307 to S309, a face extraction process by the face extraction module whose flag=ON is executed, and the flag of the face extraction module that has executed face extraction is turned off. After the flags of all face extraction modules are OFF, the face extraction processes end.

In steps S310 and S311, a detection result output section 27 integrates the face extraction results of the face extraction modules, judges if an input image is a face-present image or face-absent image, and outputs that result.

The processes in the initial feature extraction section 22 and the subsequent processing sections for image data input by the image input section 21 will be described in detail below.

Initial features to be extracted by the initial feature extraction section 22 from the input image are preferably those which become elements of features extracted by the local feature extraction section 23 as an upper layer. In this embodiment, filtering processes are done at respective positions of the input image using derivative filters in the vertical direction, horizontal direction, upward-sloping direction, and downward-sloping direction, thus extracting four types of features such as a vertical edge, horizontal edge, oblique edge, and the like. In this embodiment, the aforementioned filtering processes are done. Alternatively, features may be extracted using template images or the like which are prepared in advance and indicate initial features, and by making template matching at respective positions of the input image.

Figure 5:
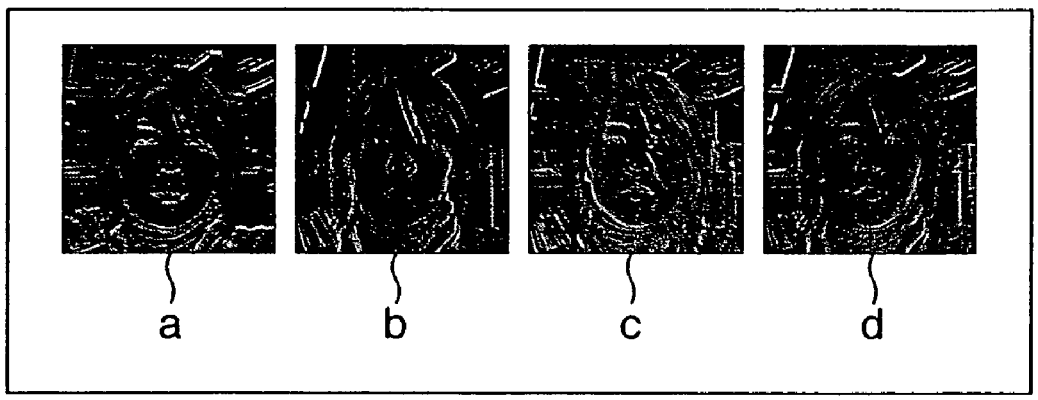
FIG. 5 shows four different initial feature extraction results.

The features extracted by this process are held as information such as the types of features, positions in the image, and likelihood values or feature detection levels. In this embodiment, features shown in a to d in FIG. 5 are extracted from the input image in this stage. In FIG. 5, a indicates the extraction result of vertical edges, and b, c, and d respectively indicate those of horizontal, right oblique, and left oblique edges.

In FIG. 5, positions where the results of filtering at respective positions of the image are zero are expressed by gray, positions where the filtering results assume positive values are expressed by high-luminance values, and positions where the filtering results assume negative values are expressed by low-luminance values. That is, in the image in FIG. 5, positions with high luminance values are positions where edges in the direction corresponding to each filter type are extracted. Conversely, positions with low luminance values are positions where edges in a direction opposite to that corresponding to each filter type are present. Gray portions as a middle value of luminance indicate positions where no edges are extracted.

In this case, since derivative filters are used to extract features, the absolute value of each filtering result value indicates the steepness of an edge. That is, in the input image, a position where a change in luminance value in a direction corresponding to the filter type is larger is indicated by a higher or lower luminance value.

Local features to be extracted by the local feature extraction section 23 using the initial feature extraction results extracted by the initial feature extraction section 22 are preferably those which become elements of features to be extracted by the partial feature extraction section 24 as an upper layer.

Figure 6:
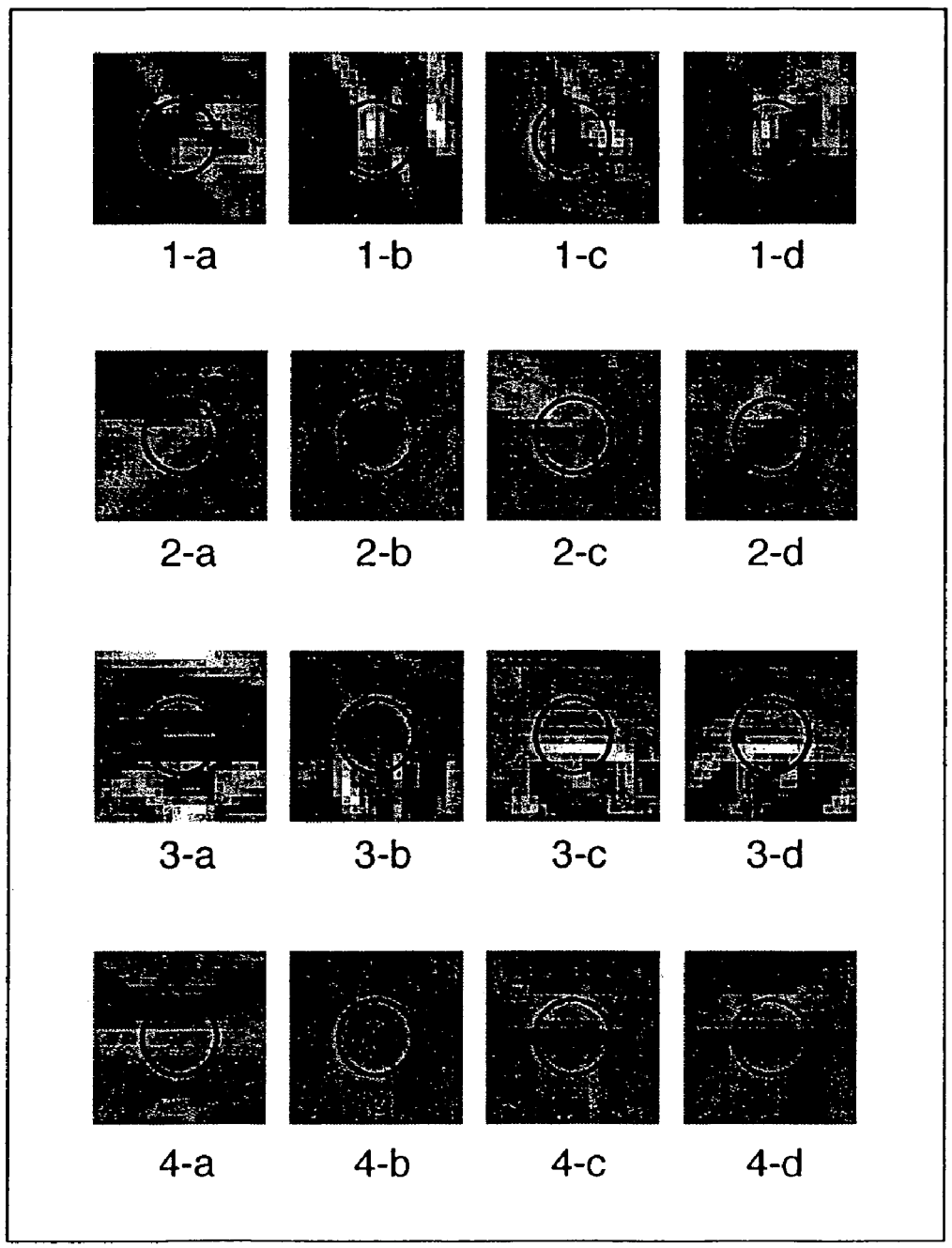
FIG. 6 shows respective initial feature extraction results at positions where respective local features to be extracted are present.

In this embodiment, since the partial feature extraction section 24 extracts eyes and a mouth, the local feature extraction section 23 extracts two types of features, i.e., the left and right end points as end points of edge line segments corresponding to the outer and inner canthi of an eye, two ends of a mouth, and the like, and edge line segments having two types of specific lengths as features corresponding to an upper portion of an eye and an upper portion of a lip, and features corresponding to a lower portion of an eye and a lower portion of a lip, like portions bounded by circles in (1-a) to (1-d) in FIG. 6.

In FIG. 6, (1-a) to (1-d) are initial feature extraction results at a position where the left end point (the inner canthus of the left eye in FIG. 6) is present: (1-a) indicates the extraction result of a vertical edge; (1-b), that of a horizontal edge; (1-c), that of a right oblique edge; and (1-d), that of a left oblique edge. In addition, (2-a) to (2-d) indicate the extraction results of initial features (vertical, horizontal, right oblique, and left oblique edges in turn) at a position where the right end point (the end point of a mouth in FIG. 6) is present, (3-a) to (3-d) indicate the extraction results of initial features (vertical, horizontal, right oblique, and left oblique edges in turn) at a position where the upper portion of an eye or lip (the upper portion of the right eye in FIG. 6) is present, and (4-a) to (4-d) indicate the extraction results of initial features (vertical, horizontal, right oblique, and left oblique edges in turn) at a position where the lower portion of an eye or lip (the lower portion of a lip in FIG. 6) is present.

In this embodiment, as the extraction method of respective features, two-dimensional (2D) masks unique to respective features extracted by the initial feature extraction section 22 are prepared in advance, and filtering processes (convolution operations) are made using the 2D masks unique to features to be extracted, which are prepared in advance, at positions of feature extraction results shown in a to d in FIG. 5. By integrating the filtering results of the initial feature extraction results, respective features are extracted.

The unique 2D masks prepared in advance correspond to the distributions of the initial feature extraction results, i.e., (1-a) to (1-d) at a position where the feature to be extracted (e.g., the left end point) is present. In other words, 2D masks are set so that each mask outputs a high filtered value when the distribution of the initial feature extraction results is unique to the neighborhood of the position where the feature to be extracted is present.

As a method of setting the 2D masks, a plurality of test patterns are simply given, and when the given test pattern matches the feature to be extracted, the values of respective elements of the 2D mask are adjusted to output a high filtered value; otherwise, they are adjusted to output a low filtered value. As another method, the values of elements of each 2D mask may be set using knowledge obtained in advance.

The features extracted by the aforementioned process are held as information such as the types of features, positions in the image, and likelihood values or feature detection levels as in the initial feature extraction section 22. In this embodiment, the position of the extracted feature and a result obtained by integrating the filtering results of respective initial features using each of 2D masks unique to respective features are recorded and held as a likelihood value of that feature for each of four types of features, i.e., the two types of end points and edge line segments having two types of specific lengths.

The process in the partial feature extraction section 24 is the same as that in the local feature extraction section 23, and extracts partial features from a plurality of local feature extraction results extracted by the local feature extraction section 23 as feature extraction results of a lower layer. Partial features to be extracted are preferably those which become elements of a feature to be extracted by the face extraction section 26 as an upper layer, i.e., elements of a face in this embodiment.

In this embodiment, as described above, the partial feature extraction section 24 extracts eyes, a mouth, and the like. The extraction process adopts the same extraction method as that in the local feature extraction section 23, and features can be extracted by filtering using specific 2D masks. Or eyes and a mouth may be extracted by simply checking if features with likelihood values equal to or larger than a predetermined value of the feature extraction results of the local feature extraction section 23 have a specific spatial layout relationship.

The eyes and mouth extracted in this way are also held as information such as the types of extracted features, positions in the image, and likelihood values or feature amounts. In this embodiment, a result obtained by integrating the filtering results of the local feature extraction results using the unique 2D masks at respective positions in the image is held as a likelihood value at each partial feature position for each of the eyes and mouth.

The partial feature distribution judgment section 25 makes simple analysis of the distribution for the feature extraction results extracted by the partial feature extraction section 24, and supplies a start instruction to a predetermined face extraction module (or modules) of the face extraction section 26 on the basis of the analysis result.

The analysis to be made by this section extracts a necessary condition for each predetermined face extraction module to which the start instruction is input unlike the processes executed from the initial feature extraction section 22 to the partial feature extraction section 24. For example, this embodiment analyzes as to whether or not the eye is extracted by the process of the partial feature extraction section 24 near a predetermined coordinate position of the input image, whether or not the barycentric position of the mouth extraction result by the process of the partial feature extraction section 24 is located near a predetermined coordinate position, whether or not the sum total of the likelihood values of the eye as the processing result of the partial feature extraction section 24 is equal to or larger than a predetermined value, and so on.

The aforementioned analysis processes can be made by setting in advance conditions and the like corresponding to modules, which form the face extraction section 26 and make face extraction processes corresponding to a plurality of variations. Note that variations indicate changes in feature obtained by, e.g., affine transformations such as rotation transformation, size transformation, and the like, transformations corresponding to faces that turn away, and so forth. For example, for a face extraction module corresponding to a clockwise in-plane rotational variation, a condition that the barycentric position of the mouth extraction result is located at a lower left position offset from the image center, and the barycentric position of the eye extraction result is located at the upper right position of that of the mouth extraction result is set as one of necessary conditions of such face extraction module.

Some such analysis processes are made, and a start instruction is issued to the predetermined face extraction module or modules which satisfies or satisfy the conditions of the analysis processes. The barycentric position, the sum total of likelihood values, and the like may be analyzed within a predetermined range (e.g., at a position where the eye is expected to be present). Also, the sum totals of likelihood values of two or more features may be compared. Since a module that performs feature extraction is selected by simple analysis processes of the necessary conditions, the processing cost can be reduced, and identification errors can also be eliminated.

In the face extraction section 26, only predetermined face extraction modules which received the start instruction from the partial feature distribution judgement section 25 execute the same feature extraction process as in the partial feature extraction section 24 and the like using the eye and mouth extraction results extracted by the partial feature extraction section 24. As modules corresponding to specific variations, those which are specialized to a variation due to a size (ii in FIG. 4), a variation due to in-plane rotation (iii in FIG. 4), a variation due to a horizontal turn of a face (iv in FIG. 4), a variation due to a vertical turn of a face, and the like are prepared.

In this embodiment, specific 2D masks are prepared for respective modules corresponding to the aforementioned variations, and only a module that received the start instruction executes a filtering process using the specific 2D mask. Each 2D mask is set in the same manner as the local feature extraction section 23 by giving a face with a specific variation corresponding to a module as a test pattern.

In this face detection, since a face is extracted as a target to have the image center as the center, filtering need not be done at respective positions of the image unlike the feature extraction processes up to the partial feature extraction unit 24, but filtering need only be done within the range for extracting a face in a frame.

The detection result output section 27 finally sorts the input image into a category on the basis of filtering results of the modules which execute face extraction processes in response to the start instruction and correspond to variations. In this case, it is simply judged if the output value of each started face extraction module exceeds a threshold value set for each module. If the output value of at least one module exceeds the threshold value, it is judged that the input image is a face-present image; otherwise, it is judged that the input image is a face-absent image.

The judgment process in this section is not limited to this method. For example, final judgment may be made by integrating the output values of the started modules. More specifically, modules corresponding to directly-opposed variations suppress each other's outputs (for example, the output value of the module corresponding to a clockwise in-plane rotational variation is subtracted from the product of a predetermined weight and the output value of a module corresponding to a counterclockwise in-plane rotational variation as a counter category in terms of variations, and subtracting it), thus reducing identification errors.

On the other hand, modules corresponding to akin variations promote each other's output (e.g., the output value a module corresponding to a face of a specific size is added to the product of a predetermined weight and the output value of a module corresponding to a face with a size slightly larger than the specific size as a similar category in terms of variations), thus setting a higher threshold value for identification, and consequently reducing identification errors.

A value obtained by calculating the weighted sum or simple arithmetic mean of the output values of the two or more modules corresponding to similar categories is newly set as an output value of a virtual feature extraction module corresponding to an intermediate variation among categories, thus allowing high-precision identification free from any identification errors with lower processing cost.

As described above, according to the first embodiment, in the method that uses two-dimensional image data as input data and identifies if that image data belongs to a specific category, a method that assumes a face-present image in which the center of a face is present near the center of an input image, and a face-absent image as other images as identification categories, and identifies to which of the two categories input image data belongs has been exemplified.

Second Embodiment

The second embodiment will explain a method of detecting the location of a face in an image using two-dimensional image data as input data as a modification of the first embodiment. In this embodiment, a process for detecting a face in an image is made. However, the present invention is not limited to this, and may be applied to other image patterns, and a case wherein input data is audio data. Also, the present invention can be applied to a case wherein a plurality of categories are to be detected.

Figure 7:
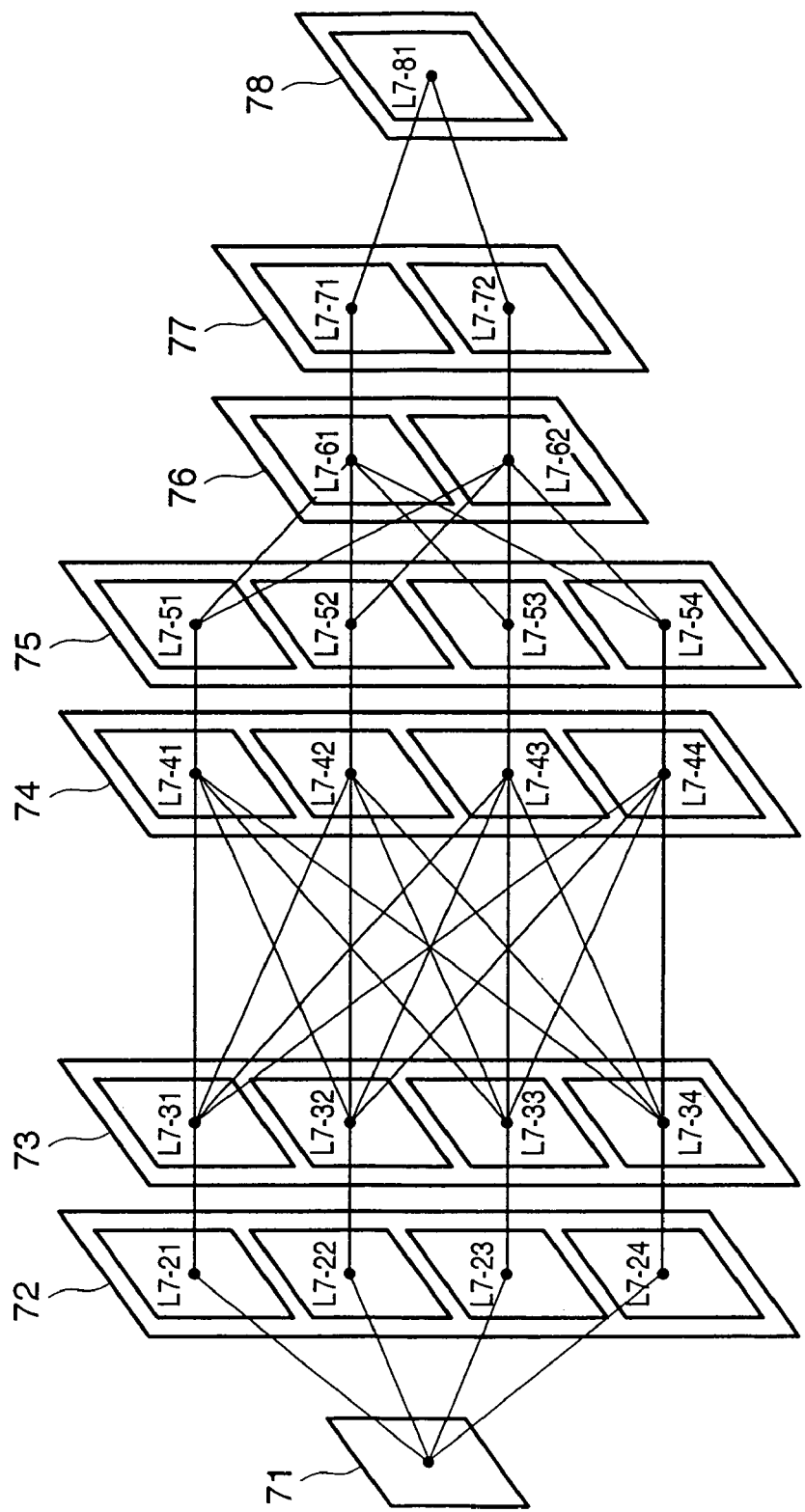
FIG. 7 shows the configuration of a basic Convolutional Neural Network.

This embodiment uses, as a method of detecting a specific pattern robustly against variations by hierarchical feature extraction, a Convolutional Neural network (to be abbreviated as CNN hereinafter) by changing its basic configuration. FIG. 7 shows the basic configuration of the CNN. A basic process of the CNN will be described below using FIG. 7. In FIG. 7, process flow advances rightward to have the left end as an input.

In FIG. 7, reference numeral 71 denotes a pixel value distribution corresponding to, e.g., luminance values or the like of an input image. Also, in FIG. 7, reference numerals 72, 74, 76, and 78 denote feature detection layers; and L7-21, L7-22, L7-23, L7-24, L7-41, L7-42, L7-43, L7-44, L7-61, L7-62, and L7-81 in these layers, feature detection cell planes. On the other hand, reference numerals 73, 75, and 77 denote feature integration layers; and L7-31, L7-32, L7-33, L7-34, L7-51, L7-52, L7-53, L7-54, L7-71, and L7-72 in these layers, feature integration cell planes.

In the CNN, two layers, i.e., the feature detection layer and feature integration layer form one set, and such sets hierarchically form the CNN. The feature detection cell planes in the feature detection layer have feature detection neurons for respectively detecting specific features. The feature detection neurons are coupled to the feature detection results of the previous layer (i.e., feature detection neurons in the feature detection layer 74 are coupled to feature detection results from L7-31 to L7-34, and feature detection neurons in the feature detection layer 72 are coupled to 71 as an input image) within a local range according to their positions to have a weight distribution unique to each feature detection cell plane.

This weight corresponds to a derivative filter used to extract an edge or a 2D mask used to extract a specific feature, which have been described in the first embodiment, and may be set by exploiting advance knowledge or may be learned by giving a plurality of test patterns. In addition, the weight may be set using known Neural Network learning methods such as learning based on error back propagation, self-organizing learning based on Hebb's rule, and the like.

The respective feature detection neurons apply weighted addition to the feature extraction results of feature cell planes as coupling destinations or the luminance values of an input image in case of the feature detection layer 72 using a predetermined weight, and transform the calculation result values using a nonlinear function such as a hyperbolic tangential function or the like to obtain their output values, thus detecting features.

For example, if L7-21 is a cell plane that detects a vertical edge, respective feature detection neurons in L7-21 apply weighted addition corresponding to a derivative filter to the luminance values of the input image, and the calculation result values of the feature detection neurons in L7-21 increase and exhibit high output values at a position where a vertical edge is present in the input image, i.e., a feature is detected.

The same applies to other feature detection cell planes, i.e., feature detection neurons exhibit high output values at positions where specific features of respective feature detection cell planes are detected. The output value is normally calculated by the nonlinear transformation, but the calculation method is not particularly limited.

Each feature integration cell plane in the feature integration layer is coupled to one feature detection cell plane of the feature detection layer as a previous layer, and has feature integration neurons which are coupled to the feature detection results of the previous stage within a local range and execute a process for diffusing (integrating) feature detection results. The feature integration neurons make basically the same operations as those of the aforementioned feature detection neurons, but they are characterized in that the weight distribution corresponding to a specific 2D mask is a Gaussian filter or Low-Pass Filter.

The network structure of the CNN gradually detects higher-order features in turn from initial features using such hierarchical feature detection and feature integration processes, and finally categorizes an input. When higher-order features are detected from the input image by the aforementioned process, a specific image can be detected. The CNN is characterized by identification robust against various patterns of variations by hierarchical feature extraction processes and the diffusion process of the feature integration layers.

Figure 8:
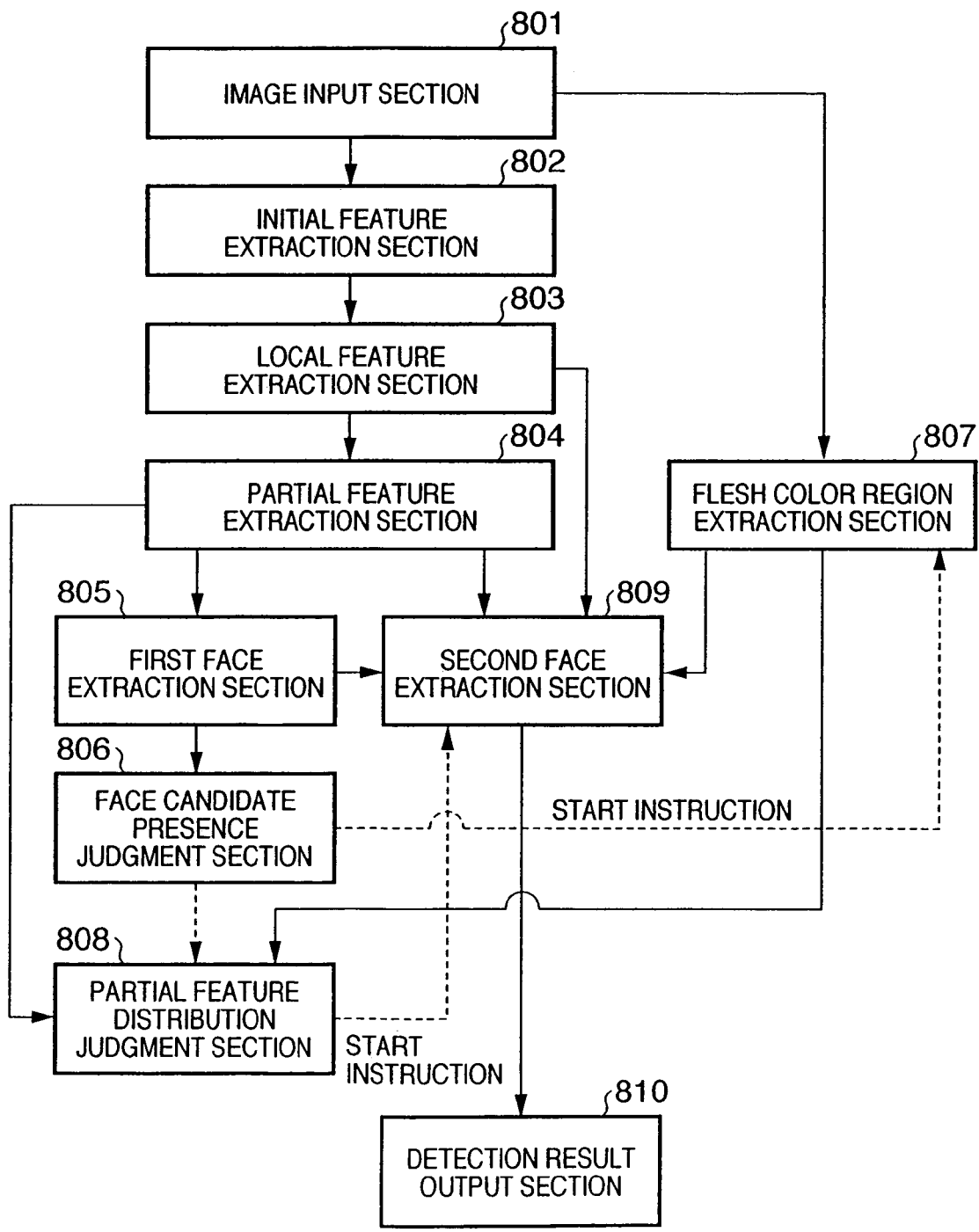
FIG. 8 is a block diagram showing the functional arrangement of a pattern identification device in the second embodiment.
Figure 9A:
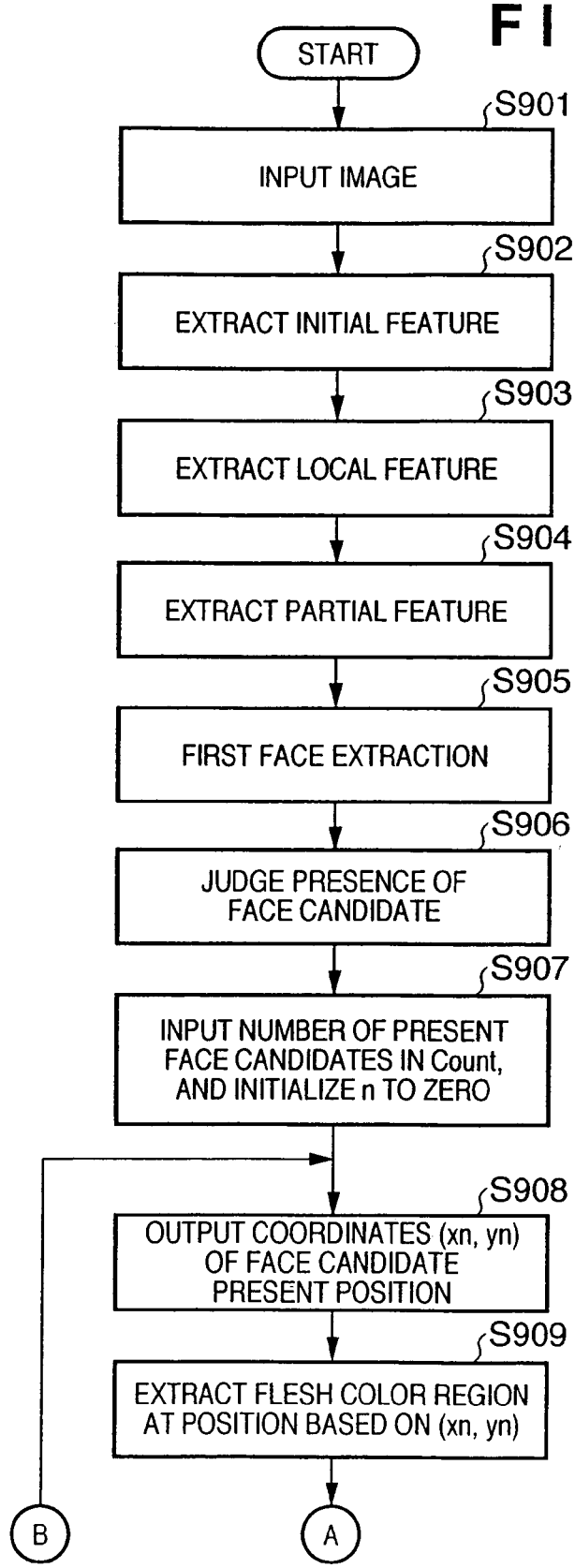
FIGS. 9A and 9B are flowcharts showing the flow of processes in the second embodiment.
Figure 9B:
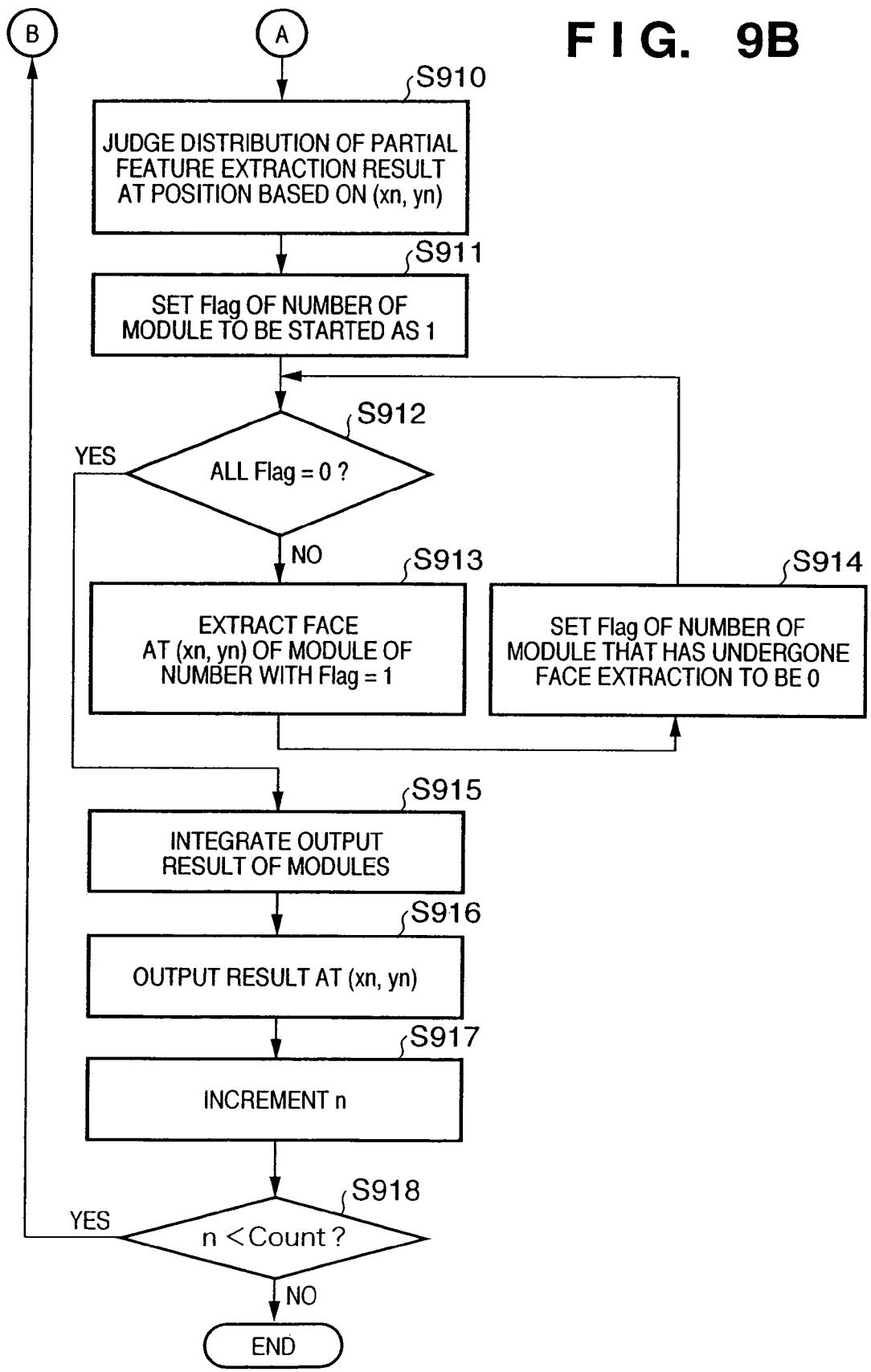

In this embodiment, the following explanation will be given using the CNN as the basic hierarchical feature extraction processing configuration. FIG. 8 shows the arrangement of processing sections in this embodiment. FIGS. 9A and 9B show the flow of processes in this embodiment. The processes in this embodiment will be described below using FIG. 8 and FIGS. 9A and 9B.

An image input section 801, initial feature extraction section 802, local feature extraction section 803, and partial feature extraction section 804 in FIG. 8 are the same as the image input section 21, initial feature extraction section 22, local feature extraction section 23, and partial feature extraction section 24 in the first embodiment. The processes in steps S901 to S904 are the same as those in steps S301 to S304 in FIG. 3.

In this embodiment, the image input unit 801 uses an RGB color image, and a grayscale image obtained by converting the RGB color image is input to the initial feature extraction section 802 as the next layer. Feature extraction adopts processes by means of the CNN, and each feature extraction section performs feature detection using a feature detection layer and integration of detected features using a feature integration layer. The types of features to be detected by the local feature extraction section 803 and partial feature extraction section 804 are the same as those in the first embodiment. The weight distribution unique to each feature detection cell plane uses a distribution which is set by learning by giving a plurality of test patterns as inputs in the same manner as the unique 2D mask setting method, which has been explained in the first embodiment.

In this embodiment, features to be extracted by the initial feature extraction section 801 do not use those which are limited in advance, the weight distributions unique to the respective feature cell planes for detecting local features are learned, and weight distributions unique to the respective feature cell planes for detecting initial features are automatically set using the error back propagation method upon learning features to be detected by the local feature extraction section 802. In this way, the initial feature extraction section 801 can automatically set a coupling weight distribution with the input image 71, so as to extract initial features which form local features to be detected by the local feature extraction section 802, and are required to detect these local features.

In step S905, a first face extraction section 805 applies the same process as in the aforementioned feature extraction method to the eye and mouth extraction results extracted by the partial feature extraction section 804 so as to extract faces in the image.

When the output value of the first face extraction section 805 exceeds a predetermined threshold value, a face candidate presence judgment section 806 judges that a face candidate is present there (step S906), sets the number of face candidates in Count (step S907), sequentially outputs the coordinates of a face candidate present position where a face candidate is present, and issues a start instruction to a flesh color region extraction section 807 and partial feature distribution judgment section 808 (step S908).

The flesh color region extraction section 807 receives the start instruction from the face candidate region presence judgment section 806, and extracts a flesh color region from the input image within the range based on the face candidate present position coordinates (step S909). The partial feature distribution judgment section 808 judges the distribution of the partial feature extraction results within the range based on the face candidate present position coordinates (step S910), and turns on flags of face extraction modules to be started (step S911).

Unlike the partial feature distribution judgment section 25 in the first embodiment, the partial feature distribution judgment section 808 of this embodiment is a processing section, which includes face extraction modules that make, using not only the feature extraction results of the partial feature extraction section 804 but also the flesh color region extraction result of the flesh color region extraction section 807, simple analysis of a distribution of these feature extraction results, and correspond to a plurality of variations, and which issues a start instruction to a second face extraction section 809. In this connection, one face extraction module in this embodiment corresponds to one feature detection cell plane in the CNN.

The second face extraction section 809 executes face extraction using face extraction modules corresponding to variations as in the first embodiment. More specifically, the section 809 sequentially executes face extraction processes at the face candidate present position coordinates using face extraction modules with a flag=ON, and turns off the flags of the face extraction modules that have executed face extraction (steps S911 to S914).

The face extraction process in this embodiment extracts a face corresponding to a specific variation using not only the eye and mouth feature extraction results extracted by the process of the partial feature extraction section 804 but also the feature extraction results corresponding to the upper portions of the eyes and lip extracted by the local feature extraction section 803, and the flesh color region extraction result extracted by the flesh color region extraction section 807, unlike in the first embodiment.

A detection result output section 810 outputs a result indicating a location where a face is present in the input image on the basis of the face extraction result of the second face extraction section 809. That is, the output results of the respective modules are integrated (step S914) to output the detection result at that face candidate present position (S915), and the flow then loops to detection at the next face candidate present position (steps S917 and S918).

The detailed processes in the first face extraction section 805 and subsequent processing sections in this embodiment will be described below.

The face extraction process executed by the first face extraction section 805 is the same as the feature extraction processes in the local feature extraction section 803 and partial feature extraction section 804. The face extraction process in this embodiment does not have a plurality of face extraction modules corresponding to variations unlike the face extraction unit 26 in the first embodiment but it is implemented by only one module. In this embodiment, in order to detect the location of a face in the image, face detection is made at respective positions of the image in place of face extraction performed only near the center of the image.

Unique weight distributions of face detection neurons which are used in the extraction process and are coupled to the partial feature extraction results extracted by the partial feature extraction section 804 are set by learning by giving faces with various variations (e.g., i to iv in FIG. 4) as test data. As a result of such learning, although the precision drops (e.g., an object which is not a face is unlikely to be judged as a face), a single module can extract faces with various variations. This processing section executes feature detection using the weight distributions learned as described above, and integrates results by the feature integration layer.

The face candidate presence judgment section 806 judges a portion as an output equal to or larger than a predetermined threshold value with respect to the result of the face extraction process of the first face extraction section 805. The section 806 determines that a face candidate is present at the judged position, and issues a start instruction to the flesh color region extraction section 807 and partial feature distribution judgment section 808 to execute processes within the range where that candidate is present.

The flesh color region extraction section 807 receives the start instruction from the face candidate presence judgment section 806, and extracts a flesh color region near the range where the face candidate is present. In this embodiment, in a region where a flesh color region is extracted, an RGB color input image is converted into an HSV colorimetric system, and only pixels within a specific hue (H) range are extracted as the flesh color region. The flesh color region extraction method is not particularly limited, and other known methods may be used. For example, a flesh color region may be extracted using saturation (S) or luminance (V). In this embodiment, a flesh color region is extracted. Alternatively, a hair region or the like may be extracted.

The partial feature distribution judgment section 808 executes the same process as in the partial feature distribution judgment section 25 in the first embodiment. In this embodiment, the partial feature distribution judgment section 808 receives the start instruction from the face candidate presence judgment section 806 in the same manner as in the flesh region extraction section 807, and analyzes the distribution of predetermined feature extraction results near the range where the face candidate is present. The unit 808 then selects predetermined face extraction modules of the second face extraction section 809, which includes face extraction modules corresponding to a plurality of specific variations, in accordance with the analysis result, and supplies a start instruction to the selected modules to execute face extraction processes at the face candidate present position.

The feature extraction results to be analyzed by the partial feature distribution judgment section 806 include the eye and mouth extraction results extracted by the partial feature extraction section 804, and the flesh color region extraction result by the flesh color region extraction section 807. The analysis process to be executed by this section is the same as that described in the first embodiment, and executes a process for extracting necessary conditions to be satisfied by each module, which forms the second face extraction section 809 and corresponds to a variation, when a face is present.

Since this embodiment uses the flesh color region extraction result unlike in the first embodiment, some analysis processes for that result will be listed. As a simplest example, a process for analyzing the area of the extracted flesh color region is known. In addition, the aspect ratio of a region extracted as a flesh color region may be analyzed, and the relative positional relationship between the barycentric positions of the upper and lower half flesh color extraction regions of a region where it is judged that a face candidate is present may be analyzed.

For example, the first example can be used as one of necessary conditions in a face extraction module of a specific size according to the area. The second example can be set as one of necessary conditions for a module corresponding to a horizontal or vertical turn of a face, and the third example can be set as one of necessary conditions for a module corresponding to in-plane rotation of a face. Furthermore, the following analysis processes may be executed: comparison between the areas of a region where an eye is extracted and the flesh color region, comparison between the areas of a region where no eye is extracted and the flesh color region, and comparison between the areas of the region where no eye is extracted and a non-flesh color region.

In these analysis processes of the areas and the like, analysis may be made within only a specific region, as has been described in the first embodiment. For example, the area of a non-flesh color region may be analyzed in a region which seems a hair position. In addition to the analysis processes associated with the eye and mouth extraction results, which are executed in the first embodiment, since the aforementioned analysis processes are added, a start instruction with higher precision can be issued.

The second face extraction section 809 is the same processing section as the face extraction section 26 of the first embodiment, and includes a plurality of face extraction modules corresponding to specific variations. In this embodiment, unlike in the first embodiment, face extraction is done at the face candidate present position using not only the eye and mouth extraction results of the partial feature extraction section 804, but also the flesh color extraction result of the flesh color region extraction section 807, the extraction results of faces with various variations by the first face extraction section 805, and the feature extraction results corresponding to the upper portions of the eyes and lip of those which are extracted by the local feature extraction section 803.

In this manner, the feature extraction precision can be improved by additionally using not only the feature extraction results of the immediately preceding layer, but also the feature extraction results (first face extraction results) in the same layer as features of the same level, the feature extraction results (flesh region extraction result in this case) externally inserted from the framework of hierarchical feature extraction, the feature extraction results (the feature extraction results corresponding to the upper portions of the eyes and lip) in a layer before the immediately preceding layer, the feature extraction results of a subsequent layer to be described later in the third embodiment, and the like, upon feature extraction. As a result, although the processing cost increases, since the feature extraction process of the second face extraction section 809 is executed by the module that received the start instruction from the partial feature distribution judgment section 808 at only the face candidate present position, an increase in processing cost can be minimized.

The detection result output section 810 is the same processing section as the detection result output section 27 in the first embodiment, judges the location of a face in the image on the basis of the results of the feature extraction processes, which are executed in response to the start instruction from the partial feature judgment section 808, of the face extraction modules which form the second face extraction section 809 and correspond to a plurality of variations, and outputs the judgment result. Since the outputs from the plurality of modules are integrated, as has been explained in the first embodiment, high-precision detection can be made.

As described above, the second embodiment has exemplified the case wherein face is used as an object to be detected in a method that uses two-dimensional image data as input data and detects a specific object in that image.

Third Embodiment

The third embodiment of the present invention is a modification of the second embodiment. This embodiment also executes a process for detecting a face in an image as in the second embodiment. However, the present invention is not limited to this, and may be applied to other image patterns and audio data. Also, the present invention can be applied to a case wherein objects of a plurality of categories are to be detected.

Figure 10:
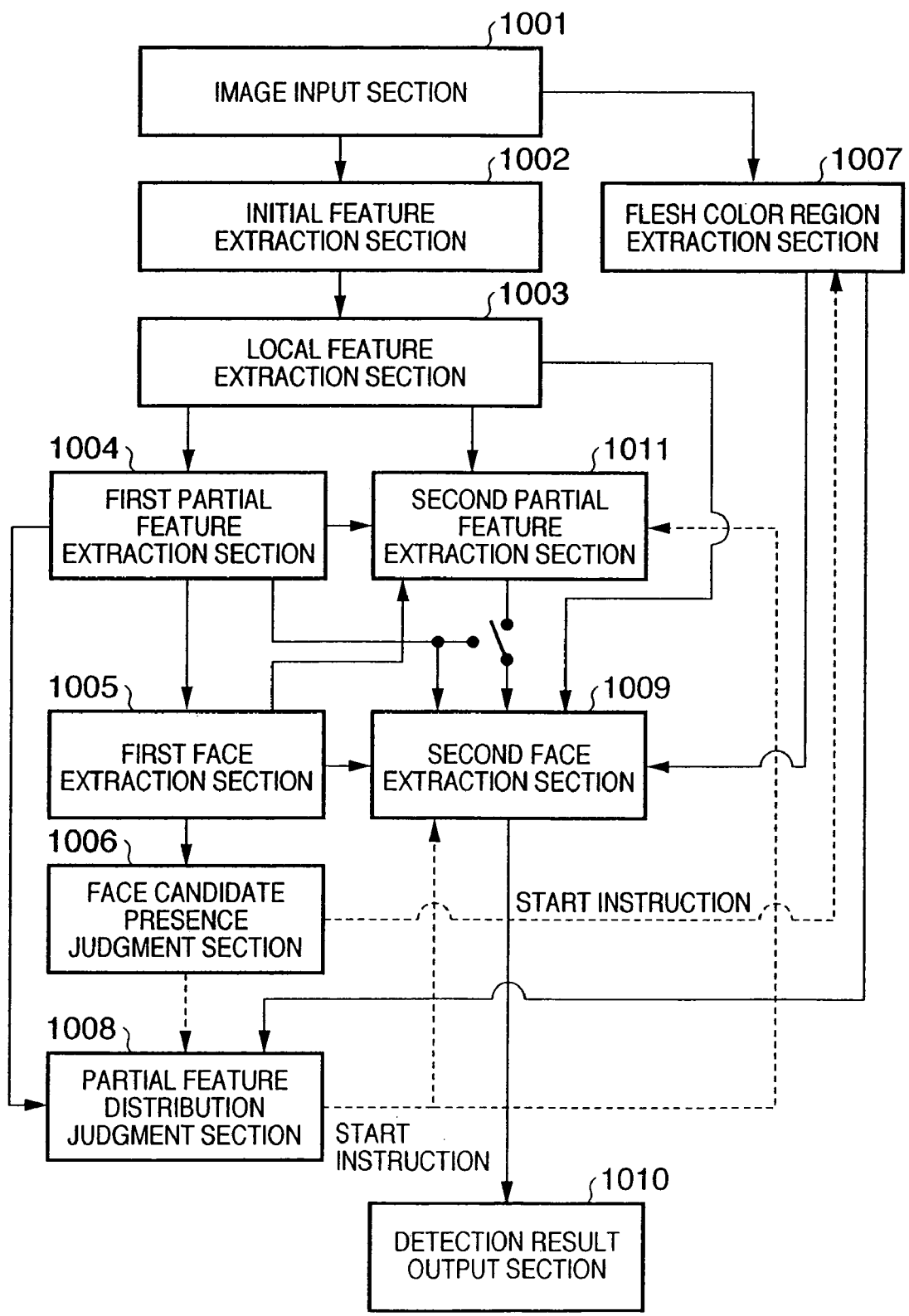
FIG. 10 is a block diagram showing the functional arrangement of a pattern identification device in the third embodiment.
Figure 11A:
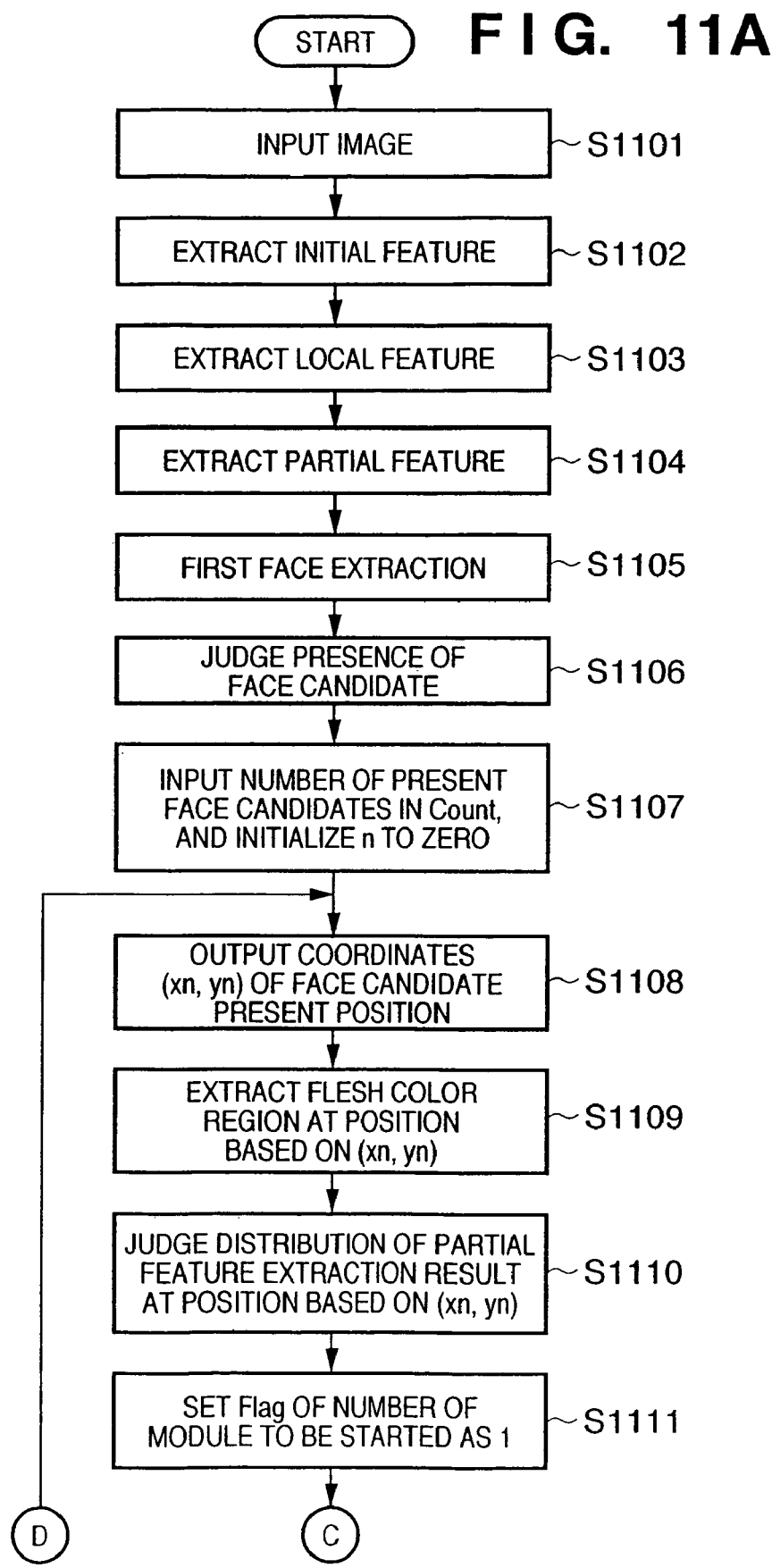
FIGS. 11A and 11B are flowcharts showing the flow of processes in the third embodiment.
Figure 11B:
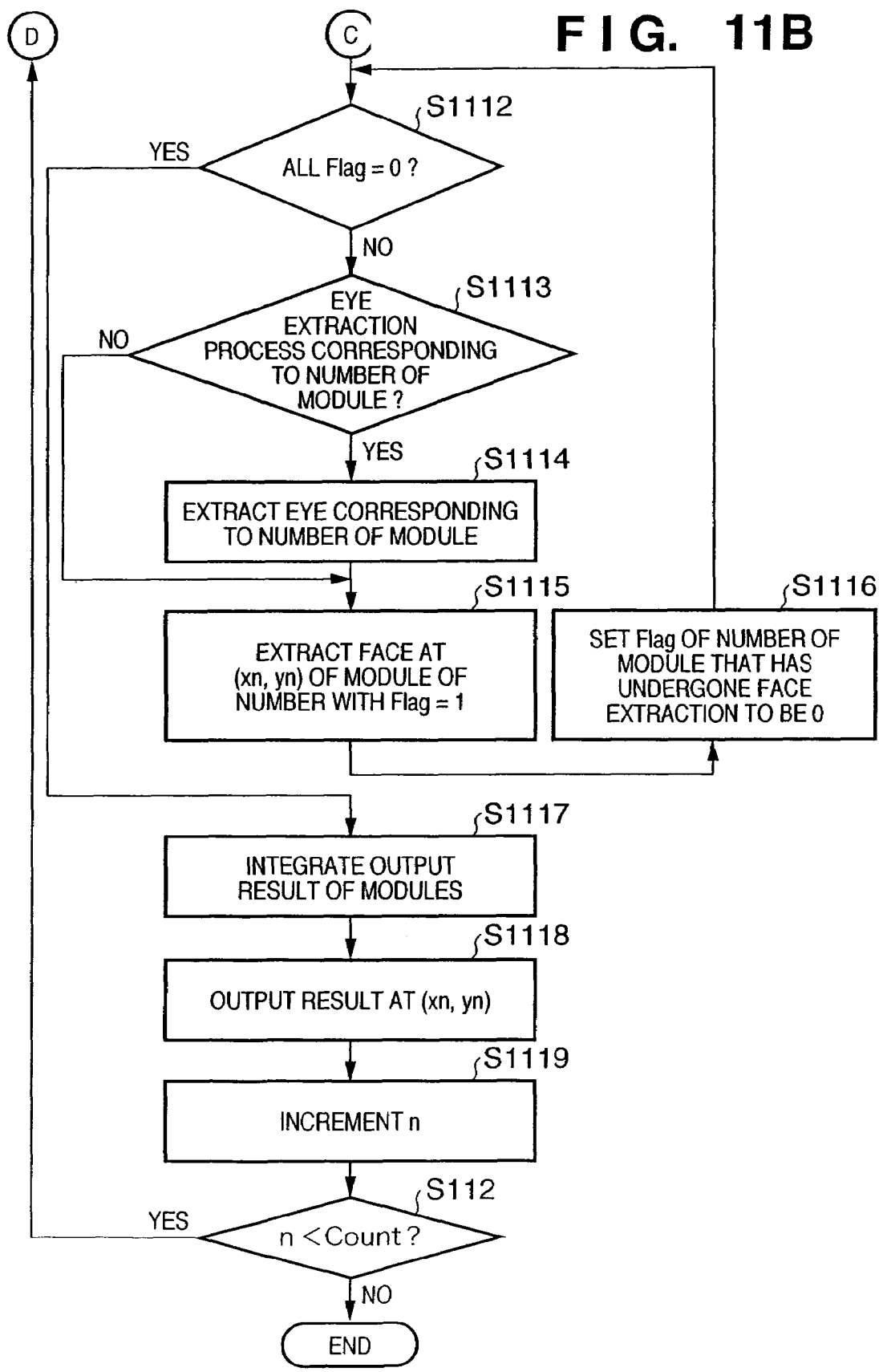

FIG. 10 shows the arrangement of processing sections in this embodiment. FIGS. 11A and 11B show the flow of processes in this embodiment. The arrangement of basic processes in this embodiment is the same as that described in the second embodiment. The processes in this embodiment will be described below using FIG. 10.

Since processes (steps S1101 to S1109) from an image input section 1001 to a flesh color region extraction section 1007 in FIG. 10 are the same as those in steps S901 to S909 in the second embodiment, a description thereof will be omitted.

A partial feature distribution judgment section 1008 executes the same process as in the partial feature distribution judgment section 808 in the second embodiment. Also, the section 1008 issues a start instruction to face extraction modules corresponding to a plurality of variations of a second face extraction unit 1009 to execute face extraction processes at the face candidate present position, and also issues a start instruction to a second partial feature extraction section 1011 which includes partial feature extraction modules corresponding to a plurality of variations, in accordance with the analysis result of the distribution of the feature extraction results. That is, the section 1008 judges the distribution of partial feature extraction results within the range based on the face candidate present position coordinates (step S1110), and turns on flags of face extraction modules to be started (step S1111).

The second partial feature extraction module 1011 includes a plurality of modules that extract partial features corresponding to specific variations, receives a start instruction from the partial feature distribution judgment section 1008, and re-extracts partial features only at a specific position determined by the face candidate present position of each module that received the start instruction. More specifically, if the partial feature extraction modules corresponding to the face extraction modules with a flag=ON are available, partial feature extraction processes at a position determined by the face candidate present position coordinates are done (steps S1113 and 1114).

A second face extraction section 1009 is substantially the same processing section as the second face extraction section 809 of the second embodiment. When the second partial feature extraction section 1011 re-extracts partial features corresponding to the face extraction modules to be started in this section, the section 1009 executes face extraction using the features extracted by a partial feature extraction section 1004. That is, the section 1009 executes face extraction at the face candidate present position using the face extraction modules with a flag=ON, and turns off the flags of the face extraction modules that have executed face extraction (steps S1115 and S1116).

Since a detection result output section 1010 is the same as the detection result output section 810 of the second embodiment, and steps S1117 to S1120 are the same as steps S915 to S918 of the second embodiment, a description thereof will be omitted.

Detailed processes in the partial feature distribution judgment section 1008, second partial feature extraction section 1011, and second face extraction section 1009 in this embodiment will be described below.

In the partial feature distribution judgment section 1008, the process for analyzing the distribution of the partial feature extraction results is the same as that in the second embodiment, as described above. In the second embodiment, a start instruction is issued to modules that extract faces corresponding to a plurality of variations. In addition, a start instruction is issued to the second partial feature extraction section 1011 that extracts partial features corresponding to variations of the face extraction modules to which the start instruction is issued. More specifically, when a start instruction is issued to start a face extraction module corresponding to a clockwise in-plane rotational variation, a start instruction is simultaneously issued to a partial feature extraction module corresponding to a clockwise in-plane rotational variation as an identical variation.

The second partial feature extraction section 1011 includes a plurality of modules that extract partial features corresponding to a plurality of variations. In this case, partial feature extraction modules corresponding to the modules which received a start instruction from the partial feature distribution judgment section 1008 and extract faces corresponding to a plurality of variations are started, and extract partial features only within a specific range determined by the face candidate present position obtained as a result of a face candidate presence judgment section 1006. The feature extraction method is the same as that described in the second embodiment.

Respective partial feature modules basically correspond to the face extraction modules which form the second face extraction section 1009 and correspond to a plurality of variations, but these modules need not have one-to-one correspondence between them. For example, no partial feature extraction module corresponding to a face extraction module for a full face is available. In such case, when a start instruction is issued to the face extraction module for a full face, a process in the second partial feature extraction section 1011 may be skipped.

Furthermore, one partial feature extraction module may be associated with a plurality of types of face extraction modules. For example, a face extraction module corresponding to a clockwise 15° in-plane rotational variation and a face extraction module corresponding to a clockwise 30° in-plane rotational variation are associated with a partial feature extraction module which performs extraction including both variations.

In this manner, a feedback mechanism that controls the operation of a feature extraction module of a lower layer level on the basis of a feature extraction result output of an upper layer level. That is, since partial feature extraction modules corresponding to face extraction modules which are started in the second face extraction and correspond to specific variations re-extract features of lower order, thus allowing feature extraction with higher precision. Since features are re-extracted, the processing cost increases. However, since processes are done only at specific positions of the modules that received the start instruction, an increase in processing cost can be minimized.

In this embodiment, this processing section does not perform mouth extraction but performs only eye extraction corresponding to variations. When feature extraction with higher precision is required, mouth extraction corresponding to variations may be made, and features of types other than those extracted by the first partial feature extraction section 1004 may be extracted.

Furthermore, feature extraction performs eye extraction using the partial feature extraction results of the eyes, mouth, and the like extracted by the partial feature extraction section 1004, and the first face extraction results extracted by the first face extraction section 1005 in addition to the local feature extraction results extracted by the local feature extraction section 1003 unlike in the first partial feature extraction section 1004. As has already been explained in the second embodiment, feature extraction processes with higher precision can be achieved by additionally utilizing the feature extraction results in the same layer as features of an identical level, and the feature extraction results of an upper layer as features of an upper level.

The second face extraction section 1009 executes basically the same process as that in the second face extraction section 809 in the second embodiment. The difference from the second face extraction section 809 in the second embodiment lies in that when the second partial feature extraction section 1011 executes partial feature extraction corresponding to variations, which are associated with face extraction modules to be started, the section 1009 executes face extraction using the partial feature extraction results corresponding to variations extracted by the second partial feature extraction section 1011 in place of face extraction using the partial feature extraction results extracted by the first partial feature extraction section 1004.

In this embodiment, since the second partial feature extraction section 1011 extracts only the eyes, the mouth extraction result of the first partial feature extraction section 1004 is used. As has been explained in association with the second partial feature extraction section 1011, if a partial feature extraction module corresponding to a face extraction module for a full face is not available, when a start instruction is issued to the face extraction module for a full face, no feature re-extraction in the second partial feature extraction section 1011 is performed.

In such case, the feature extraction result of the first partial feature extraction section 1004 is directly used. In this embodiment, when partial feature extraction corresponding to a variation associated with a face extraction module to be started is made, the eye extraction result extracted by the first partial feature extraction section 1004 is not used. However, in order to further improve the precision, this feature extraction result may be additionally used.

The third embodiment has been explained as an example that detects a face in the method which uses two-dimensional image data as input data, and detects a specific object in that image, as a modification of the second embodiment.

Figure 12:
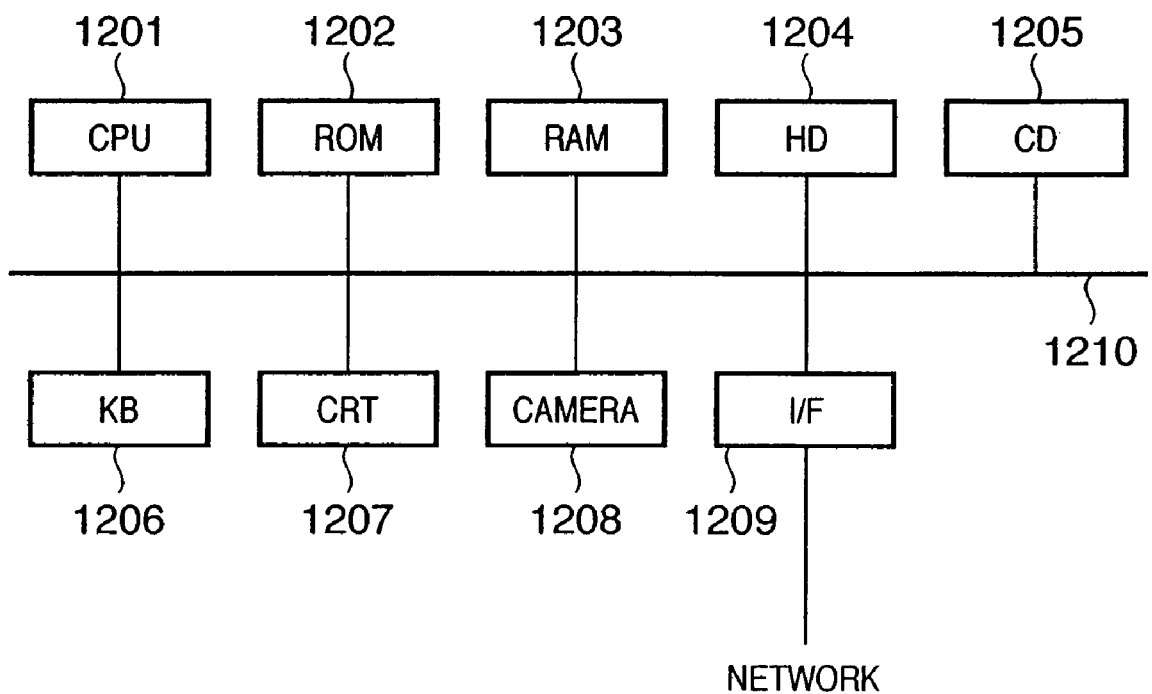
FIG. 12 is a block diagram showing the block arrangement of a computer which implements the present invention.

FIG. 12 is a block diagram showing an example of the block arrangement of an information processing apparatus that implements the present invention. As shown in FIG. 12, this information processing apparatus includes a CPU 1201, ROM 1202, RAM 1203, HD (hard disk) 1204, CD 1205, KB (keyboard) 1206, CRT 127, camera 1208, and network interface (I/F) 1209, which are connected via a bus 1210 to be able to communicate with each other.

The CPU 1201 makes the operation control of the overall information processing apparatus, and controls the entire information processing apparatus by reading out and executing a processing program (software program) from the HD (hard disk) 1204 or the like.

The ROM 1202 stores programs and various data and the like used in the programs.

The RAM 1203 is used as a work area or the like used to temporarily store a processing program and information to be processed for various processes by the CPU 1201.

The HD 1204 is a building component as an example of a large-capacity storage device, and saves various data such as model data and the like, a processing program to be transferred to the RAM 1203 and the like upon execution of various processes, and the like.

The CD (CD drive) 1205 has a function of loading data stored in a CD (CD-R) as an example of an external storage medium, or writing data on the CD.

The keyboard 1206 is an operation unit which is used by the user to input various instructions and the like to the information processing apparatus.

The CRT 1207 displays various kinds of instruction information to the user, and various kinds of information such as text information, image information, and the like.

The camera 1208 senses and inputs an image to be identified.

The interface 1209 is used to download information from the network, and to upload information onto the network.

Fourth Embodiment

Figure 13:
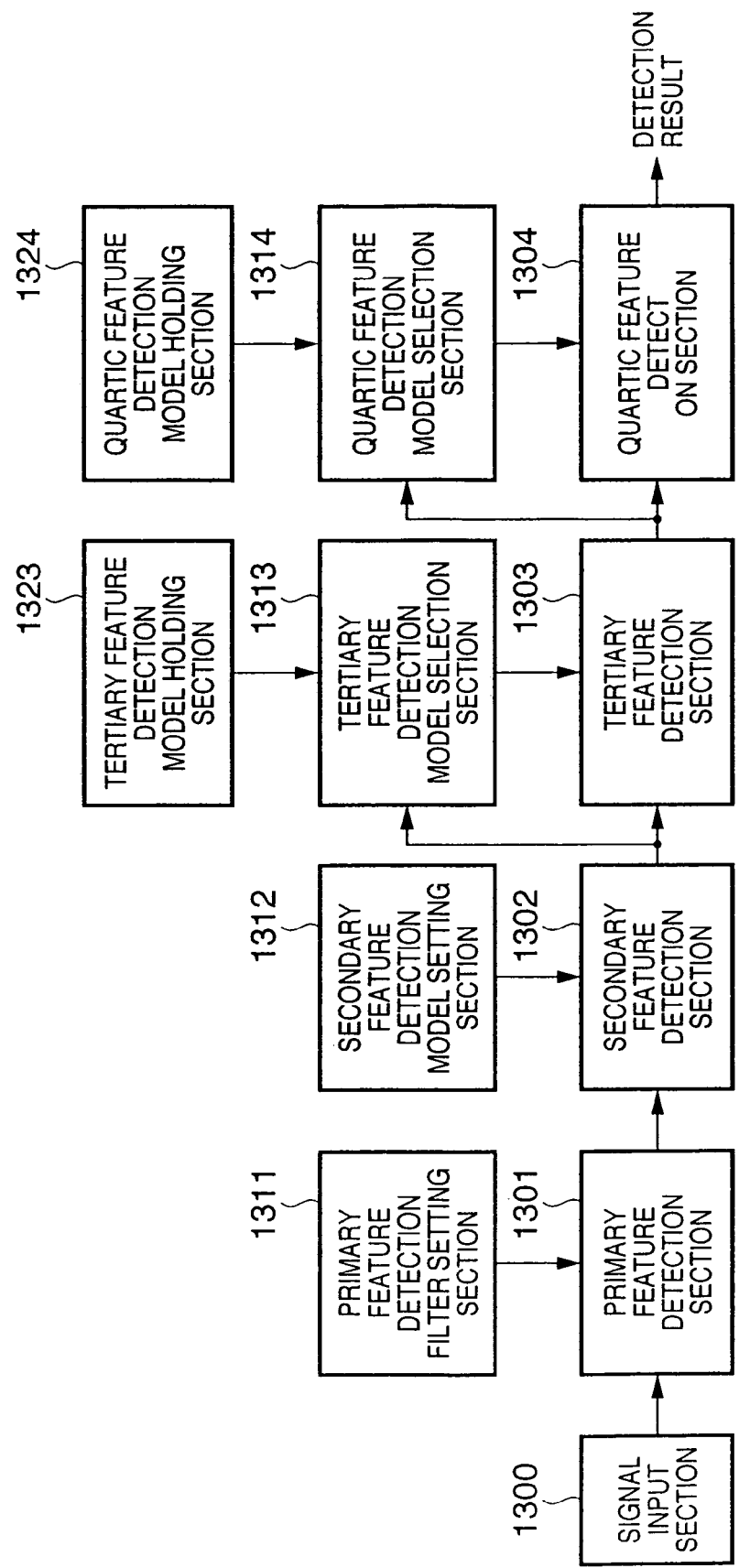
FIG. 13 is a block diagram showing the arrangement of a pattern detection device according to the fourth embodiment.
Figure 14:
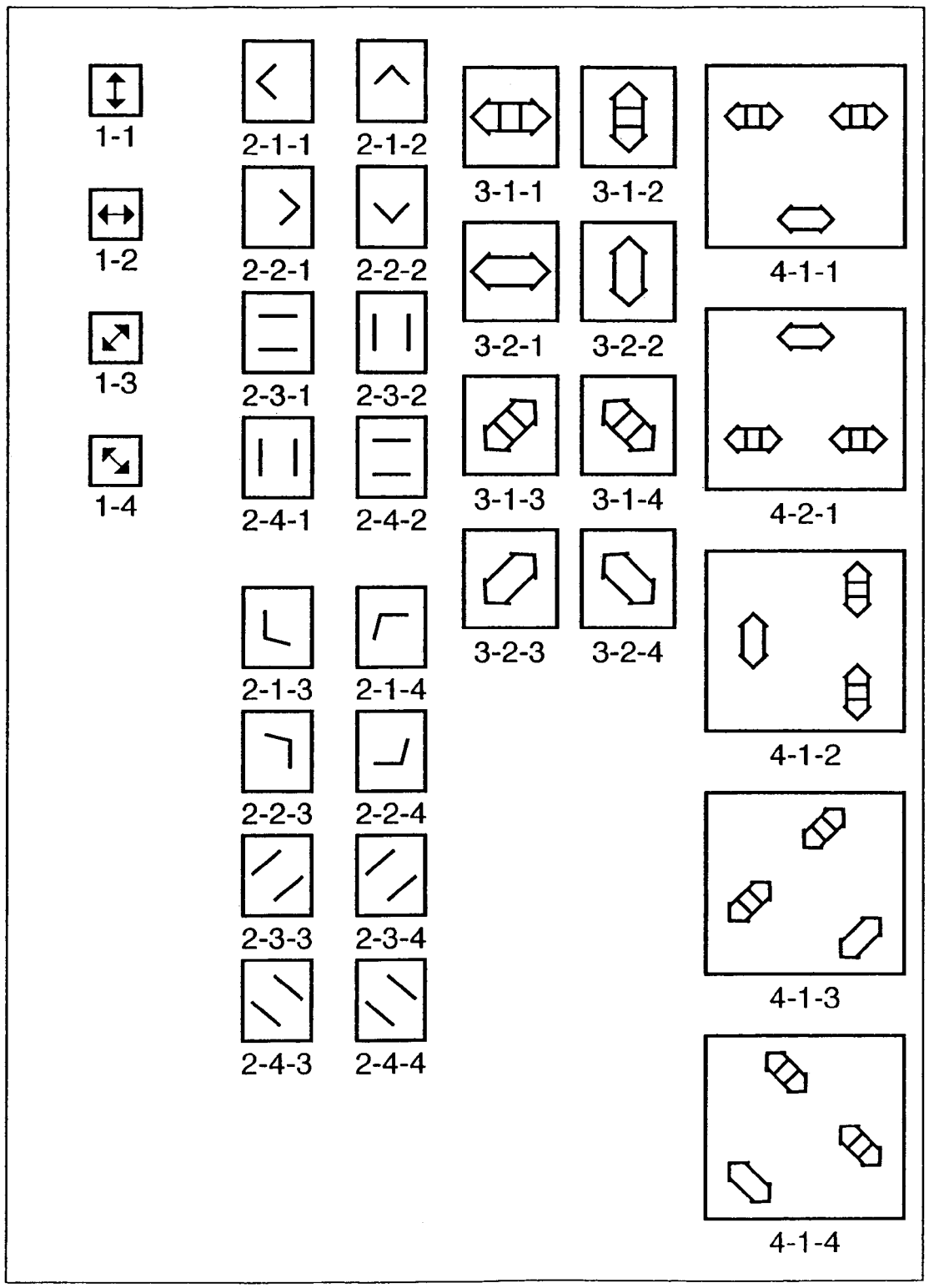
FIG. 14 shows examples of features detected by respective feature detection sections in a pattern detection device of the first embodiment.

FIG. 13 is a block diagram showing the arrangement of a pattern detection device according to the fourth embodiment of the present invention. Referring to FIG. 13, reference numeral 1300 denotes a signal input section; 1301, a primary feature detection section; 1311, a primary feature detection filter setting section; 1302, a secondary feature detection section; 1312, a secondary feature detection model setting section; 1303, a tertiary feature detection section; 1313, a tertiary feature detection model selection section; 1323, a tertiary feature detection model holding section; 1304, a quartic feature detection section; 1314, a quartic feature detection model selection section; and 1324, a quartic feature detection model holding section. In this embodiment, features of respective orders above indicate local features to be locally detected, and a feature of higher order includes features of lower order. FIG. 14 shows examples of features to be detected by the primary to quartic feature detection sections 1301 to 1304, respectively.

The functions of the individual building components of the pattern detection device shown in FIG. 13 will be described below. The signal input section 1300 inputs a signal (e.g., image data) such as an image signal or the like as an object to be processed. The primary feature detection section 1301 applies a process for detecting primary features (to be described later) to the signal input from the signal input section 1300, and passes the detection results to the secondary feature detection section 1302. The primary feature detection filter setting section 1311 sets the characteristics of a filter used to detect primary features in the primary feature detection section 1301.

The secondary feature detection section 1302 applies a process for detecting secondary features (to be described later) to the detection results of the primary feature detection section 1301 using detection model set by the secondary feature detection model setting section 1312, and passes the detection results to the tertiary feature detection section 1303 and tertiary feature detection model selection section 1313. The secondary feature detection model setting section 1312 sets models each of which indicates the positional relationship between two primary features used upon detecting secondary features in the secondary feature detection section 1302. This model has an attribute associated with a predetermined shape. A plurality of models may be prepared from the beginning, or one model may undergo rotation affine transformation or the like using rotation angles as parameters to generate a plurality of models. The same applies to tertiary and quartic models. In this embodiment, a secondary feature is explained as a model that indicates the positional relationship between two primary features. However, this embodiment can be similarly applied to three or more primary features.

The tertiary feature detection section 1303 applies a process for detecting tertiary features (to be described later) to the detection results of the secondary feature detection section 1302 using detection models selected by the tertiary feature detection model selection section 1313, and passes the detection results to the quartic feature detection section 1304 and quartic feature detection model selection section 1314. The tertiary feature detection model holding section 1323 holds a plurality of models having different rotation angles (i.e., different tilts) to be selected by the tertiary feature detection model selection section 1313. The tertiary feature detection model selection section 1313 selects and sets models, each of which indicates the positional relationship between secondary features used upon detection features in the tertiary feature detection section 1303, from those held by the tertiary feature detection model holding section 1323 on the basis of the detection results from the secondary feature detection section 1302.

The quartic feature detection section 1304 applies a process for detecting quartic features (to be described later) to the detection results of the tertiary feature detection section 1303 using detection models selected by the quartic feature detection model selection section 1314, and outputs detection results. The quartic feature detection model holding section 1324 holds a plurality of models having different rotation angles (i.e., different tilts) to be selected by the quartic feature detection model selection section 1314. The quartic feature detection model 1314 selects and sets models, each of which indicates the positional relationship tertiary features used upon detecting features in the quartic feature detection section 1304, from those held by the quartic feature detection model holding section 1324 on the basis of the detection results from the tertiary feature detection section 1303.

More specifically, the pattern detection device according to this embodiment detects predetermined patterns in an image input from the signal input section 1300 using detection models for respective orders as pattern models. This pattern detection device is characterized by comprising a detection model holding section of each dimension (e.g., tertiary feature detection model holding section 1323) which holds high-order models (e.g., tertiary feature detection models) formed by combining predetermined low-order models (e.g., secondary feature detection models), a feature detection section (e.g., secondary feature detection section 1302) of each order, which calculates a feature amount of the low-order model with respect to a forming part by comparing the low-order model with the forming part of a pattern in an image, and a setting section (e.g., tertiary feature detection section 1303) which sets a pattern model (e.g., a tertiary feature detection model) of a pattern by comparing the high-order model held by the detection model holding section and a pattern in the image, and sets the high-order model as a pattern model of the pattern when each individual low-order model that forms the high-order model has a predetermined feature amount.

The pattern detection device is characterized by further comprising a detection section (e.g., primary feature detection section 1301) which detects partial features (e.g., primary features) of a pattern from an image input from the signal input section 1300, and a low-order model setting section (e.g., secondary detection model setting section 1312) which sets the low-order models (e.g., secondary feature detection models) using predetermined partial models, and in that the feature detection section such as the secondary feature detection section 1302 or the like calculates a feature amount by comparing a partial model included in the low-order model and a partial feature of a pattern in the image.

Furthermore, the pattern detection device is characterized by further comprising means (e.g., quartic feature detection model holding section 1324) which holds higher-order models (e.g., quartic detection models) formed by combining a plurality of high-order models (e.g., tertiary detection models), and means (e.g., four-dimensional feature detection section 1304) which compares the model with a predetermined pattern in the image, and sets, when all the plurality of high-order models have a predetermined feature amount, that model as a pattern model of the predetermined pattern, and in that a pattern model of the predetermined pattern in the image is set using models having a hierarchical structure.

Figure 15:
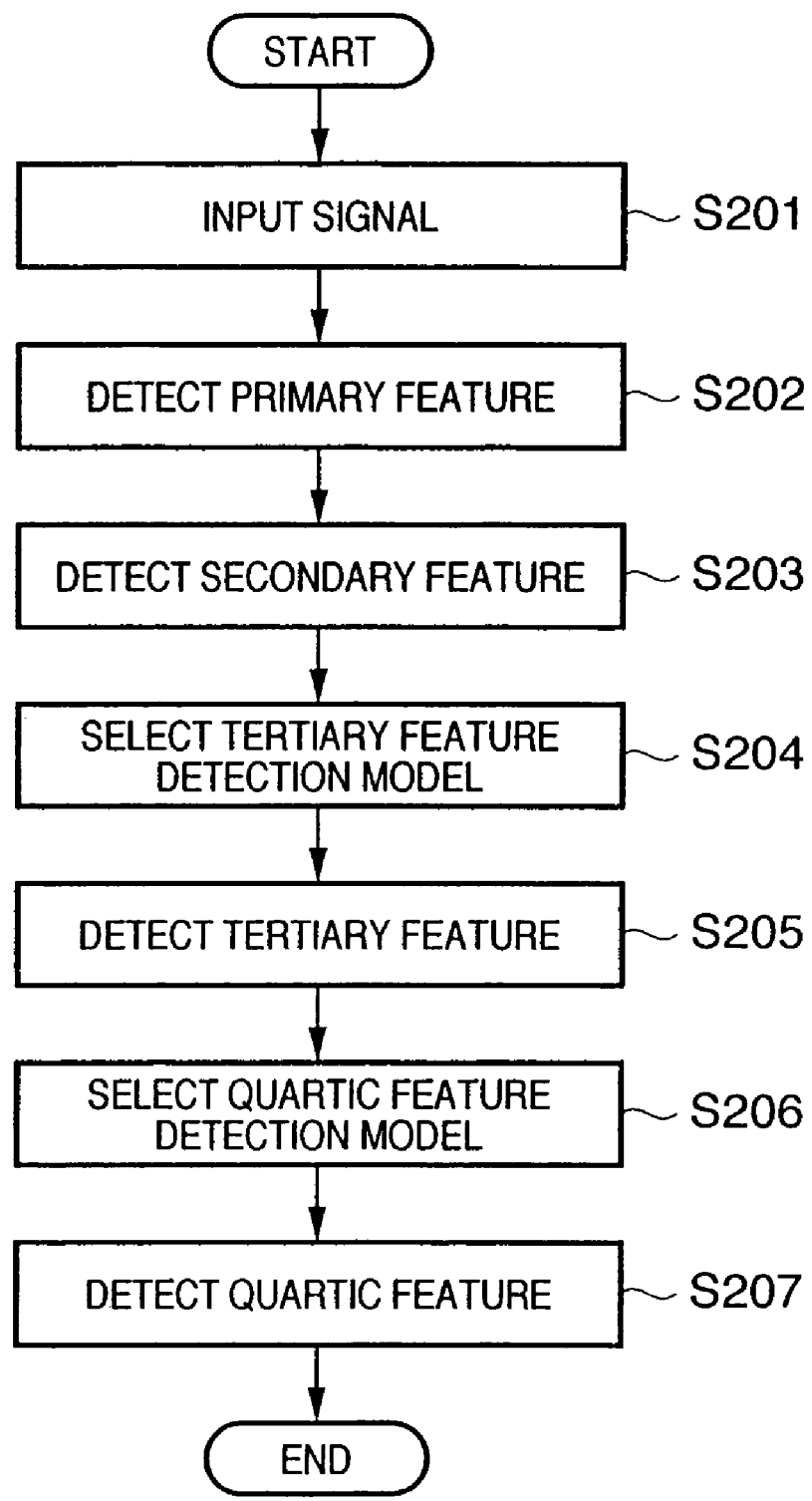
FIG. 15 is a flowchart for explaining an example of the operation of the pattern detection device according to the fourth embodiment.

An operation example of the pattern detection device with the aforementioned arrangement shown in FIG. 13 will be described below. FIG. 15 is a flowchart for explaining an operation example of the pattern detection apparatus according to the fourth embodiment. To help easy understanding of a description, the operation of the pattern detection device according to this embodiment will be explained taking, as an example, an operation for detecting a face region in an image as an input signal in the aforementioned arrangement of this embodiment.

The image input section 1300 inputs an image signal (step S201). The primary feature detection section 1301 detects primary features (e.g., edge components with directionalities) at respective positions of the input image (step S202).

FIG. 14 shows examples of features detected by the respective feature detection sections (primary to quartic feature detection sections 1301 to 1304) in the pattern detection device of the fourth embodiment. More specifically, as shown in FIG. 14, the primary feature detection section 1301 detects features of four different direction components, i.e., a vertical feature 1-1, horizontal feature 1-2, upward-sloping feature 1-3, and downward-sloping feature 1-4. In this embodiment, the primary features are explained as those in four directions but they are merely examples, and other features may be used in detection of secondary and subsequent features as primary features.

In detection of the primary features in the primary feature detection section 1301, the primary feature detection filter setting section 1311 in FIG. 13 sets filters used to detect, e.g., four features. Such feature detection can be done by performing an emphasis process using a filter that emphasizes an edge component in each direction, e.g., a Sobel filter, Gabor function, or the like. Also, an edge emphasis process independent from directionality may be done using a Laplacian filter or the like, and a process for further emphasizing a feature in each direction may then be done. Note that a plurality of such feature detection filters may be prepared in advance, or the primary feature detection filter setting section 1311 may generate them using directions as parameters.

The detection result of the primary feature detection section 1301 is output in the form of an detection result image having a size equal to the input image for each feature. That is, in case of the primary features shown in FIG. 14, four detection result images having feature components in four different, vertical, horizontal, and oblique directions, are obtained. By checking a primary feature amount (e.g., the number of pixel values equal to or larger than a predetermined value included in the image) as the values of respective positions of the detection result image associated with each individual feature, whether or not the feature is present at that position of the input image can be determined.

FIG. 14 shows some of examples of secondary, tertiary, and quartic features detected by the secondary, tertiary, and quartic feature detection sections 1302, 1303, and 1304 to be described later in addition to the primary features.

As shown in FIG. 14, secondary features include right-open V-shaped features 2-1-1 to 2-1-4, left-open V-shaped features 2-2-1 to 2-2-4, horizontal parallel line features 2-3-1 to 2-3-4, and vertical parallel line features 2-4-1 to 2-4-4. Note that the names of these features are determined when faces are erected with respect to an image, and the feature names are often different from the directions of respective features in an actual image due to rotation of a face. That is, in this embodiment, for example, a low-order model setting section represented by the secondary feature detection model setting section 1311 sets a plurality of low-order models formed by rotating each of low-order models with an identical shape through a plurality of angles.

As examples of tertiary features, FIG. 14 shows eye features 3-1-1 to 3-1-4, and mouth features 3-2-1 to 3-2-4. Furthermore, as some examples of quartic features, FIG. 14 shows face features 4-1-1 to 4-1-4 and an inverted face feature 4-2-1. As inverted face features, those which correspond to the face features 4-1-2 to 4-1-4 are present as quartic features, although not shown.

As described above, after the primary feature detection section 1301 detects four different types of primary features at respective positions by the process in step S202 in this embodiment, the secondary feature detection section 1302 detects secondary features (step S203). For example, a case will be explained below wherein the right-open V-shaped feature 2-1-1 shown in FIG. 14 is to be detected. The same applies to other cases.

Figure 16B:
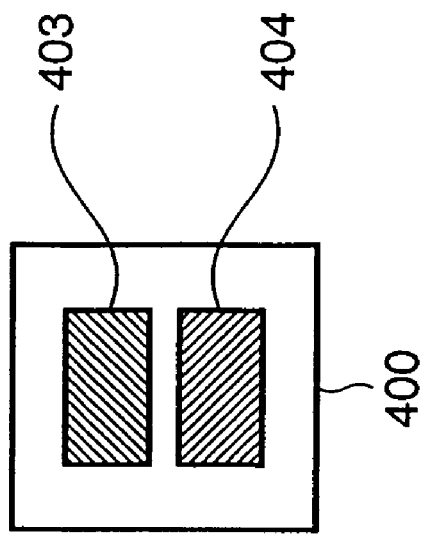
FIGS. 16A and 16B are views for explaining models associated with a right-open V-shaped feature 2-1-1 of secondary features.
Figure 16A:
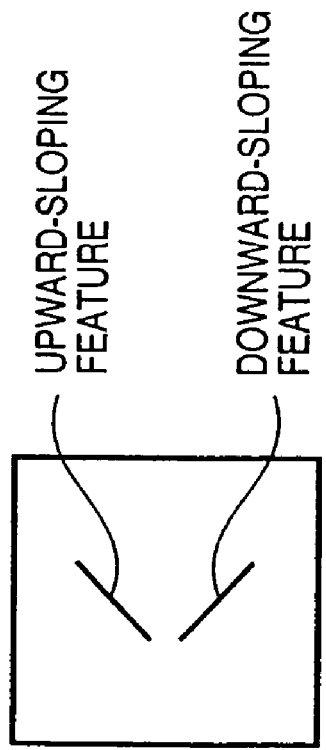

FIGS. 16A and 16B are views for explaining models associated with the right-open V-shaped feature 2-1-1 of the secondary features. In this right-open V-shaped feature 2-1-1, as shown in FIG. 16A, an upward-sloping feature 1-3 is present in an upper portion, and a downward-sloping feature 1-4 is present in a lower portion. That is, in order to detect the right-open V-shaped feature 2-1-1, a position where the upward-sloping feature 1-3 is present in an upper portion, and the downward-sloping feature 1-4 is present in a lower portion can be obtained by utilizing the primary feature detection results obtained in step S202, and the right-open V-shaped feature 2-1-1 is present at that position. In this way, a secondary feature can be detected by combining a plurality of different primary features.

However, the size of a face in an image is not fixed, and the eye and mouth sizes are different depending on individuals. Furthermore, since the eyes and mouth are opened/closed, the size of the V shape changes, and the V shape rotates. Also, errors may be generated by an edge extraction process or the like. Hence, in this embodiment, a right-open V-shape detection model 400 shown in FIG. 16B will be examined. The right-open V-shape detection model 400 has an upward-sloping region 403 and downward-sloping region 404. When only the upward-sloping feature 103 of the primary features is present in the upward-sloping region 403, and only the downward-sloping feature 104 is present in the downward-sloping region 404, it is determined that the right-open V-shaped feature 2-1-1 is present at that position. In this manner, processes robust against changes in size and shape, and rotation to some extent can be made.

In this embodiment, when the center of an image having an upward-sloping feature is present in the upward-sloping region 403 in FIG. 16B, and the center of an image having a downward-sloping feature is present in the downward-sloping region 404, it is determined that the right-open V-shaped feature 2-1-1 is present. Note that such determination result may also be obtained not only when the centers of images are present in the corresponding regions but also when these regions include the entire images having primary features. The upward-sloping and downward-sloping regions 403 and 404 are not limited to rectangular shape shown in FIG. 16B but may have an arbitrary shape. The same applies to other regions.

When the entire face has been largely rotated in an image (i.e., an image has a large tilt from a specific direction such as a horizontal or vertical direction), it is difficult for even the aforementioned model to extract such face. In this embodiment, secondary features are detected using detection models for a plurality of rotation angles. FIGS. 17A to 17D show examples of rotated detection models so as to detect secondary features. For example, secondary feature detection models which are classified into four groups by rotating four different secondary feature detection models shown in, e.g., FIG. 17A counterclockwise in increments of 45° will be examined.

Figure 17A:
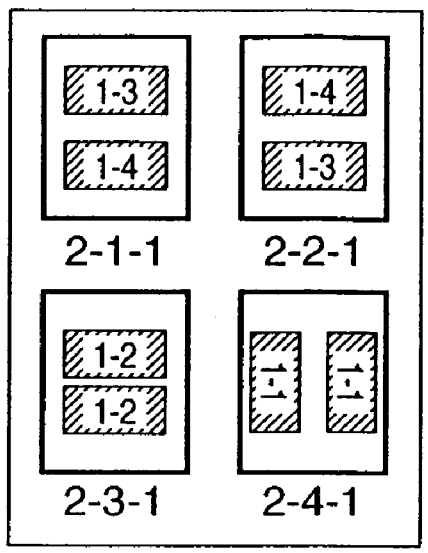
FIGS. 17A to 17D show examples of rotated detection models used to detect secondary features.
Figure 17B:
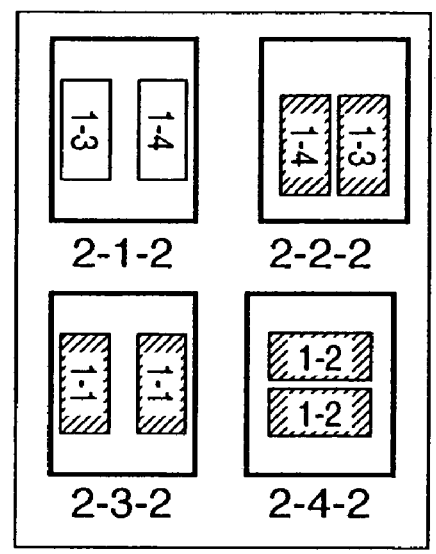
Figure 17C:
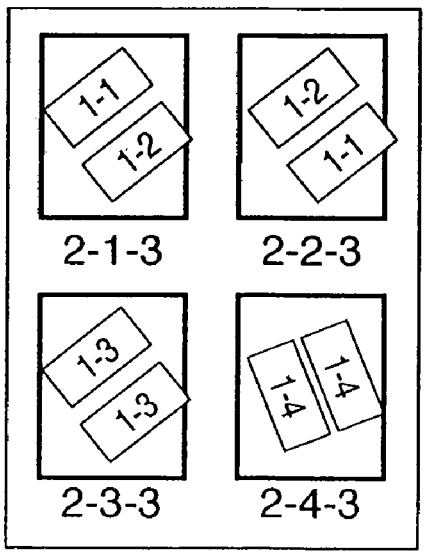
Figure 17D:
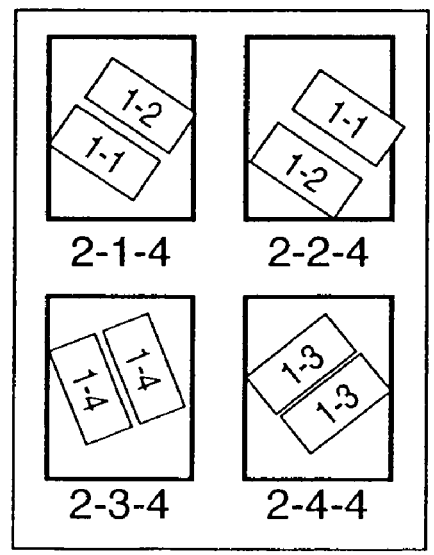

FIG. 17A shows a detection model group used to detect secondary features of faces rotated about 0° and 180° if a front, erected face is 0°, FIG. 17B shows a detection model group used to similarly detect secondary features of faces rotated about 90° and −90°, FIG. 17C shows a detection model group used to similarly detect secondary features of faces rotated about 45° and −135°, and FIG. 17D shows a detection model group used to similarly detect secondary features of faces rotated about −45° and 135°. Note that reference numerals 1-1 to 1-4 in these detection models denote regions which include images having primary features denoted by the same reference numerals as in FIG. 14.

Each of the detection model groups shown in FIGS. 17A to 17D includes four different detection models used to detect four different secondary features, i.e., the right-open V-shaped feature 2-1-1, left-open V-shaped feature 2-2-1, horizontal parallel line feature 2-3-1, and vertical parallel line feature 2-4-1, and the number of each detection model indicates a secondary feature shown in FIG. 14 to be detected that detection model. Note that the names of these right-open V-shaped feature, left-open V-shaped feature, horizontal parallel line feature, and vertical parallel line feature are determined when a face is erected. For this reason, for example, in FIG. 17A, the horizontal parallel line feature 2-3-1 includes two lines that extend parallel to each other, and matches its name. However, when this feature is rotated 90°, as shown in FIG. 17B, a feature named "horizontal parallel line feature" indicates two lines extending in the vertical direction in practice, as indicated by 2-3-2. In this way, the feature names and the shapes represented by the actual features do not often correspond to each other as a result of rotation.

Note that the rectangular regions denoted by reference numerals 1-1 to 1-4 in FIGS. 17A to 17D are regions where the primary features detected in step S202 are present, and the reference numerals and features assigned to these regions are the same as those of the primary features shown in FIG. 14. When only primary features indicated by the corresponding numbers are present in these rectangular regions, it is determined a feature to be detected by that detection model is present. Therefore, when secondary features are detected using all these detection models, they can be detected even from a rotated (inclined) face.

The secondary feature detection models are set by the secondary feature detection model setting section 1312 shown in FIG. 13. In addition, such a plurality of detection models may be prepared from the beginning. For example, detection models used to detect secondary features of faces rotated about 0° or 180° shown in FIGS. 17A to 17D may be prepared, and these models may undergo rotation transformation and the process for changing the types of primary features to be detected by the secondary feature detection filter setting section 1311. Note that secondary feature detection models shown in FIGS. 17A to 17D include identical models. However, all these identical detection models are illustrated for the sake of convenience, and need not be prepared in actual processes.

The secondary feature detection section 1302 detects secondary features using the detection models set in this way. That is, detection of a secondary feature can be made using the values of primary features which form that secondary feature, and can be determined by checking if the values of primary features in the respective regions set in the detection model are equal to or larger than a threshold value. For example, a case will be described blow a right-open V-shaped feature is detected as a secondary feature at a predetermined position using the right-open V-shape detection model 2-1-1 for 0°. In this case, when the maximum value of the upward-sloping feature 1-3 present in the upward-sloping region 403 is higher than a threshold value, and the maximum value of the downward-sloping feature 1-4 present in the downward-sloping region 404 is higher than a threshold value, as shown in FIG. 16B, it is determined that the right-open V-shaped feature is present at that position. As the value at that position (secondary feature amount), the average of these maximum values is calculated. Conversely, when either one of primary feature values (primary feature amounts) in these regions is lower than the threshold value, it is determined that no secondary feature is present at that position, and the value at that position is set to be zero.

The detection result obtained in this way is output in the form of a detection result image with the same size as that of the input image for each secondary feature. More specifically, by checking the value of each position of the detection result image of each feature, whether or not a secondary feature in each rotation direction is present at that position of the input image can be determined.

Therefore, the process in this step S203 is characterized in that primary features are not detected again in the respective regions of the secondary feature detection models. That is, upon detecting the right-open V-shaped feature 2-1-1 as one of secondary features, the upward-sloping feature 1-3 and downward-sloping feature 1-4 are not detected again in the upward-sloping and downward-sloping regions. These primary features have already been detected in the process of step S202, and whether or not the primary features are present in these regions is checked in step S203 using the threshold values. If it is determined that a plurality of primary features are present in these regions, it is determined that the secondary feature is present at that position. The same feature detection processing method applies to tertiary and quartic features. In this way, the processing cost can be reduced.

After the secondary features are detected, the tertiary feature detection model selection section 1313 selects tertiary feature detection models (step S204). For example, a case will be examined wherein an eye feature (3-1-1 to 3-1-4 in FIG. 14) is detected from the secondary features detected in step S203. FIGS. 19A and 19B show examples of eye detection models used to detect an eye feature by the tertiary feature detection section 1303.

FIG. 19A shows an eye detection model 700 used to detect an eye feature (3-1-1 in FIG. 14) rotated near 0° or 180° when the erected face is 0°. The eye feature rotated about 0° or 180° can be detected when a combination that includes the right-open V-shaped feature 2-1-1 as a secondary feature amount rotated 0° on the left side, the left-open V-shaped feature 2-2-1 on the right side, and horizontal and vertical parallel line features 2-3-1 and 2-4-1 between these V-shaped features is satisfied. Therefore, the eye detection model 700 is formed by setting a right-open V-shape region 701 that detects the right-open V-shaped feature 2-1-1 on the left side, a left-open V-shape region 702 that detects the left-open V-shaped feature 2-2-1 on the right side, and a horizontal parallel region 703 that detects a horizontal parallel line feature 2-3-1 and a vertical parallel region 704 that detects the vertical parallel line feature 2-4-1 between these V-shape regions.

Likewise, FIG. 19B shows an eye detection model 710 used to detect an eye feature rotated about 90° or −90° (3-1-2 in FIG. 14). The eye feature rotated about 90° or −90° can be detected when a combination that includes the right-open V-shaped feature 2-1-2 as a secondary feature amount rotated 90° on the upper side, the left-open V-shaped feature 2-2-2 on the lower side, the horizontal and vertical parallel line features 2-3-2 and 2-4-2 between these V-shaped features is satisfied. Therefore, the eye detection model 710 is formed by setting a right-open V-shape region 711 that detects the right-open V-shaped feature 2-1-2 on the upper side, a left-open V-shape region 712 that detects the left-open V-shaped feature 2-2-2 on the lower side, and a horizontal parallel region 713 that detects a horizontal parallel line feature 2-3-2 and a vertical parallel region 714 that detects the vertical parallel line feature 2-4-2 between these V-shape regions. Note that detection models for 45° and 135° can be similarly implemented.

As described above, in step S204, the tertiary feature detection model selection section 1313 selects tertiary feature detection models used in tertiary feature detection in the tertiary feature detection section 1303 on the basis of secondary feature detection results detected in step S203. In order to detect tertiary features including rotation (i.e., inclined tertiary features), tertiary features 3-1-1 to 3-2-4 of all rotation angles shown in FIG. 14 may be detected using secondary features 2-1-1 to 2-4-4 of all rotation angles detected in step S203. However, this method requires very high calculation cost. Hence, in this embodiment, the tertiary feature detection model selection section 1313 selects tertiary feature models used in detection on the basis of secondary feature detection results detected in step S203 so as to limit the number of tertiary features to be detected (i.e., rotation angles to be detected), thus minimizing an increase in calculation cost. More specifically, the pattern detection device according to this embodiment is characterized by further comprising the tertiary feature detection model selection section 1313 which limits the number of high-order models (tertiary feature detection models) to be compared with patterns by the tertiary feature detection section 1303 on the basis of the feature amounts of low-order models calculated by the secondary feature detection section 1302. The same applies to quartic feature detection model selection section 1314.

Figure 18B:
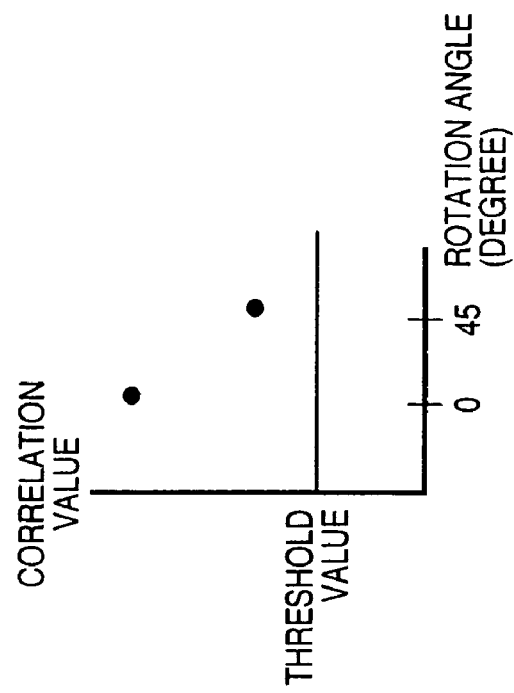
FIGS. 18A and 18B are views showing the method of selecting models in a tertiary feature detection model selection section 1313.
Figure 18A:
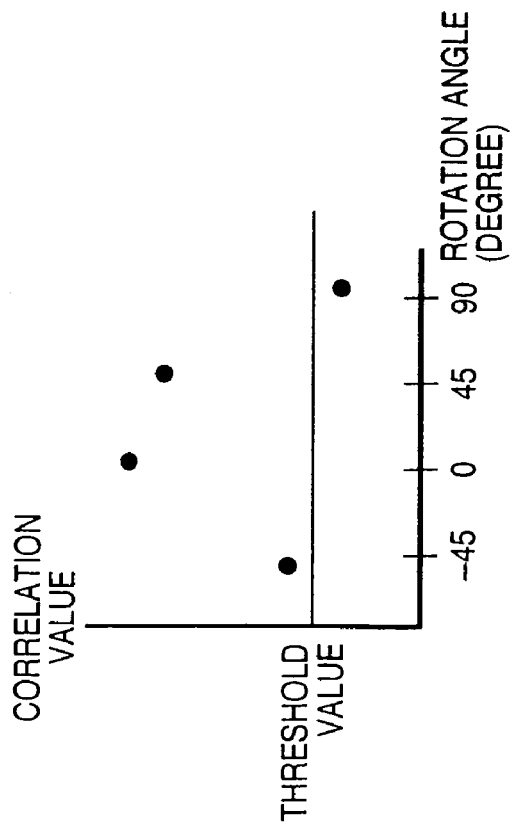

This selection is made based on detection result value (correlation value) as a secondary feature amount at each position of a detection result image of a secondary feature. FIGS. 18A and 18B show the model selection method in the tertiary feature detection model selection section 1313. The graph in FIG. 18A indicates the detection result value (correlation value) of a secondary feature at a given position: the abscissa plots the rotation angle if an erected image is 0°, and the ordinate plots the correlation value. Note that the value range of the correlation value is 0 (no correlation) to 1 (maximum correlation). The abscissa indicates the secondary feature results rotated −45°, 45°, and 90° around 0°. This is because the rotation angle upon detecting secondary features is set in increments of 45°, as shown in FIGS. 17A to 17D.

Let $S_n$ be a correlation value at angle n, and $S_{th}$ be a threshold value. As an example of a selection method, maximum $S_n$ from angles which satisfy $S_n > S_{th}$ is selected as $S_p$, and angle $\theta_p$ at that time is selected. The second largest $S_n$ is selected as $S_q$, and if $S_q > k \cdot S_p$, angle $\theta_q$ at that time is also selected. Furthermore, the third largest $S_n$ is selected as $S_r$, and if $S_r > k' \cdot S_q$, angle $\theta_r$ at that time is also selected. Note that k and k' are coefficients: for example, k'=k=0.7.

For example, k=k'=0.7, angle $\theta_p$ when the correlation value exceeds the threshold value and is a maximum correlation value $S_p$ is selected. Furthermore, if the second correlation value is larger than 70% (0.7 $S_p$) of the maximum correlation value $S_p$, i.e., $S_q > 0.7 S_p$, the angle of the second correlation value is also selected. The correlation value at that time is $S_q$. If the third correlation value is higher than 70% (0.7 $S_q$) of the second correlation value, i.e., $S_r > 0.7 S_q$, the angle of the third correlation value is also selected. The correlation value at that time is Sr.

In this embodiment, the rotation angles of tertiary features to be detected are selected by the aforementioned selection method. Therefore, if there are no angles which exceed the threshold value, the number of angles to be selected is zero; if there are angles which exceed the threshold value, the rotation angles to be selected and the number of angles are determined on the basis of the distribution of the correlation values of angles. Then, detection models corresponding to the selected rotation angles are selected.

As another selection method, in place of selecting the rotation angles of detection models used to detect tertiary features on the basis of the correlation values (i.e., feature amounts equal to or larger than a predetermined amount), a selection method of selecting a predetermined number of models with angles in descending order of correlation value may be used. The selection process in this case is done by the tertiary feature detection selection section 1313 of the pattern detection device shown in FIG. 13, and detection models to be selected are held in the tertiary feature detection model holding section 1323.

For example, assume that detection models used to detect a eye feature are prepared at rotation angle in increments of 45°. Also, FIG. 18A shows correlation values of secondary feature amounts at a given position in correspondence with rotation angles. Note that, for example, correlation values at rotation angles −45°, 0°, 45°, and 90° are respectively 0.5, 0.9, 0.8, and 0.3, threshold value Sth=0.4, and coefficient k=k'=0.7. At this time, the correlation values at rotation angles −45°, 0°, and 45° exceed the threshold value Sth, and the correlation value at 0° is maximum: Sp=0.9 and θp=0°. Since the correlation value at 45° exhibits 70% or more the correlation value at 0°, Sq=0.8 and θq=45°. Therefore, at that time, detection models used to detect an eye feature select those of 0° and 45°.

Next, the tertiary feature detection section 1303 detects tertiary features using the tertiary feature detection models set in step S204 (step S205). The tertiary feature detection method is the same as that in step S203, and whether or not the secondary features detected in step S203 are present in the detection regions of detection models selected in step S204 is checked to detect tertiary features. For example, in a detection example of an eye feature as one of the aforementioned tertiary features in association with the process in step S204, an eye feature as a tertiary feature is detected using two types of detection models (0° and 45°) at that position.

As an example of a tertiary feature detection process, an eye feature detection method using a 0° detection model will be described below. The 0° eye feature detection model corresponds to the detection model 700 in FIG. 19A above. That is, an eye feature as a tertiary feature is present at that position when four conditions are simultaneously satisfied: (1) the correlation value of the detection result of the 0° right-open V-shaped feature 2-1-1 of the secondary feature exceeds a threshold value and the correlation values of other features are relatively low in the right-open V-shape region 701 in the detection model 700, (2) the correlation value of the detection result of the 0° left-open V-shaped feature 2-2-1 of the secondary feature exceeds a threshold value and the correlation values of other features are relatively low in the left-open V-shape region 702, (3) the correlation value of the detection result of the 0° horizontal parallel line feature 2-3-1 of the secondary feature exceeds a threshold value and the correlation values of other features are relatively low in the horizontal parallel region 703, and (4) the correlation value of the detection result of the 0° vertical parallel line feature 2-4-1 of the secondary feature exceeds a threshold value and the correlation values of other features are relatively low in the vertical parallel region 704.

A 45° eye feature is similarly detected using 45° detection results of secondary features detected using 45° secondary detection models. These detection results are output to the quartic feature detection section 1304 and quartic feature detection model selection section 1314. Note that these processes are done by the tertiary feature detection section 1303 in the pattern detection device in FIG. 13.

Next, the quartic feature detection model selection section 1314 selects quartic feature detection models (step S206). The selection method in this case selects models based on the correlation values as in step S204. For example, in case of the process in step S205, the tertiary feature detection results upon selection of 0° and 45° are as shown in FIG. 18B, the correlation values at rotation angles of 0° and 45° are 0.9 and 0.6, and the threshold value is Sth=0.4. In this case, since the correlation values at both rotation angles of 0° and 45° exceed the threshold value Sth, and the correlation value at 0° is maximum: Sp=0.9 and θp=0°.

Since the correlation value at 45° is 70% or less of the correlation value at 0°, as detection models used to detect a face feature, detection models used to detect a 0° face (4-1-1 in FIG. 14) and a 180° inverted face detection (4-2-1 in FIG. 14) are selected at this time. As another method, a selection method of selecting a prescribed number of angles in descending order of correlation values may be used. These processes are executed by the quartic feature detection model selection section 1314 and detection models are held in the quartic feature detection model holding section 1324 in the pattern detection device in FIG. 1.

The quartic feature detection section 1304 detects a quartic feature using the quartic feature detection models selected in step S206 (step S207). The detection method in this case is the same as that in steps S203 and S205. When a face feature as a quartic feature is detected, the size of the detected face can be detected from the positions of the two eyes and mouth together with the rotation angle of the face. These processes are executed by the quartic feature detection section 1304 of the pattern detection device in FIG. 13.

As described above, according to the pattern detection device of the present invention, detection models used to detect respective features are prepared in correspondence with rotation angles, and detection models to be used in detection of features of the next stage are selected in accordance with the feature detection results of the previous stage. For this reason, the detection precision can be improved while minimizing an increase in calculation cost independently of rotations of features, and the detection precision of a pattern to be finally detected can be improved. The shapes of the eyes and mouth change depending on their open/close actions and expressions and, for example, the rotation angle of the right-open V-shaped feature is often different from that of a face. For this reason, in place of detecting tertiary and quartic features based on only rotation angle corresponding to a maximum correlation value of secondary features, the number of rotation angles to be used in the next stage is determined based on the correlation values, thus also improving rotation detection precision.

Figure 20:
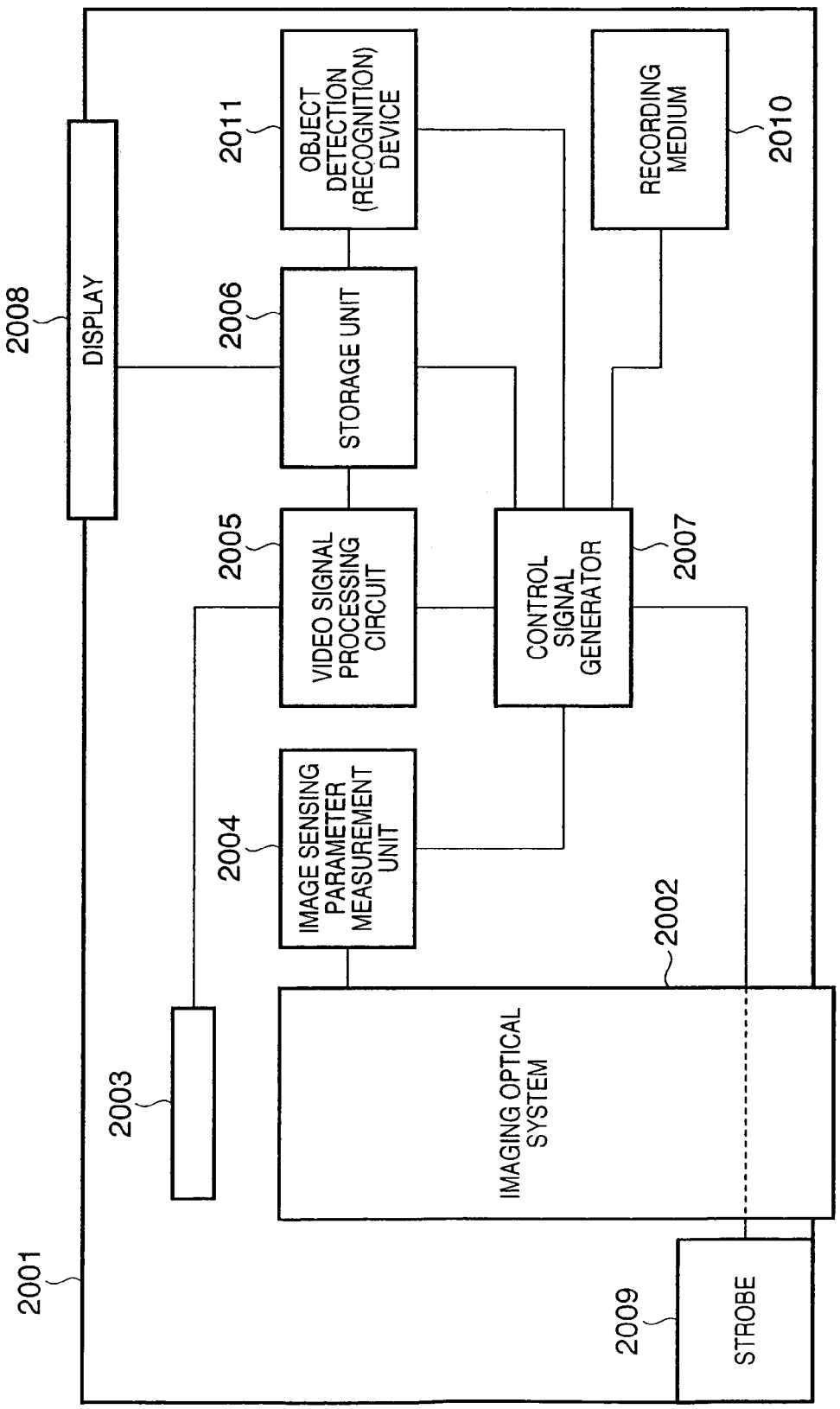
FIG. 20 is a block diagram showing the arrangement of an image sensing apparatus using a pattern detection device.

Next, a case will be explained below wherein focusing on a specific object, color correction of a specific object, or exposure control is made by arranging a pattern detection (recognition) device according to the arrangement of this embodiment or processing means that executes processes equivalent to that device in an image sensing apparatus. FIG. 20 is a block diagram showing the arrangement of an image sensing apparatus which adopts the pattern detection device according to the fourth embodiment.

An image sensing apparatus 2001 shown in FIG. 20 comprises an imaging optical system 2002 including a photographing lens and zoom photographing drive control mechanism, a CCD or CMOS image sensor 2003, an image sensing parameter measurement unit 2004, a video signal processing circuit 2005, a storage unit 2006, a control signal generator 2007 for generating signals used to control an image sensing operation, image sensing conditions, and the like, a display 2008 which also serve as a viewfinder such as an EVF (Electronic View Finder) or the like, a strobe emission unit 2009, a recording medium 2010, and also comprises the aforementioned pattern detection device a an object detection device 2011.

In the image sensing apparatus 2001 with the aforementioned arrangement, the object detection (recognition) device 2011 detects a face image of a person (i.e., detects the location, size, and rotation angle) from, e.g., a sensed video. When the position information or the like of the detected person is input from the object detection (recognition) device 2011 to the control signal generator 2007, the control signal generator 2007 generates control signals that can optimize focus control, exposure condition control, white balance control, and the like for that person on the basis of the output from the image sensing parameter measurement unit 2004.

In this manner, when the aforementioned pattern detection (recognition) device is used in the image sensing apparatus, person detection and optimal control of an image sensing operation based on that detection result can be made. In the above description, the image sensing apparatus 2001 which comprises the aforementioned pattern detection device as the object detection (recognition) device 2011 has been explained. Of course, the image sensing apparatus 2001 may install an algorithm of the aforementioned pattern detection device as a program to be executed by the CPU.

In the above description, features of a pattern to be detected are classified into four layers, primary to quartic features are detected in turn, and a pattern to be detected is finally confirmed. However, the number of layers is not limited to four. For example, three layers or less, or five layers or more may be used. The same applies to the second embodiment and the sixth embodiment to be described later.

Fifth Embodiment

Figure 21:
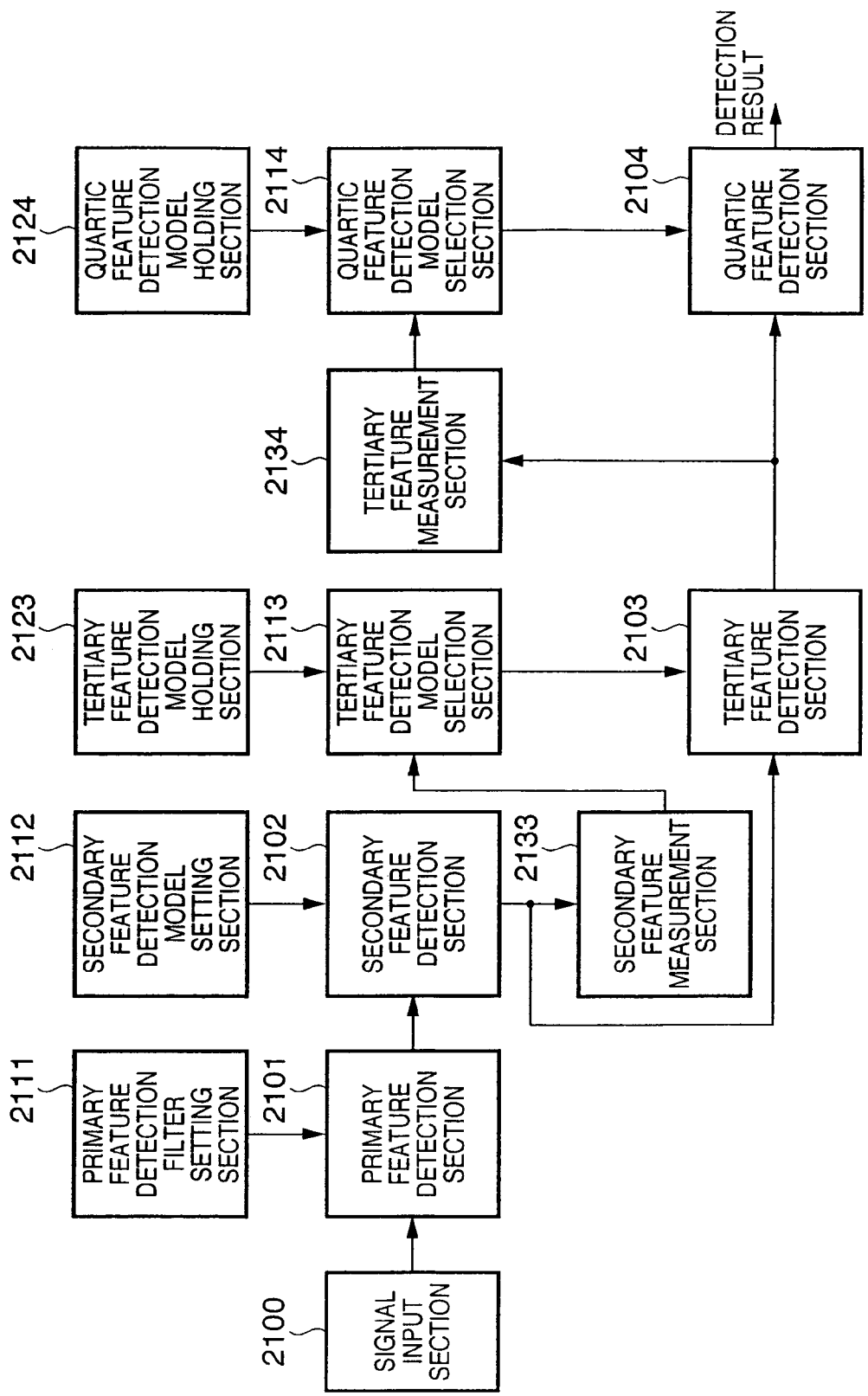
FIG. 21 is a block diagram showing the arrangement of a pattern detection device according to the first embodiment of the present invention.

FIG. 21 is a block diagram showing the arrangement of a pattern detection device according to the fifth embodiment of the present invention. Referring to FIG. 21, reference numeral 2100 denotes a signal input section; 2101, a primary feature detection section; 2111, a primary feature detection filter setting section; 2102, a secondary feature detection section; 2112, a secondary feature detection model setting section; 2103, a tertiary feature detection section; 2113, a tertiary feature detection model selection section; 2123, a tertiary feature detection model holding section; 2133, a secondary feature measurement section; 2104, a quartic feature detection section; 2114, a quartic feature detection model selection section; 2124, a quartic feature detection model holding section; and 2134, a tertiary feature measurement section.

The building components of the pattern detection device shown in FIG. 21, which are different from those in the fourth embodiment, are basically the secondary feature measurement section 2133, tertiary feature measurement section 2134, tertiary feature detection model selection section 2113, and quartic feature detection model selection section 2114.

In the fourth embodiment, as the operation of the entire pattern detection device, the tertiary feature detection model selection section 1313 selects detection models used upon detecting tertiary features on the basis of the output values from the secondary feature detection section 1302. The quartic feature detection model selection section 1314 selects detection models used upon detecting quartic features on the basis of the output values of the tertiary feature detection section 1303. By contrast, in this embodiment, the tertiary feature detection model selection section 2113 selects detection models used upon detecting tertiary features on the basis of the outputs from the secondary feature measurement section 2133, unlike in the fourth embodiment. Likewise, the quartic feature detection model selection section 2114 selects detection models used upon detecting quartic features on the basis of the output values from the tertiary feature measurement section 2134, unlike in the fourth embodiment.

The operations of the secondary feature measurement section 2133 and tertiary feature measurement section 2134 will be described below. The secondary feature measurement section 2133 measures the rotation angle of a secondary feature on the basis of the output from the secondary feature detection section 2102. The tertiary feature measurement section 2134 measures the rotation angle of a tertiary feature on the basis of the output from the tertiary feature detection section 2103. Each of these rotation angles θa is calculated by, e.g.:

$$\theta a = \frac{\sum_i (Si * \theta i)}{\sum_i Si} \quad (1)$$

where θi is each individual angle, and Si is the correlation value at that angle. The angle and correlation value used in this calculation may use all angles calculated by the secondary feature detection section 2102 (or tertiary feature detection section 2103), or may use angles equal to or larger than a threshold value, or may select a value predetermined percentage or higher than a maximum correlation value, as in the fourth embodiment. At the same time, the secondary feature measurement section 2133 (or tertiary feature measurement section 2134) outputs angles corresponding to two upper correlation values of those which are used to calculate that angle. Note that equation (1) estimates a rotation angle θa of a secondary or tertiary feature from detection results of discrete angles. In this embodiment, this equation is not particularly limited, and other formulas may be used.

The operations of the tertiary feature detection model selection section 2113 and quartic feature detection model selection section 2114 will be explained below. Since the operations of these two feature detection model selection sections are basically the same, only the tertiary feature detection model selection section 2113 will be exemplified below.

Figure 22:
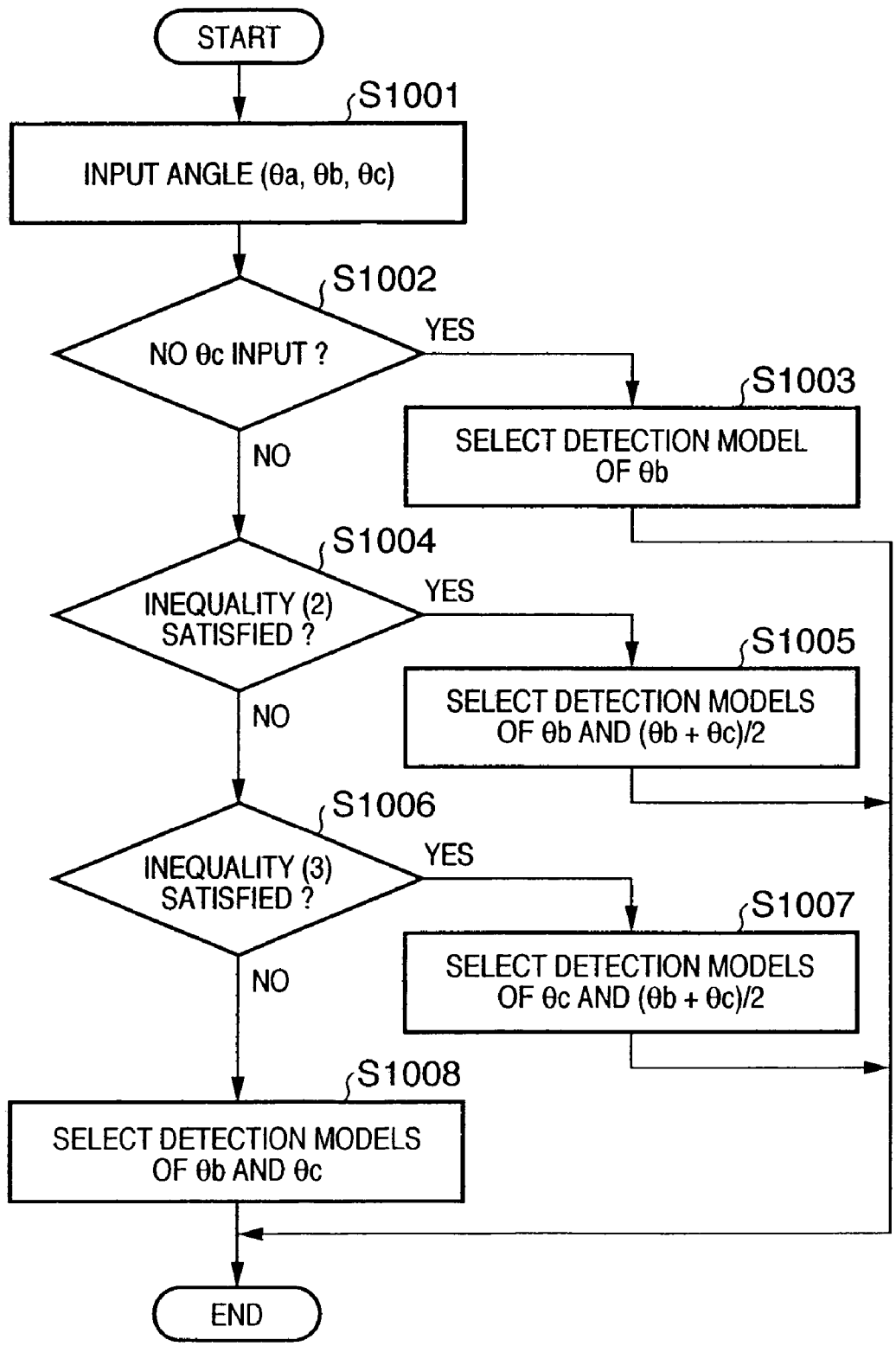
FIG. 22 is a flowchart for explaining the operation of a tertiary feature detection model selection section according to the fifth embodiment.

FIG. 22 is a flowchart for explaining the operation of the tertiary feature detection model selection section 2113 of the pattern detection device according to the fifth embodiment. The rotation angle θa calculated by the secondary feature measurement section 2133, and rotation angles θb and θc (θb<θc) corresponding to upper two correlation values of detection results of those which are used to calculate the rotation angle θa and used to detect features of previous stage are input to the tertiary feature detection model selection section 2113 (step S1001). When only one angle is selected upon calculation in the secondary feature measurement section 2133, only one angle θb (=θa) is input.

The tertiary feature detection model selection section 2113 checks if no θc is input (step S1002). As a result, if no θc is input but only θb is input (Yes), detection models used to detect tertiary features of the rotation angle θb are selected (step S1003). On the other hand, if two angles θb and θc are input (No), the tertiary feature detection model selection section 2113 executes a judgment process associated with θa, θb, and θc (step S1004). This judgement process is described, e.g., by:

$$\theta b \le \theta a \le \frac{2*\theta b + \theta c}{3} \quad (2)$$

If θa, θb, and θc satisfy inequality (2) above (Yes), detection models used to detect tertiary features at two angles, i.e., the rotation angle θb and (θb+θc)/2 are selected (step S1005). On the other hand, if θa falls outside the range of inequality (2), the next judgment process associated with θa, θb, and θc is executed (step S1005). This judgment process is made, for example, based on:

$$\frac{\theta b + 2*\theta c}{3} \le \theta a \le \theta c \quad (3)$$

If θa, θb, and θc satisfy inequality (3) above (Yes), the tertiary feature detection model selection section 2113 selects detection models used to detect tertiary features at two angles, i.e., the rotation angle θc and (θb+θc)/2 (step S1007). On the other hand, if θa falls outside the range of inequality (3) (No), the tertiary feature detection model selection section 2113 selects detection models used to detect tertiary features using two angles, i.e., the rotation angles θb and θc (step S1008).

As described above, the tertiary feature detection model selection section 2113 selects detection models used to detect tertiary features by the tertiary feature detection section 2103 on the basis of the rotation angle calculated by the secondary feature measurement section 2133 and two angles used in calculations. The same applies to the operation of the quartic feature detection model selection section 2114.

Figure 23:
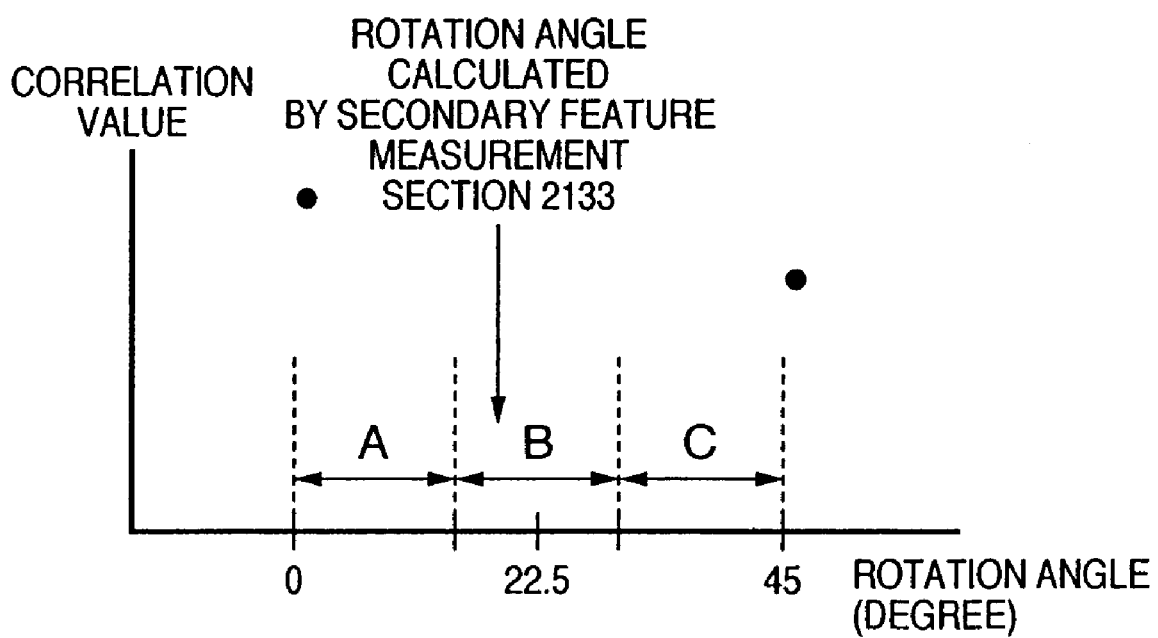
FIG. 23 is a view for explaining a detection model selection method in the fifth embodiment.

FIG. 23 is a view for explaining the detection model selection method according to the fifth embodiment. The operation of the flowchart in FIG. 22 above will be explained below using the view of FIG. 23. That is, detection models used to detect tertiary features are changed when the rotation angle calculated by the secondary feature measurement section 2133 falls within the range of A, B, and C in FIG. 23. For example, when the rotation angle calculated by the secondary feature measurement section 2133 falls within the range of B, detection models used by the tertiary feature detection section 2103 are 0° and 45° rotated detection models. On the other hand, when the rotation angle falls within the range of A, the 0° and 22.5° rotated detection models are to be used. Furthermore, when the rotation angle falls within the range of C, 22.5° and 45° rotated detection models are to be used.

In this way, if the calculated angle is closer to one of two rotation angles used in calculations, the angle interval between the angles to be detected is narrowed down, thus improving the precision of calculation of the rotation angle in the feature detection of the next stage. For this purpose, detection models used to detect tertiary features must be prepared at smaller angle intervals than those which are used to detect secondary features. Detection models used to detect quartic features must be prepared at still smaller angle intervals.

Figure 24:
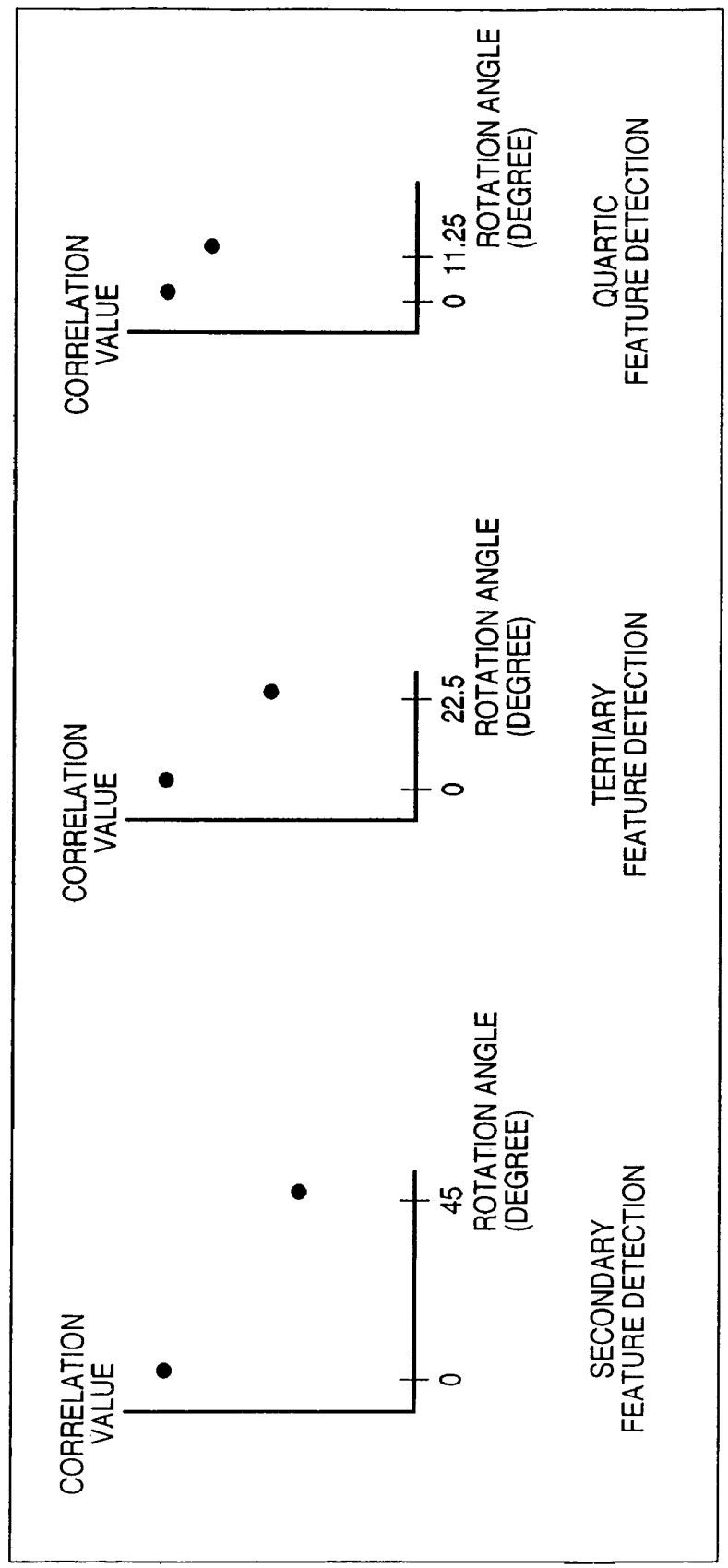
FIG. 24 is a view showing changes in rotation angle of detection models in respective layers in the fifth embodiment.

For example, when secondary features are detected at 45°-intervals, tertiary features must be prepared in increments of 22.5°. In this way, the rotation angle intervals of detection models are narrowed down as detection progresses to the secondary, tertiary, and quartic features, as shown in FIG. 24, and the detection precision can be improved, although it depends on an object to be detected. That is, FIG. 24 shows a change in rotation angle of detection models in the respective layers of the fifth embodiment.

When no detection result of the previous stage corresponding to the rotation angle of the selected detection model is available, detection results at two rotation angles which sandwich the rotation angle are used. For example, when a 22.5° rotated detection model is selected as that used in the tertiary feature detection section 2103, 0° and 45° rotated secondary features detected by the secondary feature detection section 2102 are used in detection using that detection model.

Note that inequalities (2) and (3) are used to compare the rotation angle θa of the secondary or tertiary feature measured by the secondary or tertiary feature measurement section 2133 or 2134 and the rotation angle θi upon detecting that feature of the previous stage, and to determine if the measured rotation angle θa is closer to a given rotation angle θi of those used in detection. Therefore, the present invention is not limited to these inequalities, and other judgment methods may be used.

As described above, according to the pattern detection device of this embodiment, detection models used to detect respective features are prepared by reducing angular widths for features of higher orders, and a detection model used to detect a feature of the next stage is selected in accordance with the detection result of a feature of the previous stage. Therefore, the detection precision can be improved irrespective of rotation of features while suppressing an increase in calculation cost, and higher detection precision can be assured for features of higher order.

When an image sensing apparatus has a pattern detection (recognition) device according to the arrangement of the fifth embodiment and processing means that executes a pattern detection method, the image sensing apparatus with the aforementioned effect can be realized as in the fourth embodiment.

Sixth Embodiment

Figure 25:
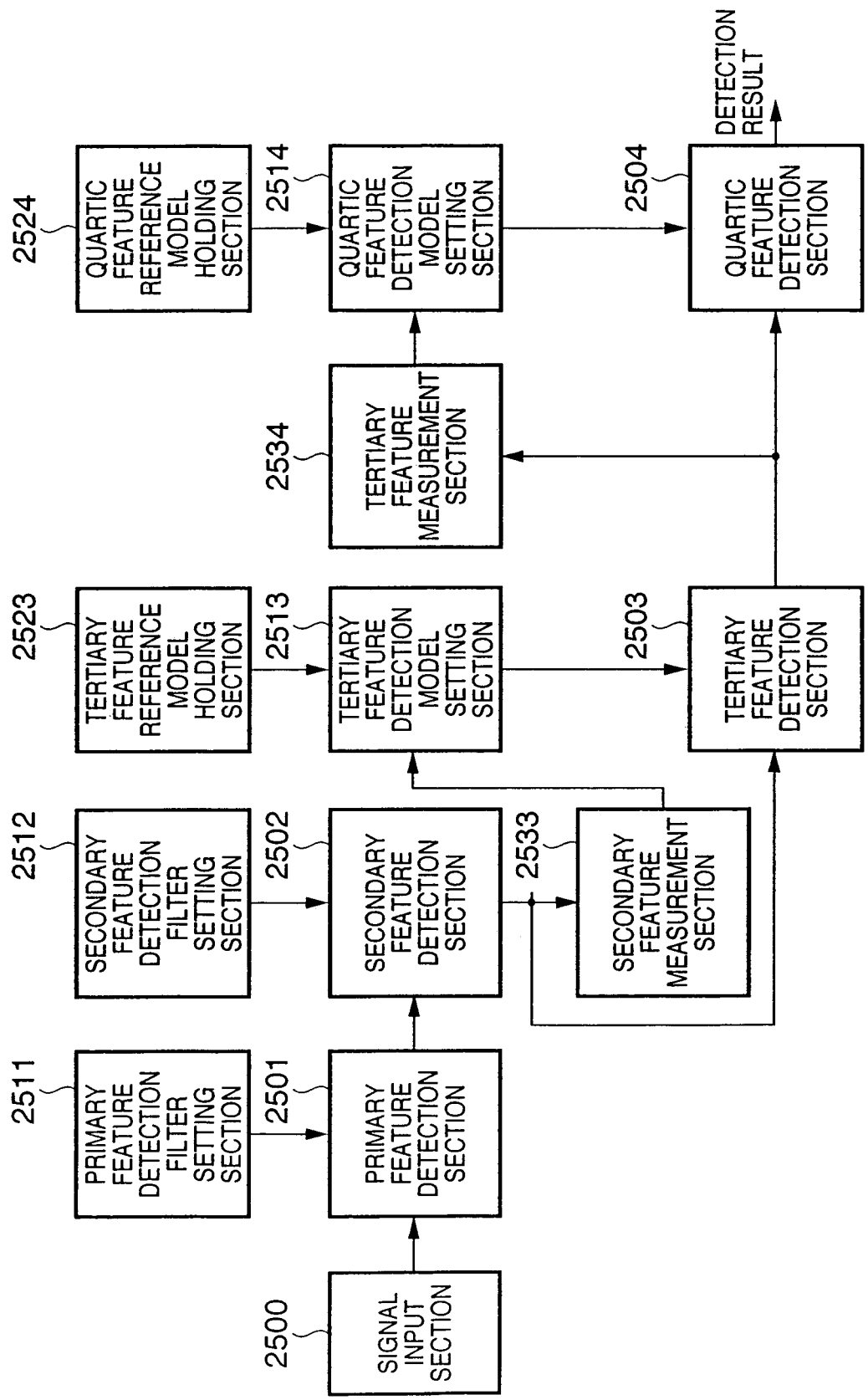
FIG. 25 is a block diagram showing the arrangement of a pattern detection device according to the sixth embodiment.

FIG. 25 is a block diagram showing the arrangement of a pattern detection device according to the sixth embodiment of the present invention. Referring to FIG. 25, reference numeral 2500 denotes a signal input section; 2501, a primary feature detection section; 2511, a primary feature detection filter setting section; 2502, a secondary feature detection section; 2512, a secondary feature detection model setting section; 2503, a tertiary feature detection section; 2513, a tertiary feature detection model setting section; 2523, a tertiary feature reference model holding section; 2533, a secondary feature measurement section; 2504, a quartic feature detection section; 2514, a quartic feature detection model setting section; 2524, a quartic feature reference model holding section; and 2534, a tertiary feature measurement section.

The building components of the pattern detection device shown in FIG. 25, which are different from those in the fifth embodiment, are basically the tertiary feature detection model setting section 2513, quartic feature detection model setting section 2514, tertiary feature reference model holding section 2523, and quartic feature reference model holding section 2524.

In the fifth embodiment, the tertiary feature detection model selection section 2113 selects a detection model used upon detecting a tertiary feature from the tertiary feature detection model holding section 2123 on the basis of the output from the secondary feature measurement section 2133. Likewise, the quartic feature detection model selection section 2114 selects a detection model used upon detecting a quartic feature from the quartic feature detection model holding section 2124 on the basis of the output from the tertiary feature measurement section 2134.

By contrast, in the pattern detection device according to this embodiment, the tertiary feature detection model setting section 2513 sets a detection model used upon detecting a tertiary feature from reference models held in the tertiary feature reference model holding section 2523 on the basis of the secondary feature measurement section 2533 unlike in the fifth embodiment. Also, the quartic feature detection model setting section 2514 sets a detection model used upon detecting a quartic feature from reference models held by the quartic feature reference model holding section 2524 on the basis of the output from the tertiary feature measurement section 2534, unlike in the fifth embodiment.

Figure 26:
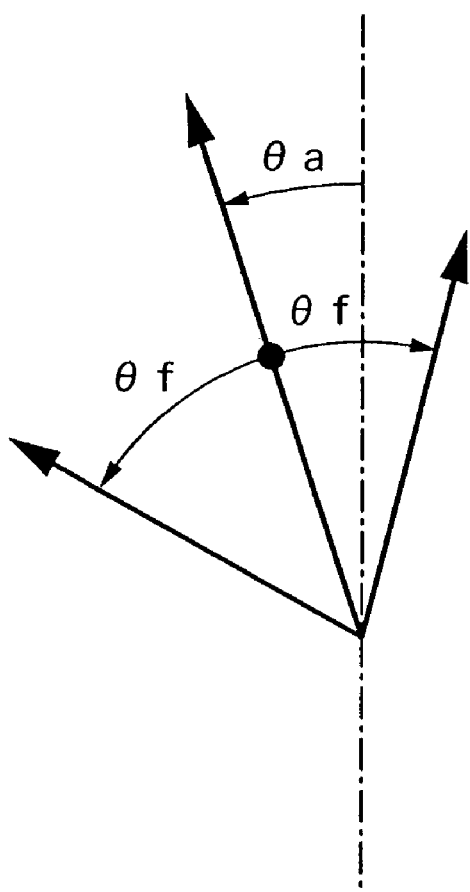
FIG. 26 shows an overview of two rotation angles θf and θa+θf in the sixth embodiment.

The operations of the tertiary feature detection model setting section 2513 and quartic feature detection model setting section 2514 will be described below. Since the operations of these two feature detection model setting sections are basically the same, the tertiary feature detection model setting section 2513 will be exemplified below. The tertiary feature detection model setting section 2513 receives the output from the secondary feature measurement section 2533 as a parameter, and calculates θd using:

$$\theta d = \sqrt{\frac{\sum_i (\theta i - \theta a)^2 Si}{\sum_i Si}} \quad (4)$$

where θi is each individual angle, Si is the correlation value of that angle, and θa is the rotation angle given by equation (1) described in the fifth embodiment. Next, θe is calculated by:

$$\theta e = \alpha * P^{2-n} \quad (5)$$

where n represents the layer. For example, since a detection model of a tertiary feature is to be set in this case, n=3. Also, α is an initial angle (e.g., 45°). P is an arbitrary positive real number (e.g., 2). A larger one of θd and θe is selected as θf. Detection models of two rotation angles calculated by θa±θf are set. FIG. 26 shows an overview of two rotation angles θf and θa+θf in the sixth embodiment.

Detection models are set by computing the rotation transforms of a reference model held by the tertiary feature reference model holding section 2523 using the calculated rotation angles θa±θf. The same applies to the operation of the quartic feature detection model setting section 2514. Note that equation (4) above calculates the rotation angle interval of detection models of a tertiary or quartic feature from the rotation angle θa and detection results at discrete angles. However, If the angle calculated by equation (4) becomes very small, the detection precision becomes poor. Hence, this embodiment calculates equation (5), and a larger one of angles calculated by equations (4) and (5) is selected upon setting an angle. Note that the setting method of a detection model in this embodiment is not limited to the aforementioned method. For example, other methods may be used as long as appropriate rotation angle intervals of the detection models of tertiary or quartic features can be set.

The tertiary feature detection section 2503 (or quartic feature detection section 2504) detects tertiary features (or quartic features) using the detection models rotated at the above two rotation angles. If no detection result of the previous stage, which corresponds to the rotation angle of the selected detection model, is available, detection results at two rotation angles that sandwich the rotation angle are used, or a detection result at a rotation angle closest to that rotation angle is used.

As described above, according to this embodiment, detection models used to detect features of the next stage are set to always sandwich the angle of a detection result on the basis of that detection angle of the feature of the previous stage. In this case, the angles used to sandwich the angle are adjusted based on the detection result values. Hence, the detection precision can be improved irrespective of rotation of features while suppressing an increase in calculation cost.

Note that the pattern detection (recognition) device of this embodiment and processing means that runs the pattern detection method may be equipped in an image sensing apparatus as in the fourth and fifth embodiments.

Seventh Embodiment

Figure 27:
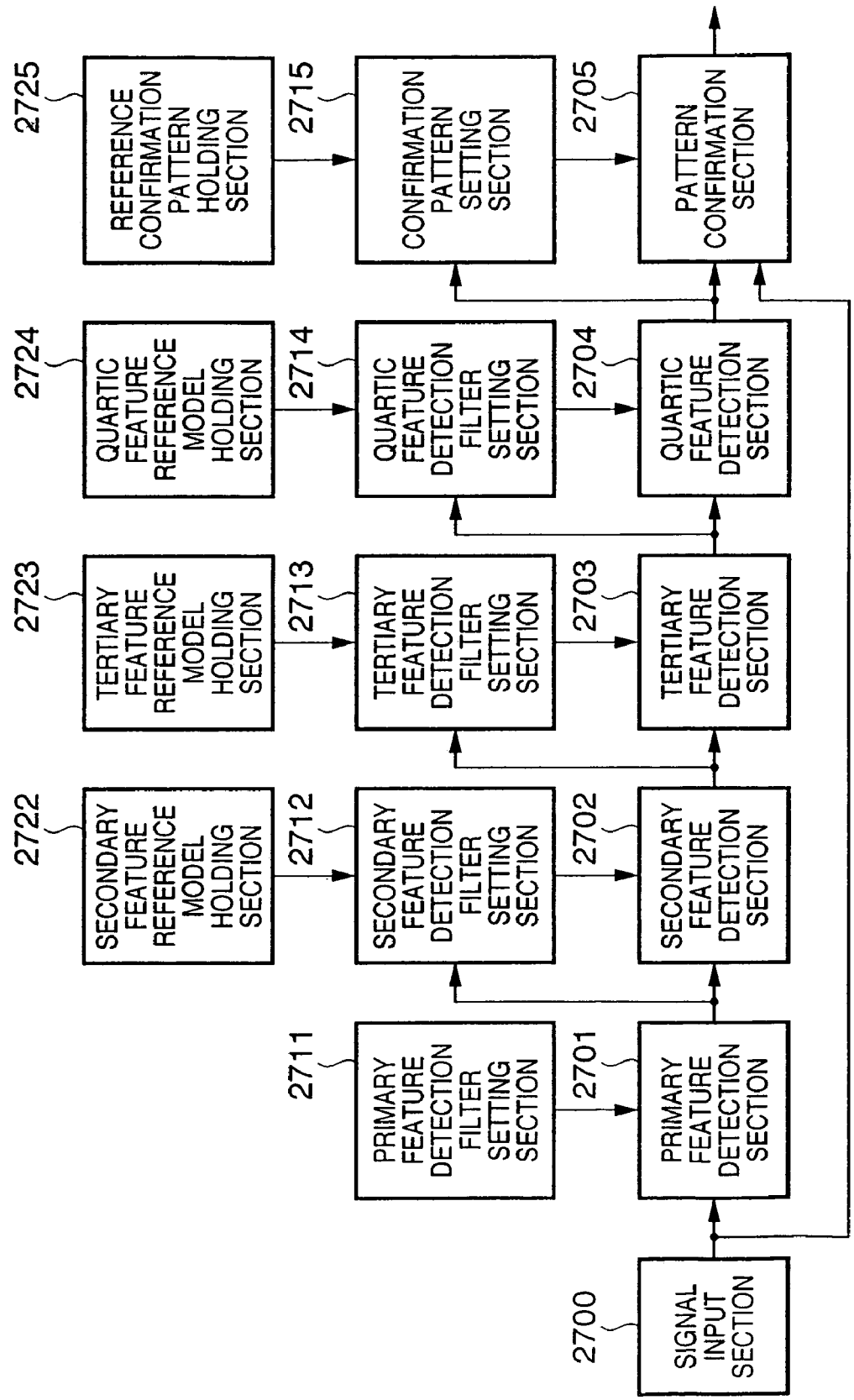
FIG. 27 is a block diagram showing the arrangement of a pattern detection device in the seventh embodiment.

FIG. 27 shows the functional arrangement of a pattern recognition device according to the seventh embodiment.

A pattern detection device of this embodiment can be applied to an image sensing apparatus or the like. The device holds a plurality of reference data used to hierarchically detect a plurality of features that form an object to be recognized from a target image upon detecting all objects (patterns) to be recognized in the target image, and sets data used to detect a feature to be recognized using a parameter calculated from the detection result of a feature of the previous stage on the basis of the reference data. Hence, even when the target image includes a plurality of objects to be recognized with different sizes, all objects to be recognized can be efficiently detected with lower processing cost.

The pattern detection device of this embodiment comprises a signal input section 2700, primary feature detection section 2701, primary feature detection filter setting section 2711, secondary feature detection section 2702, secondary feature detection model setting section 2712, secondary feature reference model holding section 2722, tertiary feature detection section 2703, tertiary feature detection model setting section 2713, tertiary feature reference model holding section 2723, quartic feature detection section 2704, quartic feature detection model setting section 2714, quartic feature reference model holding section 2724, pattern confirmation section 2705, confirmation pattern setting section 2715, and reference confirmation pattern holding section 2725, as shown in FIG. 27.

The signal input section 2700 inputs a signal (a signal of a target image in this case) such as an image signal, audio signal, or the like as an object to be processed.

The primary feature detection section 2701 applies a signal for detecting primary features to the signal input from the signal input section 2700, supplies this processing result (primary feature detection result) to the secondary feature detection section 2702, and supplies the primary feature detection result and its parameter to the secondary feature detection model setting section 2712.

At this time, the primary feature detection filter setting section 2711 sets filter characteristics or parameter required for the primary feature detection section 2701 to detect primary features.

The secondary feature detection section 2702 applies a process for detecting secondary features to the primary feature detection result from the primary feature detection section 2701 using a detection model set by the secondary feature detection model setting section 2712, supplies the processing result (secondary feature detection result) to the third feature detection section 2703, and supplies the secondary feature detection result and its parameter to the tertiary feature detection model setting section 2713.

At this time, the secondary feature detection model setting section 2712 sets models used upon detecting secondary features by the secondary feature detection section 2702 and indicate positional relationships of the primary features, using the reference models held by the secondary feature reference model holding section 2722, the primary feature detection result from the primary feature detection section 2701, and its parameter.

The secondary feature reference model holding section 2722 holds reference models of detection models to be set by the secondary feature detection model setting section 2712.

The tertiary feature detection section 2703 applies a process for detecting tertiary features to the secondary feature detection result from the secondary feature detection section 2702 using detection models set by the tertiary feature detection model setting section 2713, supplies this processing result (tertiary feature detection result) to the quartic feature detection section 2704, and supplies the tertiary feature detection result and its parameter to the quartic feature detection model setting section 2714.

At this time, the tertiary feature detection model setting section 2713 sets models, which are used by the tertiary feature detection section 2703 to detect tertiary features and indicate positional relationships of the secondary features, using the reference models held by the tertiary feature reference model holding section 2723, and the secondary feature detection result and its parameter from the secondary feature detection section 2702.

The tertiary feature reference model holding section 2723 holds reference models of detection models to be set by the tertiary feature detection model setting section 2713.

The quartic feature detection section 2704 applies a process for detecting a quartic feature to the tertiary feature detection result from the tertiary feature detection section 2703 using detection models set by the quartic feature detection model setting section 2714, supplies the processing result (quartic feature detection result) to the pattern confirmation section 2705, and also supplies the quartic feature detection result and its parameter to the confirmation pattern setting section 2715.

At this time, the quartic feature detection model setting section 2714 sets models which are used to detect a quartic feature by the quartic feature detection section 2704 and indicate positional relationships of tertiary features, using the reference models held by the quartic feature reference model holding section 2724, and the tertiary feature detection result and its parameter from the tertiary feature detection section 2703.

The quartic feature reference model holding section 2724 holds reference models of the detection models to be set by the quartic feature detection model setting section 2714.

The pattern confirmation section 2705 confirms whether or not the signal input from the signal input section 2700 includes a confirmation pattern set by the confirmation pattern setting section 2715.

The confirmation pattern setting section 2715 sets a confirmation pattern to be used by the pattern confirmation section 2705 using a reference pattern held by the reference confirmation pattern holding section 2725, and the quartic feature detection result and its parameter from the quartic feature detection section 2704.

The reference confirmation pattern holding section 2725 holds the reference pattern of the confirmation pattern to be set by the confirmation pattern setting section 2715.

Figure 28:
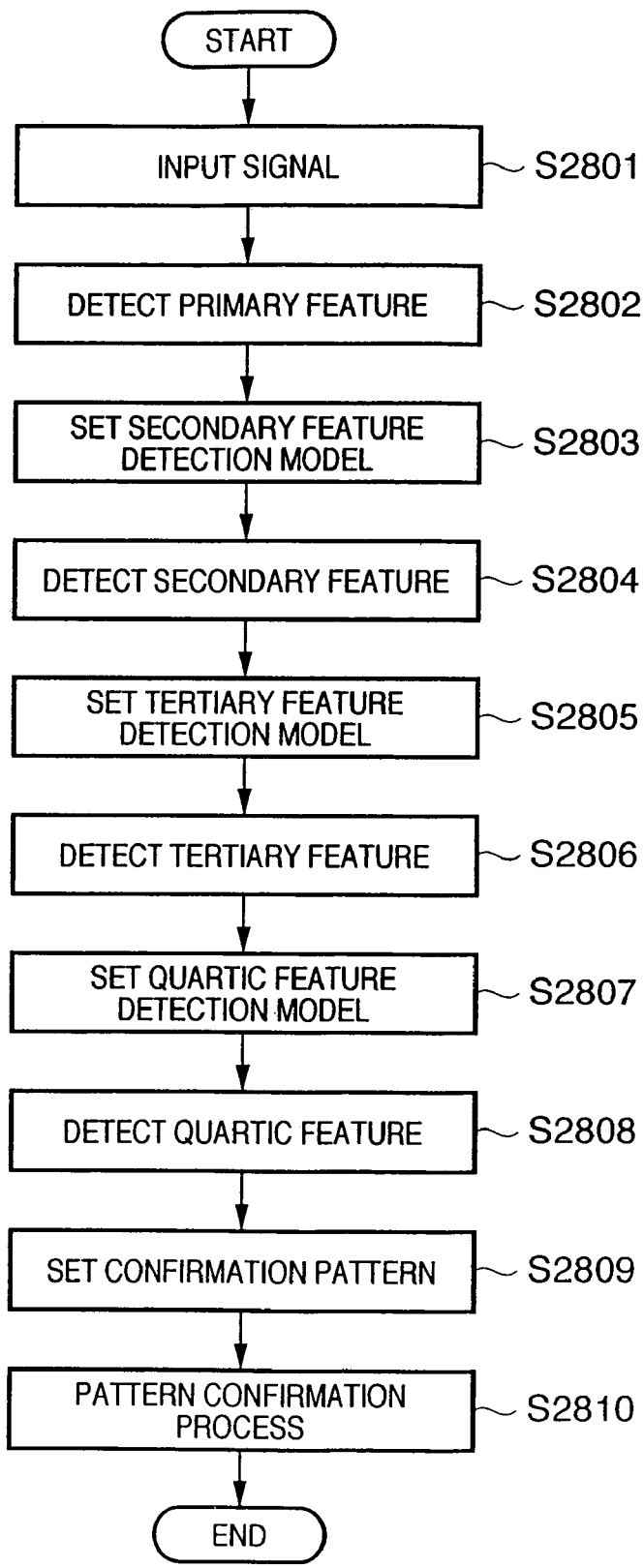
FIG. 28 is a flowchart for explaining the operation of a pattern detection device.

FIG. 28 is a flowchart showing the operation of a pattern recognition device 100.

Note that an image signal is input from a signal input 130 and a face region in that image is to be detected as an example of the pattern recognition process.

The signal input section 2700 inputs an image signal as a signal to be processed (step S2801).

The primary feature detection section 2701 detects primary features of an image (target image) formed by an image signal input from the signal input section 2700 using a filter set by the primary feature detection filter setting section 27011 (step S2802).

More specifically, as shown in, e.g., FIG. 14, the primary feature detection section 2701 detects features of different directions and different sizes such as a vertical feature large (1-1-1), horizontal feature large (1-2-1), upward-sloping feature large (1-3-1), downward-sloping feature large (1-4-1), vertical feature small (1-1-2), horizontal feature small (1-2-2), upward-sloping feature small (1-3-2), downward-sloping feature small (1-4-2), and the like, and outputs this detection result (primary feature detection result) in the form of detection result images with a size equivalent to that of the target image for respective features.

As a result, eight different detection result images of primary features are obtained. In this way, whether or not each feature is present at a corresponding position of the target image can be judged by referring to the value of that position of the detection result image of each feature.

Note that a plurality of filters to be used by the primary feature detection section 2701 may be prepared from the beginning, or the filters may be generated by the primary feature detection filter setting section 2711 using the directions and sizes as parameters.

As shown in FIG. 14, secondary features to be detected by the process to be described later includes a right-open V-shaped feature (2-1), left-open V-shaped feature (2-2), horizontal parallel line feature (2-3), and vertical parallel line feature (2-4), tertiary features include an eye feature (3-1) and mouth feature (3-2), and a quartic feature includes a face feature (4-1).

The secondary feature detection model setting section 2712 sets models used to detect secondary features by the secondary feature detection section 2702 (step S2803).

More specifically, a setting process of a detection model used to detect the right-open V-shaped feature (2-1) shown in FIG. 14 will be examined below as an example.

In the right-open V-shaped feature (2-1), as shown in, e.g., FIG. 16A, an upward-sloping feature is present in an upper portion, and a downward-sloping feature is present in a lower portion. That is, in order to detect the right-open V-shaped feature, a position where the upward-sloping feature is present in an upper portion, and the downward-sloping feature is present in a lower portion can be obtained by utilizing the primary feature detection results obtained in step S2802, and the right-open V-shaped feature (2-1) is present at that position.

In this way, a secondary feature can be detected by combining a plurality of different primary features. However, the size of a face in a target image is not fixed, and the eye and mouth sizes are different depending on individuals. Furthermore, since the eyes and mouth are opened/closed, the size of the right-open V-shape changes.

Hence, in this embodiment, a right-open V-shape detection reference model 400 shown in FIG. 16B is used. The right-open V-shape detection model 400 has an upward-sloping region 403 and downward-sloping region 404. When only the upward-sloping feature large or small of the primary features detected in step S2802 is present in the upward-sloping region 403, and only the downward-sloping feature large or small is present in the downward-sloping region 404, it is determined that the right-open V-shaped feature (2-1) is present at that position. In this manner, processes robust against changes in size and shape, and rotation to some extent can be made.

Figure 29B:
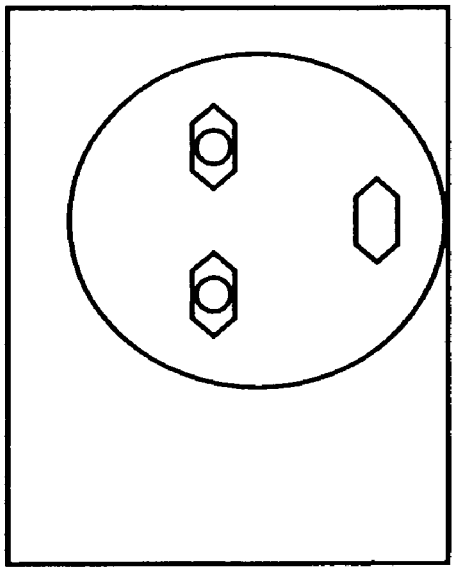
FIGS. 29A to 29D are views for explaining examples of target images of face region detection.
Figure 29D:
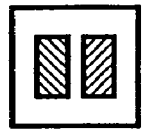
Figure 29A:
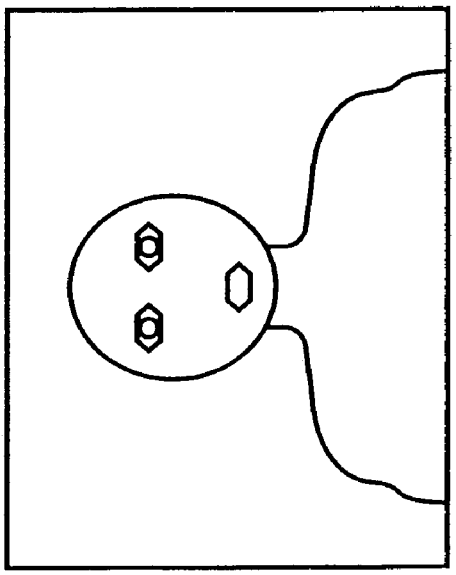

However, in order to detect right-open V-shaped features having considerably different sizes, as shown in FIGS. 29A and 29B, they cannot be detected even when an identical V-shape detection reference model 400 is used. Of course, in order to detect right-open V-shaped features with considerably different sizes as shown in FIGS. 29A and 29B using a single V-shape reference model 400, a right-open V-shape detection reference model 400 shown in FIG. 16B is set to have a very large size to assure a very broad upward-sloping region 403 and downward-sloping region 404, thus allowing detection of right-open V-shaped features with different sizes.

However, since the search range of each primary feature becomes large, for example, an upward-sloping feature has a large size, a downward-sloping feature has a small size, and their positions largely deviate from each other, thus causing detection errors.

That is, in case of the right-open V-shaped feature, the upward-sloping feature and downward-sloping feature are elements of the right-open V-shaped feature, have substantially the same sizes, and are present at neighboring positions. If the right-open V-shaped feature has a large size, both the upward-sloping feature and downward-sloping feature have a large size.

Therefore, the size of a reference model used to detect the secondary feature is set in correspondence with the sizes of primary features detected in step S2802.

As for the upward-sloping and downward-sloping features as primary features, they cannot always be detected using an identification filter size.

Hence, as shown in FIG. 29A, when the face size in the target image is small, as shown in FIG. 29A, primary features are detected using a small-size filter; when the face size in the target image is large, as shown in FIG. 29B, primary features are detected using a large-size filter. As described above, the size of a model used to detect the right-open V-shaped feature as the secondary feature is also changed depending on the sizes of filters used to detect primary features.

As described above, in this step S2803, the model used to detect each secondary feature is enlarged/reduced using the sizes of a filter used to detect the primary feature, thus setting the models used to detect secondary features.

Figure 29C:

FIG. 29C shows a right-open V-shape detection model when the face size is small, and FIG. 29D shows a right-open V-shape detection model when the face size is large. These models are obtained by changing the size of the right-open V-shape detection reference model 400 shown in FIG. 166B at different scales.

Of course, it is effective to prepare for filters of a plurality of sizes so as to detect primary features, to prepare for a plurality of processing channels in correspondence with a corresponding size, and to detect secondary features, tertiary features and so on of the corresponding size using each individual processing channel.

However, when the size variation of a face in the target image is large, if processing channels are prepared in correspondence with face sizes, the number of processing channels becomes large. That is, the processing cost increases.

Hence, in this embodiment, in feature detection of the secondary and subsequent features, the size of each detection model is changed in correspondence with the detection result of the previous layer, thus solving the aforementioned problems.

As shown in FIG. 16B, the right-open V-shape detection reference model 400, upward-sloping region 403, and downward-sloping region 404 are set in correspondence with features to be detected in advance, and are held in the secondary feature reference model holding section 2722.

Respective features shown in FIG. 14 can be detected in combinations of features detected by a pre-step process.

For example, as for the secondary features, the left-open V-shaped feature can be detected from the downward-sloping feature and upward-sloping feature, the horizontal parallel line feature can be detected from the horizontal feature, and the vertical parallel line feature can be detected from the vertical feature. As for the tertiary features, the eye feature can be detected from the right-open V-shaped feature, horizontal parallel line feature, and vertical parallel line feature, and the mouth feature can be detected from the right-open V-shaped feature, left-open V-shaped feature, and horizontal parallel line feature. As for the quartic feature, the face feature can be detected from the eye and mouth features.

The secondary feature detection section 2702 detects secondary features of the target image using the secondary feature detection models set in step S2803 (step S2804). More specifically, the secondary features are detected using primary feature values that form the secondary features. For example, whether or not each primary feature value is equal to or larger than an arbitrary threshold value is checked.

For example, when a right-open V-shaped feature of a secondary feature at a predetermined position is to be detected using the right-open V-shape detection model, and the maximum value of upward-sloping feature values present in the upward-sloping region is higher than a threshold value and the maximum value of downward-sloping feature values present in the downward-sloping region is higher than a threshold value, it is determined that the right-open V-shaped feature is present at that position. The value of that position is the average of these maximum values. When the value of each primary feature is smaller than a threshold value, it is determined that no secondary feature is present at that position, and "0" is set as the value of that position.

The secondary feature detection results are output in the form of detection result images having the same size as the target image for each secondary feature. That is, in case of secondary features shown in FIG. 14, four different secondary feature detection result images are obtained. Whether or not each secondary feature is present at a corresponding position of the target image can be determined by referring to the value of that position of these detection result images.

Note that the process in step S2804 does not detect any primary features in the respective regions of each secondary feature detection model. That is, for example, upon detecting a right-open V-shaped feature as one of secondary features, the upward- and downward-sloping regions do not detect any upward- and downward-sloping features as primary features. These primary features have already been detected in step S2802. Hence, whether or not primary features are present in these regions is determined using a threshold value in this step S2804.

As a result, if it is determined that a plurality of primary features are present in respective regions, a process for determining that secondary features are present at these positions is executed. The same feature detection processing method applies to the next tertiary and quartic features.

Figure 30:
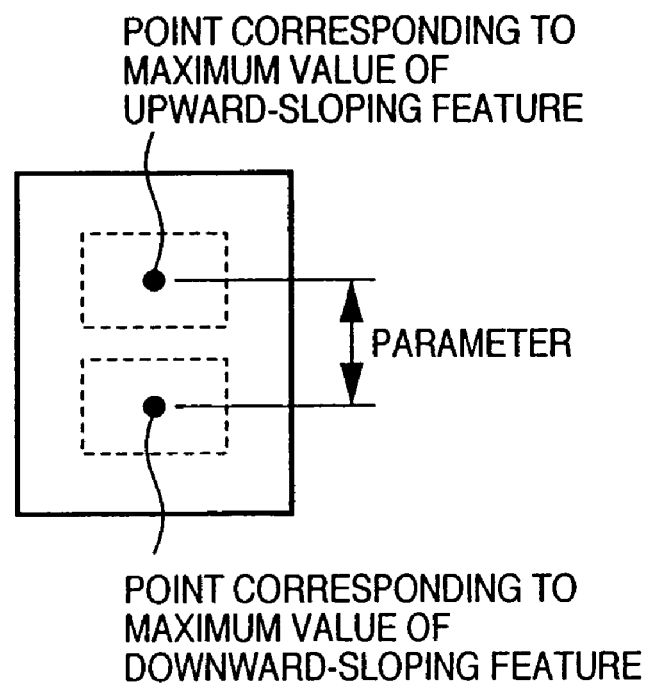
FIG. 30 is a view for explaining an example of a parameter used in face region detection.

In the process in step S2804, a parameter used to set a tertiary feature detection model is calculated. For example, a distance between a point corresponding to the maximum value of the downward-sloping feature and a point corresponding to the maximum value of the upward-sloping feature is calculated as a parameter simultaneously with detection of the right-open V-shaped feature, as shown in, e.g., FIG. 30. This parameter is output together with each secondary feature detection result.

The tertiary feature detection model setting section 2713 sets models which are used by the tertiary feature detection section 2703 upon detecting tertiary features and indicate the positional relationships of secondary features, using the reference models held in the tertiary feature reference model holding section 2723, and the secondary feature detection result and parameter from the secondary feature detection section 2702 (step S2805).

More specifically, for example, a setting process of a detection model required to detect an eye feature (3-1) shown in FIG. 14 will be examined below for the sake of simplicity.

FIG. 19A shows an example of an eye detection reference model 700 used to detect an eye. The eye detection reference model 700 has a right-open V-shape region 701 including a right-open V-shaped feature ((2-1) in FIG. 14) as a secondary feature amount on the left side, a left-open V-shape region 702 including the left-open V-shaped feature ((2-2) in FIG. 14) on the right side, and a horizontal parallel line region 703 including a horizontal parallel line feature ((2-3) in FIG. 14) and a vertical parallel line region 704 including a vertical parallel line feature ((2-4) in FIG. 14) between these V-shaped features.

In this step S2805, a tertiary feature detection model suited to detect a tertiary feature is set by enlarging or reducing this reference model so as to cope with size variations, as in step S2803. The parameter calculated in step S2804 is used to enlarge/reduce the reference model.

For example, the distance between the positions indicating the maximum values of the upward- and downward-sloping features calculated upon detecting the right-open V-shaped edge depends on the size of an eye. Hence, using this distance as a parameter, the eye feature detection model is set based on the eye reference model.

As described above, detection models according to positions are set for respective tertiary features using the parameters of the secondary features on the basis of the reference models. More specifically, when the target image includes faces with different sizes (i.e., different eye sizes), as shown in FIG. 31A, eye feature detection models suited to respective positions are set, as shown in FIG. 31B, using, as parameters, the sizes of right-open V-shaped features as secondary features.

Figure 31B:
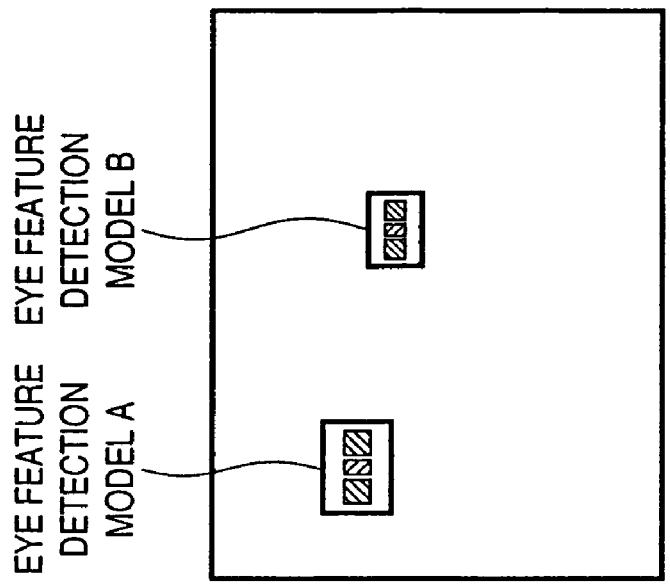
FIGS. 31A and 31B are views for explaining a difference of eye feature detection models depending on positions in a target image of eye region detection.
Figure 31A:
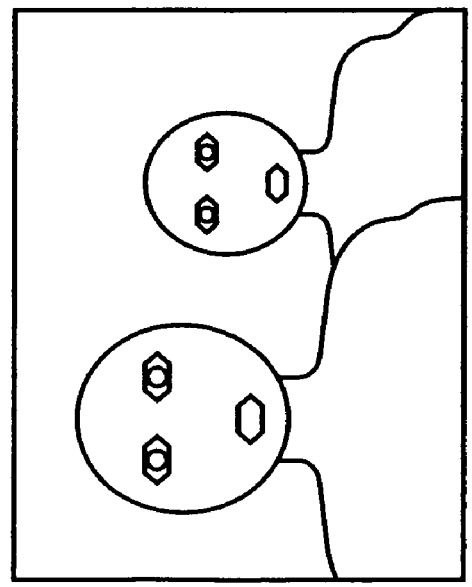

FIG. 31B conceptually shows that an eye feature detection model 801 has a size calculated based on the parameter value of a secondary feature at that position, and has a size calculated based on the parameter value of a secondary feature at the position of an eye feature detection model 802.

The tertiary feature detection section 2703 detects tertiary features using the tertiary feature detection models set in step S2805 (step S2806). The method of detecting tertiary features is the same as that in step S2804, and a detailed description thereof will be omitted. As for a parameter upon detecting an eye, the distance between the right- and left-open V-shaped features corresponding to the maximum values (i.e., the distance corresponding to the width of the eye) is calculated as a parameter.

The quartic feature detection model setting section 2714 sets a model which is used by the quartic feature detection section 2704 to detect a quartic feature and indicates the positional relationship of the tertiary features, using the reference model held by the quartic feature reference model holding section 2724, and the tertiary feature detection result and parameter from the tertiary feature detection section 2703 (step S2807).

More specifically, for example, upon detecting a face feature, since the face size normally has a relationship with the width of an eye, a face feature detection model is set based on a reference model of a face feature (4-1) shown in FIG. 14 using the parameter indicating the eye width obtained in step S2806.

The quartic feature detection section 2704 detects a quartic feature using the quartic feature detection model set in step S2807 (step S2808). Since the detection method in this step is the same as those in steps S2804, and S2806, a detailed description thereof will be omitted. As for parameters, the positions of the two eyes and mouth are set as parameters upon detecting a face feature. These parameters are used in the next step S2809.

The confirmation pattern setting section 2715 sets a confirmation pattern to be used by the pattern confirmation section 2705 using a reference pattern held by the reference confirmation pattern holding section 2725, and the quartic feature detection result and parameters from the quartic feature detection section 2704 (step S2809).

More specifically, quartic feature detection is made in the processes in steps S2801 to S2808. The background of the target image includes regions which are similar to a plurality of tertiary features which form a quartic feature, and have a similar positional relationship, detection errors may occur in the quartic feature detection.

For example, in case of face detection, the background of the target image includes regions which are similar to the two eyes and mouth, and have a similar positional relationship, these regions may be erroneously detected as a face upon detecting a face feature. Hence, a general reference pattern of a pattern to be detected is prepared, and the size and shape of this pattern are corrected on the basis of the parameters calculated in step S2808 to obtain a confirmation pattern. Using this confirmation pattern, whether or not the target image includes a pattern to be finally detected is determined.

For example, since a face is a pattern to be detected, a general reference pattern of a face is prepared, and a face confirmation pattern is calculated by modifying this reference pattern. Using this face confirmation pattern, whether or not a face pattern is included in the target image is determined.

For this reason, in step S2809 the confirmation pattern is set on the basis of the reference pattern using the parameters calculated in step S2808. That is, upon setting a face pattern, a face confirmation pattern is set based on the face reference pattern using the parameter indicating the positions of the two eyes and mouth calculated in step S2806.

Figure 32A:
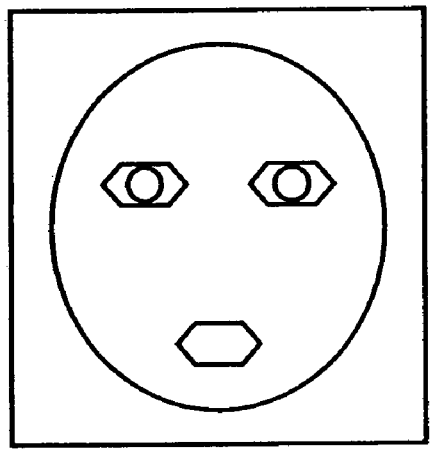
FIGS. 32A and 32B are views for explaining setups of a confirmation pattern of face region detection.
Figure 32B:
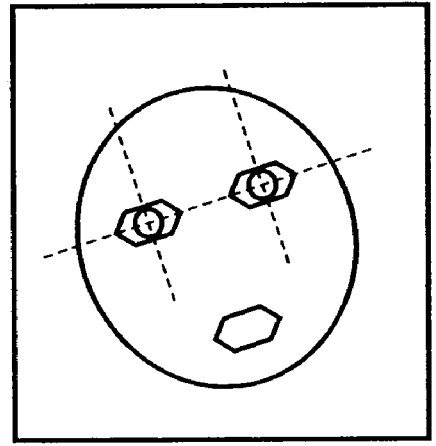

FIGS. 32A and 32B show examples of confirmation patterns. FIG. 32A shows a face reference pattern, which is formed by, e.g., preparing a plurality of faces, and calculating the average of luminance values after their sizes are normalized.

The face reference pattern shown in FIG. 32A undergoes size and rotation transformations, as shown in FIG. 32B, using the parameters calculated in step S2808, i.e., the positions of the two eyes and mouth. More specifically, for example, the size transform is calculated made using the distance between the two eyes, and the distance between the middle point of the two eyes and the mouth, and the rotation transform is calculated using the slope between the two eyes, thus setting the face confirmation pattern.

Note that the confirmation pattern setting method is not limited to the aforementioned method. For example, a plurality of reference patterns having different sizes and rotation amounts may be prepared, and one of these reference patterns may be selected using the parameters in step S2806. Alternatively, the plurality of reference patterns may be composited and set by a technique such as morphing or the like using the parameters.

The pattern confirmation section 2705 obtains a detection pattern from the target image using the confirmation pattern set in step S2809 (step S2810). More specifically, for example, a correlation between the confirmation pattern obtained in step S2809 and the partial region at the corresponding position in the target image is calculated at the detection position of the quartic feature in the target image in step S2808, and if that value exceeds an arbitrary threshold value, it is determined that a detection pattern is present at that position.

As described above, in this embodiment, reference models used to detect respective features are prepared, and detection models are set based on the reference models using parameters calculated from the feature detection result of the previous stage, thus improving the detection precision of respective features and that of a pattern to be finally detected. Upon checking a correlation with an average pattern as a final confirmation process, the average pattern undergoes modifications such as changes in rotation, size, and the like in accordance with the positions of features obtained so far, thus improving the confirmation precision.

Furthermore, when the functions of the pattern recognition (detection) device shown in FIG. 27 are applied to the image sensing apparatus shown in, e.g., FIG. 20, they can be used upon making focusing on a specific object, color correction of a specific object, or exposure control. More specifically, person detection in an image obtained by photographing and optimization control of the photographing process based on that detection result can be made.

In this embodiment, features of a pattern to be detected from the target image are classified into four layers, primary to quartic features are detected in turn, and a pattern to be detected is finally confirmed. However, the present invention is not limited to fourth layers, but may be applied to arbitrary number of layers (e.g., three layers, five layers, and the like). The same applies to the eighth and ninth embodiments to be described later.

In this embodiment, a face region is obtained from the target image using a face pattern as a detection pattern. However, the present invention is not limited to face detection. For example, a numerical value string "24" can be detected from the target image, as shown in FIG. 33A.

Figures 33A, 33B:
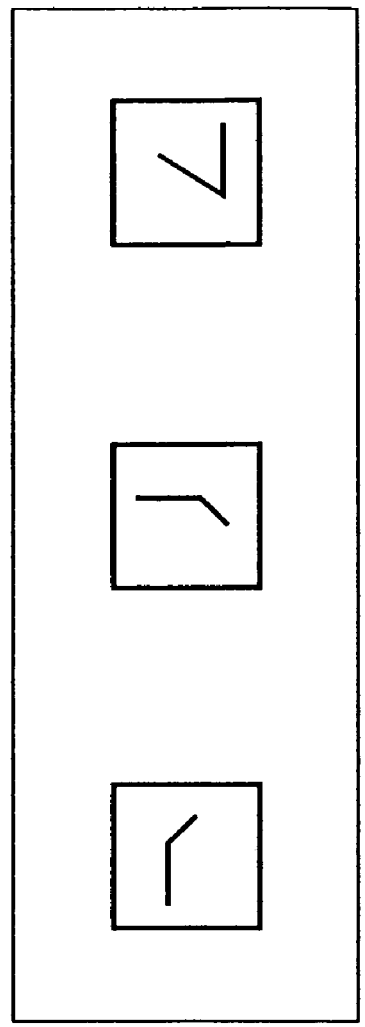
FIGS. 33A and 33B are views for explaining detection of a character string by the function of the pattern detection device.

In case of the numerical value string detection, as shown in FIG. 33B, "2" is formed of a secondary feature (upper feature) including a horizontal line segment and downward-sloping line segment, a secondary feature (intermediate feature) including a vertical line segment and upward-sloping line segment, and a secondary feature (lower feature) including an upward-sloping line segment and horizontal line segment. Furthermore, these secondary features are formed of primary features shown in FIG. 14.

Therefore, primary features are detected from the target image, secondary features are detected from the detection results of the primary features, and "2" as a tertiary feature is detected using the secondary feature detection results. Likewise, "4" is detected as a tertiary feature using the secondary feature detection results.

Based on the tertiary feature detection results "2" and "4", "24" as a quartic feature is obtained. Using the positional relationship between "2" and "4" detected as tertiary features as a parameter, a confirmation pattern of "24" is set using that parameter on the basis of a reference pattern of a numerical value string indicating "24", and a numerical value string indicating "24" is finally detected.

Eighth Embodiment

Figure 34:
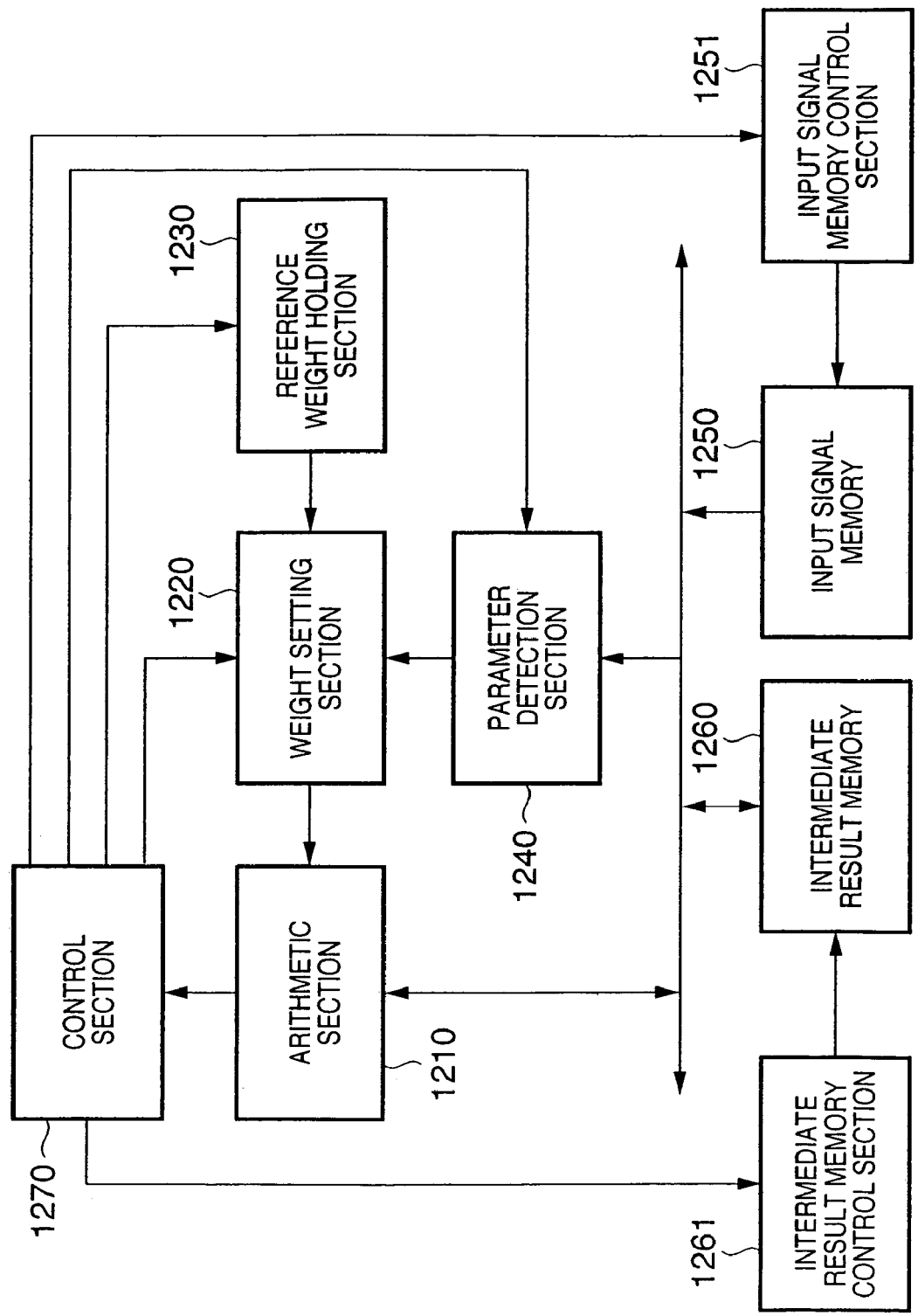
FIG. 34 is a block diagram showing the arrangement of an information processing apparatus in the eighth embodiment.

The present invention is applied to, e.g., an information processing apparatus 1200 shown in FIG. 34. The information processing apparatus 1200 of this embodiment has a function of a pattern recognition device 100 shown in FIG. 27.

The information processing apparatus 1200 includes a control section 1270, arithmetic section 1210, weight setting section 1220, reference weight holding section 1230, parameter detection section 1240, input signal memory 1250, input signal memory control section 1251, intermediate result memory 1260, and intermediate result memory control section 1261, as shown in FIG. 34.

In the aforementioned information processing apparatus, the control section 1270 controls the operation of the overall information processing apparatus. Especially, the control section 1270 implements a pattern recognition operation by controlling the arithmetic section 1210, weight setting section 1220, reference weight holding section 1230, parameter detection section 1240, input signal memory control section 1251, and intermediate result memory control section 1261.

The arithmetic section 1210 makes product sum operations of data from the input signal memory 1250 or intermediate result memory 1260 and weight data from the weight setting section 1220, and nonlinear operations based on a logistics function or the like, and holds the operation results in the intermediate result memory 1260.

The weight setting section 1220 sets weight data on the basis of reference weight data from the reference weight holding section 1230 using a parameter from the parameter detection section 1240, and supplies that weight data to the arithmetic section 1210.

The reference weight holding section 1230 holds reference weight data which serve as references upon detecting respective features in the input signal in correspondence with features, and supplies the reference weight data to the weight setting section 1220.

The parameter detection section 1240 detects a parameter used upon setting weight data in the weight setting section 1220 using data in the intermediate result memory 1260, and supplies that parameter to the weight setting section 1220.

The input signal memory 1250 holds an input signal to be processed such as an image signal, audio signal, or the like. The input signal memory control section 1251 controls the input signal memory 1250 upon holding an input signal in the input signal memory 1250 or upon supplying an input signal held in the input signal memory 1250 to the arithmetic section 1210.

The intermediate result memory 1260 holds arithmetic operation results obtained by the arithmetic section 1210. The intermediate result memory control section 1261 controls the intermediate result memory 1260 upon holding arithmetic operation results from the arithmetic sections 1210 in the intermediate result memory 1260, or upon supplying the intermediate results held in the intermediate result memory to the arithmetic section 1210 or parameter detection section 1240.

As an example of the operation of the information processing apparatus, an operation upon forming a neural network that attains image recognition by parallel hierarchical processes will be explained. That is, an input signal to be processed is an image signal as in the first embodiment.

The processing contents of the neural network will be described below with reference to FIG. 35. The neural network hierarchically handles information associated with recognition (detection) of an object, geometric feature, or the like in a local region of input data, and its basic structure corresponds to a so-called Convolutional network structure (LeCun, Y. and Bengio, Y., 1995, "Convolutional Networks for Images Speech, and Time Series" in Handbook of Brain Theory and Neural Networks (M. Arbib, Ed.), MIT Press, pp. 255-258). The output from the final layer (uppermost layer) includes the category of a recognized object, and its position information on input data.

Figure 35:
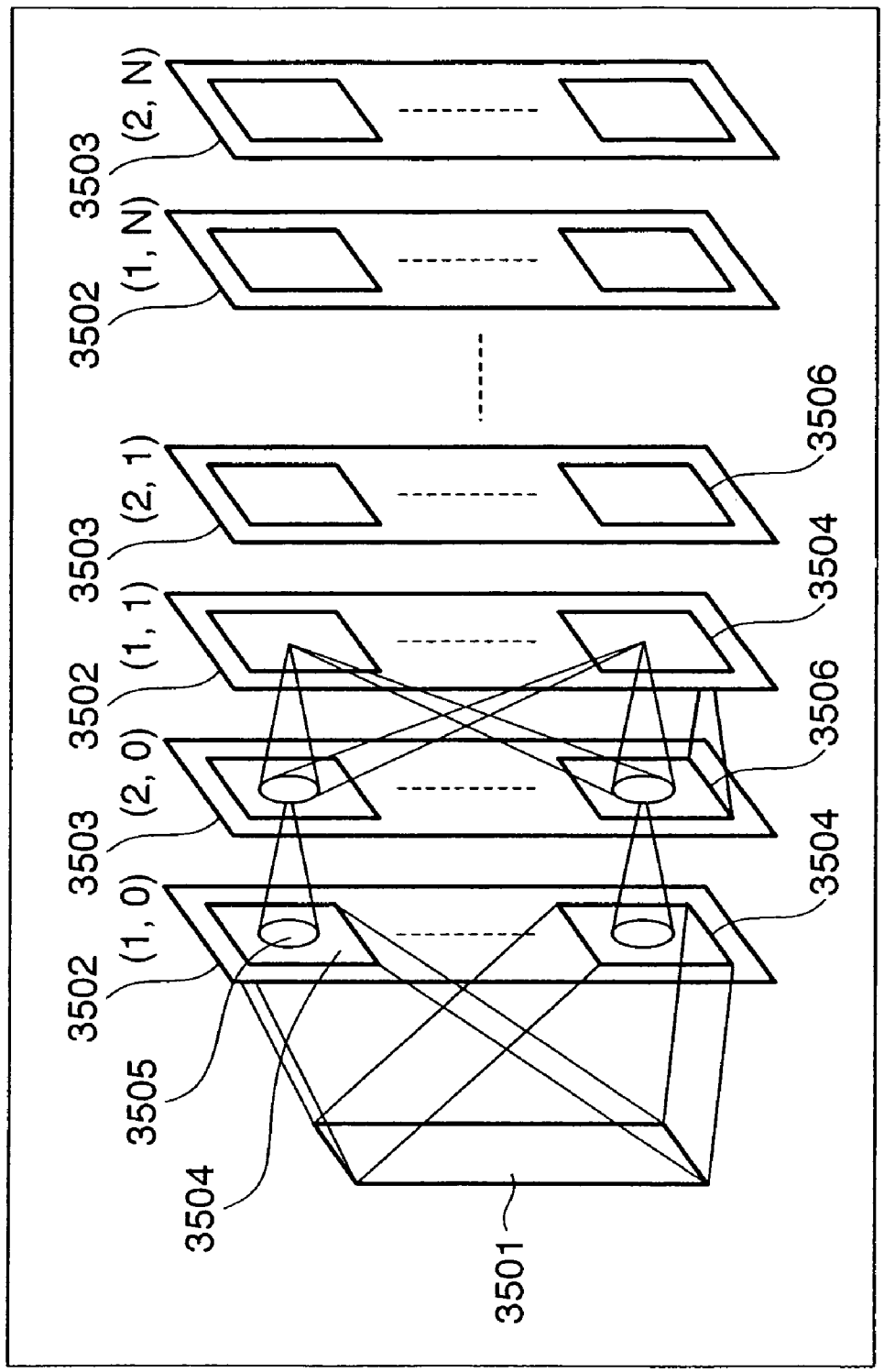
FIG. 35 is a view for explaining a Convolutional neural network structure.

Referring to FIG. 35, a data input layer 3501 is a layer for inputting local region data from a photoelectric conversion element such as a CMOS sensor, CCD element, or the like.

A first feature detection layer 3502 (1, 0) detects local, low-order features (which may include color component features in addition to geometric features such as specific direction components, specific spatial frequency components, and the like) at a single position in a local region having, as the center, each of positions of the entire frame (or a local region having, as the center, each of predetermined sampling points over the entire frame) at a plurality of scale levels or resolutions in correspondence with the number of a plurality of feature categories.

A feature integration layer 3503 (2, 0) has a predetermined receptive field structure (a receptive field means a connection range with output elements of the immediately preceding layer, and the receptive field structure means the distribution of connection weights), and integrates (arithmetic operations such as sub-sampling by means of local averaging, maximum output detection or the like, and so forth) a plurality of neuron element outputs in identical receptive fields from the feature detection layer 3502 (1, 0).

This integration process has a role of allowing positional deviations, deformations, and the like by spatially diffusing the outputs from the feature detection layer 3502 (1, 0). Also, the receptive fields of neurons in the feature integration layer have a common structure among neurons in a single layer.

Note that the receptive fields of neurons in the feature integration layer normally have a common structure among neurons in a single layer, but the receptive field structure is changed in association with its size in accordance with the output result (detection result) of neurons of the previous stage, as the gist of this embodiment.

Respective feature detection layers (1, 1), (1, 2), ..., (1, M) and respective feature integration layers (2, 1), (2, 2), ..., (2, M) are subsequent layers, the former layers ((1, 1), ...) detect a plurality of different features by respective feature detection modules, and the latter layers ((2, 1), ...) integrate detection results associated with a plurality of features from the previous feature detection layers.

Note that the former feature detection layers are connected (wired) to receive cell element outputs of the previous feature integration layers that belong to identical channels. Sub-sampling as a process executed by each feature integration layer performs averaging and the like of outputs from local regions (local receptive fields of corresponding feature integration layer neurons) from a feature detection cell mass of an identical feature category.

Figure 36:
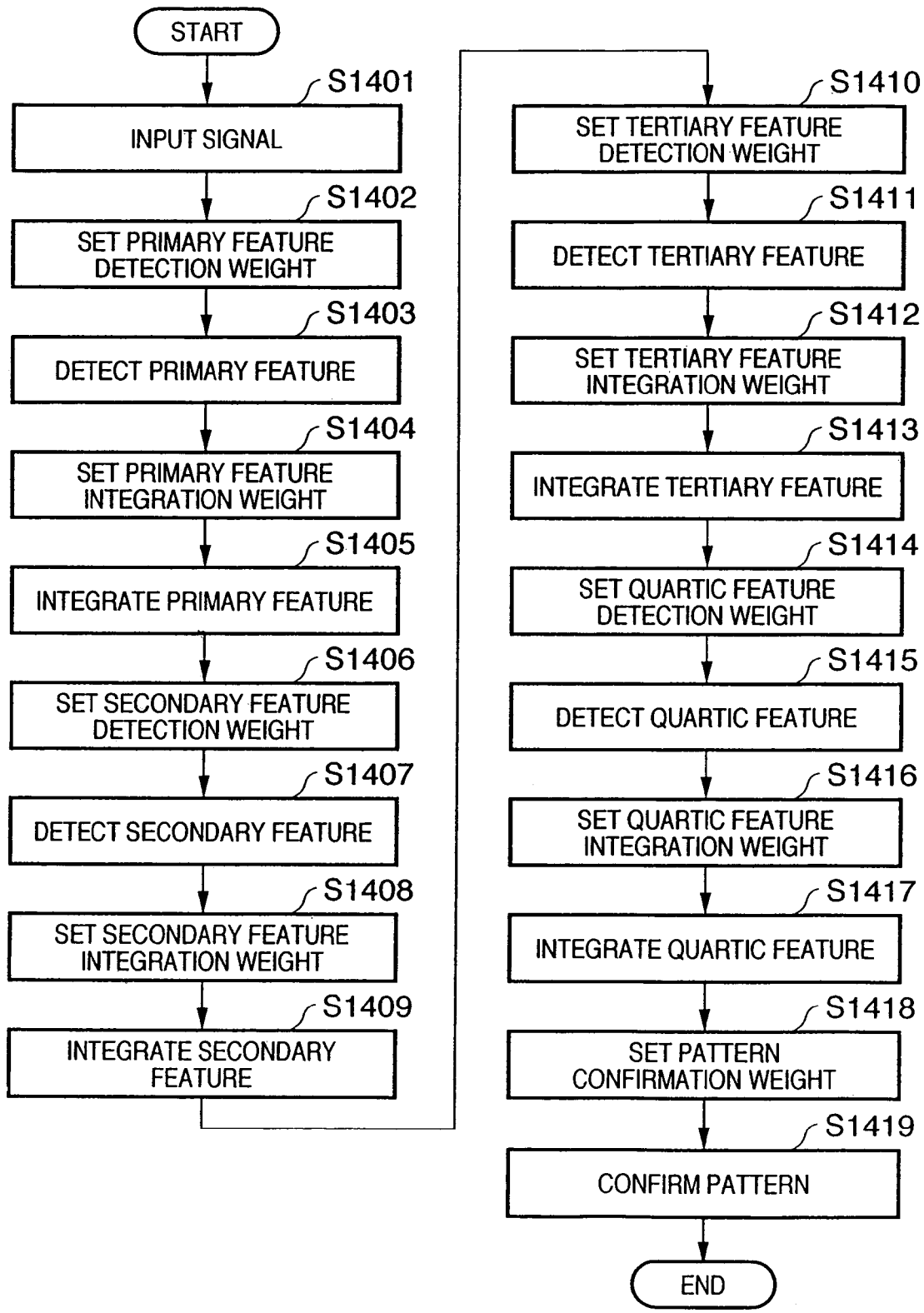
FIG. 36 is a flowchart for explaining the operation of the information processing apparatus.

FIG. 36 is a flowchart showing the operation upon recognizing a face pattern from a target image as in the seventh embodiment as a practical example of the operation of the information processing apparatus.

The input signal memory control section 1251 inputs a signal (image signal in this case) input by the control section 1270 to the input signal memory 1250 (step S1401). This step S1401 corresponds to the process by the data input layer 3501 shown in FIG. 35.

The weight setting section 1220 sets detection weight data (weight data required to make edge extractions in various directions and various sizes) of primary features shown in FIG. 14, which are held in the reference weight holding section 1230, in the arithmetic section 1210 (step S1402). Note that the weight setting section 1220 may generate primary feature detection weight data using the sizes and directions as parameters. As for the next secondary, tertiary, and quartic features, the same features as those described in the first embodiment may be used.

The arithmetic section 1210 detects primary features (step S1403). More specifically, primary feature detection in step S1403 corresponds to the process of the feature detection layer 3502 (1, 0) shown in FIG. 35, and the arithmetic section 1210 execute processes corresponding to detection modules 3504 of respective features f.

More specifically, the respective primary feature detection weight data set in step S1402 correspond to the structures of receptive fields 3505 used to detect respective features f. The arithmetic section 1210 acquires an image signal from the input image memory 1250, and executes product sum operations between local regions (regions corresponding to the receptive fields 3505) at respective positions of the image signal and the primary feature detection weight data.

An example of the input/output characteristics of a feature detection layer neuron executed by the arithmetic processing section 1210 is given by equation (6) below. That is, an output $u_{SL}(n,k)$ of a neuron at position n of a cell plane used to detect the k-th feature in the L-th stage is given by:

$$u_{SL}(n, k) = f\left( \sum_{k}^{K_{CL-1}} \sum_{v \in W_L} W_L(v, \kappa, k) \cdot u_{CL-1}(n+v, \kappa) \right) \quad (6)$$

where $u_{CL}(n,\kappa)$ is the output from a neuron at position n of the $\kappa$-th cell plane of the feature integration layer of the L-th stage. $K_{CL}$ is the number of types of feature integration layers of the L-th stage. $W_L(v,\kappa,k)$ is input coupling of a neuron at position n of the $\kappa$-th cell plane of the feature detection cell layer of the L-th stage from a neuron at position n+v of the $\kappa$-th cell plane of the feature integration layer of the (L-1)-th stage. Also, $W_L$ is the receptive field of the detection cell, and has a finite size.

Since the process in step S1403 is primary feature detection, L is "1". Therefore, since $u_{CL-1}$ corresponds to the data input layer, the number of types of features of the previous stage is 1. Since there are eight types of features to be detected, eight different results are obtained.

In equation (6), f( ) indicates a nonlinear process with respect to the result of the product sum operations. For example, this nonlinear process uses a logistics function given by:

$$f(x) = 1/(1+e^{-x}) \quad (7)$$

The nonlinear processing result is held by the intermediate result memory 1260. In this case, since eight different types of features are to be detected, the detection results of all these features are held by the intermediate result memory 1260.

The weight setting section 1220 sets primary feature integration weight data held by the reference weight holding section 1230 in the arithmetic section 1210 (step S1404). The primary feature integration weight data are weight data required to calculate the local averages of the primary features detected in step S1403, to detect the maximum values, and the like.

The arithmetic section 1210 executes a process for making product sum operations of the primary feature detection results held by the intermediate result memory 1260 and primary feature integration weight data set in step S1404 (an integration process of the detection results of primary features) (step S1405).

The process in step S1405 corresponds to that of the feature integration layer 3503 (2, 0) shown in FIG. 35, i.e., an integration module of respective features f. More specifically, this process corresponds to integration (arithmetic operations such as sub-sampling by means of local averaging, maximum output detection or the like, and so forth) of a plurality of neuron element outputs in identical receptive fields from the feature detection layer 3502 (1, 0).

More specifically, the arithmetic section 1210 executes averaging, maximum value detection, and the like in local regions for respective primary feature detection results. For example, the arithmetic section 1210 executes averaging in a local region given by:

$$u_{CL}(n, k) = \sum_{v \in D_L} d_L(v) \cdot u_{SL}(n + v, k) \quad (8)$$

where $d_L(v)$ is input coupling from a neuron of the feature detection layer of the L-th stage to a neuron present on a cell plane of the feature integration cell layer of the L-th stage, and is a monotone decreasing function with respect to $|v|$. Also, $D_L$ is the receptive field of an integration cell, and has a finite size.

The arithmetic section 1210 holds the result of the product sum operations given by equation (8) in the intermediate result memory 1260. At this time, the arithmetic section 1210 may further apply a nonlinear process to the result of product sum operations, and may hold the result in the intermediate result memory 1260.

With the processes up to step S1405, the intermediate result memory 1260 holds primary feature integration results of various sizes and various directions, which are obtained by integrating the primary feature detection results in local regions for respective features.

The weight setting section 1220 sets secondary feature detection weight data (step S1406). Note that the secondary feature detection weight data are weight data used to detect secondary features shown in FIG. 14 used in the seventh embodiment, as described above.

As has been explained in the seventh embodiment, the sizes of the secondary and subsequent features have correlation with those of features obtained so far. For this reason, the weight setting section 1220 sets feature detection weight data depending on the sizes of features detected in the previous layer upon detecting secondary and subsequent features.

More specifically, the weight setting section 1220 sets, as a parameter, the receptive field size indicated by the primary feature detection weight data, which are used to detect primary features and are set in advance by the parameter detection section 1240. The weight setting section 1220 corrects reference secondary feature detection weight data held by the reference weight holding section 1230 in association with the receptive field size using the parameter which is set by the parameter detection section 1240, and sets this correction result as secondary feature detection weight data.

Figure 37:
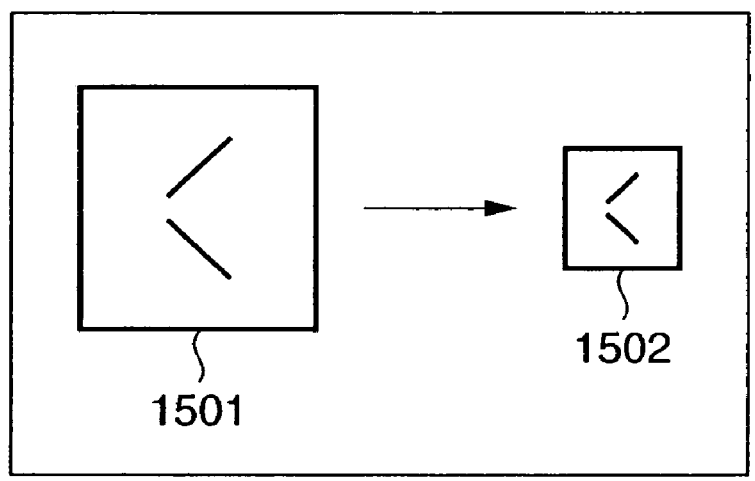
FIG. 37 is a view for explaining feature detection weight data using models in the information processing apparatus.

More specifically, for example, if the reference secondary feature detection weight data is set in correspondence with a larger size of primary features (larger receptive field size) shown in FIG. 14, the weight setting section 1220 reduces the receptive field size of secondary feature detection weight data, as shown in, e.g., FIG. 37 upon detection of secondary features with respect to primary feature detection results detected using weighting coefficients with the small receptive field size.

The arithmetic section 1210 detects secondary features. This process corresponds to the process of the feature detection layer 3502 (1, 1) shown in FIG. 35 (step S1407). The process itself in step S1407 is the same as the primary feature detection process in step S1403.

For example, the arithmetic section 1210 executes product sum operations using equation (1) and the nonlinear operation process to the operation results. The arithmetic section 1210 uses secondary feature detection weight data set in step S1406 and the primary feature integration result held by the intermediate result memory 1260 in product sum operations, applies nonlinear operations to the arithmetic operation results, and holds the arithmetic operation results (secondary feature detection results) in the intermediate result memory 1260.

The weight setting section 1220 sets secondary feature integration weight data held by the reference weight holding section 1230 in the arithmetic section 1210. Note that the secondary feature integration weight data are weight data required to execute processes such as local averaging of the secondary feature results detected in step S1407, detection of maximum values, and the like (step S1408).

The arithmetic section 1210 integrates the secondary feature detection results. This process corresponds to that of the feature integration layer 3503 (2, 1) shown in FIG. 35 (step S1409).

More specifically, the arithmetic section 1210 executes product sum operations of the secondary feature detection results held in the intermediate result memory 1260 and the secondary feature integration weight data set in step S1408 in accordance with, e.g., equation (8), and holds the product sum operation results in the intermediate result memory 1260. At this time, the arithmetic section 1210 may further apply a nonlinear process to the product sum operation results, and may hold the processing results in the intermediate result memory 1260.

The weight setting section 1220 sets tertiary feature detection weight data in the arithmetic section 1210 (step S1410). Note that the tertiary feature detection weight data are weight data used to detect tertiary features shown in FIG. 14, as described above.

More specifically, the weight setting section 1220 sets, as a parameter, a value based on the size of each secondary feature, on the basis of the primary feature detection results and secondary feature detection results held in the intermediate result memory 1260 using the parameter detection section 1240. As this parameter, in case of the right-open V-shaped feature, the vertical distance between the upward-sloping and downward-sloping features can be used, as has been explained in the first embodiment.

The weight setting section 1220 modifies reference tertiary feature detection weight data held in the reference weight holding section 1230 in association with their receptive field size using the parameter obtained by the parameter detection section 1240, and sets the result as tertiary feature detection weight data.

The arithmetic section 1210 detects tertiary features. This process corresponds to that of the feature detection layer 3502 (1, 2) shown in FIG. 35 (step S1411). More specifically, the arithmetic section 1210 executes product sum operations of the tertiary feature detection weight data set in step S1410, and the secondary feature integration results held in the intermediate result memory 1260, and nonlinear operations to these operation results, and holds the operation results (tertiary feature detection results) in the intermediate result memory 1260.

The weight setting section 1220 sets tertiary feature integration weight data held in the reference weight holding section 1230 in the arithmetic section 1210 (step S1412). Note that tertiary feature integration weight data integration weight data are weight data required to execute processes such as local averaging of the tertiary feature results detected in step S1411, detection of maximum values, and the like.

The arithmetic section 1210 integrates the tertiary feature detection results. This process corresponds to that of the feature integration layer 3503 (2, 2) shown in FIG. 35 (step S1413). More specifically, the arithmetic section 1210 executes product sum operations of the tertiary feature detection results held in the intermediate result memory 1260, and tertiary feature integration weight data set in step S1412, and holds the product sum operation results in the intermediate result memory 1260. At this time, the arithmetic section 1210 may further apply a nonlinear process to the product sum operation result, and may hold the processing result in the intermediate result memory 1260.

The weight setting section 1220 sets quartic feature detection weight data in the arithmetic section 1210 (step S1414). Note that the quartic feature detection weight data are weight data used to detect a quartic feature shown in FIG. 14, as described above.

More specifically, the weight setting section 1220 sets, as a parameter, a value based on the size of each tertiary feature using the parameter detection section 1240, on the basis of the secondary and tertiary feature detection results held in the intermediate result memory 1260. As this parameter, in case of an eye feature, the horizontal distance between the right-open V-shaped feature and left-open V-shaped feature, may be used, as has been explained in the first embodiment.

The weight setting section 1220 modifies reference quartic feature detection weight data held by the reference weight holding section 1230 in association with their receptive field size using the parameter obtained by the parameter detection section 1240, and sets the result as the quartic feature detection weight data.

The arithmetic section 1210 detects quartic features. This process corresponds to that of the feature detection layer 3502 (1, 3) shown in FIG. 35 (step S1415). More specifically, the arithmetic section 1210 executes product sum operations of the quartic feature detection weight data set in step S1414, and the tertiary feature integration results held in the integration result memory 1260, and nonlinear operations of the results, and holds the operation result (quartic feature detection result) in the intermediate result memory 1260.

The weight setting section 1220 sets quartic feature integration weight data held in the reference weight holding section 1230 in the arithmetic section 1210 (step S1416). Note that quartic feature integration weight data are weight data required to execute processes such as local averaging of the quartic feature results detected in step S1415, detection of maximum values, and the like.

The arithmetic section 1210 integrates quartic feature detection results. This process corresponds to that of the feature integration layer 3503 (2, 3) shown in FIG. 35 (step S1417). More specifically, the arithmetic section 1210 executes product sum operations of the quartic feature detection results held in the intermediate result memory 1260, and quartic feature integration weight data set in step S1416, and holds the product sum operation results in the intermediate result memory 1260. At this time, the arithmetic section 1210 may further apply a nonlinear process to the result of product sum operations, and may hold the result in the intermediate result memory 1260.

The arithmetic section 1210 sets pattern confirmation weight data (step S1418). More specifically, the quartic feature is detected by the processes up to step S1417 described above. As has been explained in the first embodiment, when the background of the target image (input image) includes regions similar to a plurality of tertiary features which form the quartic feature and have a similar positional relationship, they may be erroneously detected upon detecting a quartic feature. More specifically, in case of face detection, the background of the input image includes regions which are similar to the two eyes and mouth, and have a similar positional relationship, they may be erroneously detected upon detection of a face feature.

For this reason, in this embodiment, reference pattern confirmation weight data used to detect a typical type (size, direction, and the like) of a pattern to be detected is prepared, and is corrected to set corrected pattern confirmation weight data. Using this pattern confirmation weight data, whether or not the input image includes a pattern to be finally detected is determined.

For example, since a face is a pattern to be detected, reference face pattern confirmation weight data used to detect a typical face is prepared, and is corrected to set corrected face pattern confirmation weight data. Using this face pattern confirmation weight data, whether or not the input image includes a face pattern is determined.

In step S1418, the arithmetic section 1210 sets, as a parameter, values based on the tertiary feature detection results at respective positions of the detected quartic features using the parameter detection section 1240 on the basis of the tertiary and quartic feature detection results held in the intermediate result memory 1260. As this parameter, in case of a face feature, the positions of the eye and mouth features can be used, as has been explained in the first embodiment.

The arithmetic section 1210 corrects reference pattern confirmation weight data held in the reference weight holding section 1230 using the parameter obtained by the parameter detection section 1240 in association with its receptive field size and rotation, and sets the corrected result as the pattern confirmation weight data.

The arithmetic section 1210 confirms the detection pattern (step S1419).

More specifically, the arithmetic section 1210 executes the product sum operations of the confirmation pattern weight data set in step S1418, and the input signal held in the input signal memory 1250, and nonlinear operations to this result, and holds the operation result in the intermediate result memory 1260. The result held in the intermediate result memory 1260 is a final detection result of a pattern to be detected.

As described above, according to this embodiment, reference weight data used to detect respective features are prepared, and detection weight data are set based on the reference weight data using the parameter obtained from the detection result of the previous stage, thus improving the detection precision of respective features, and that of a pattern to be finally detected.

The arithmetic section 1210 makes the product sum operations of detection weight data or integration weight data and the data from the intermediate result memory 1260 or input signal memory 1250 and nonlinear transformation of that result, and sets weight data used in product sum operations every time. Hence, the identical arithmetic section 1210 can be repetitively used. Furthermore, since both the input signal and intermediate results are held, a final confirmation process can be easily made.

In this embodiment, as an example, integration weight data used in an integration process is not set according to detection result. For example, the receptive field size of the integration weight data may be set in the same manner as detection weight data. Also, the quartic feature integration process in steps S1416 and S1417 shown in FIG. 36 may be omitted.

Ninth Embodiment

Figure 38:
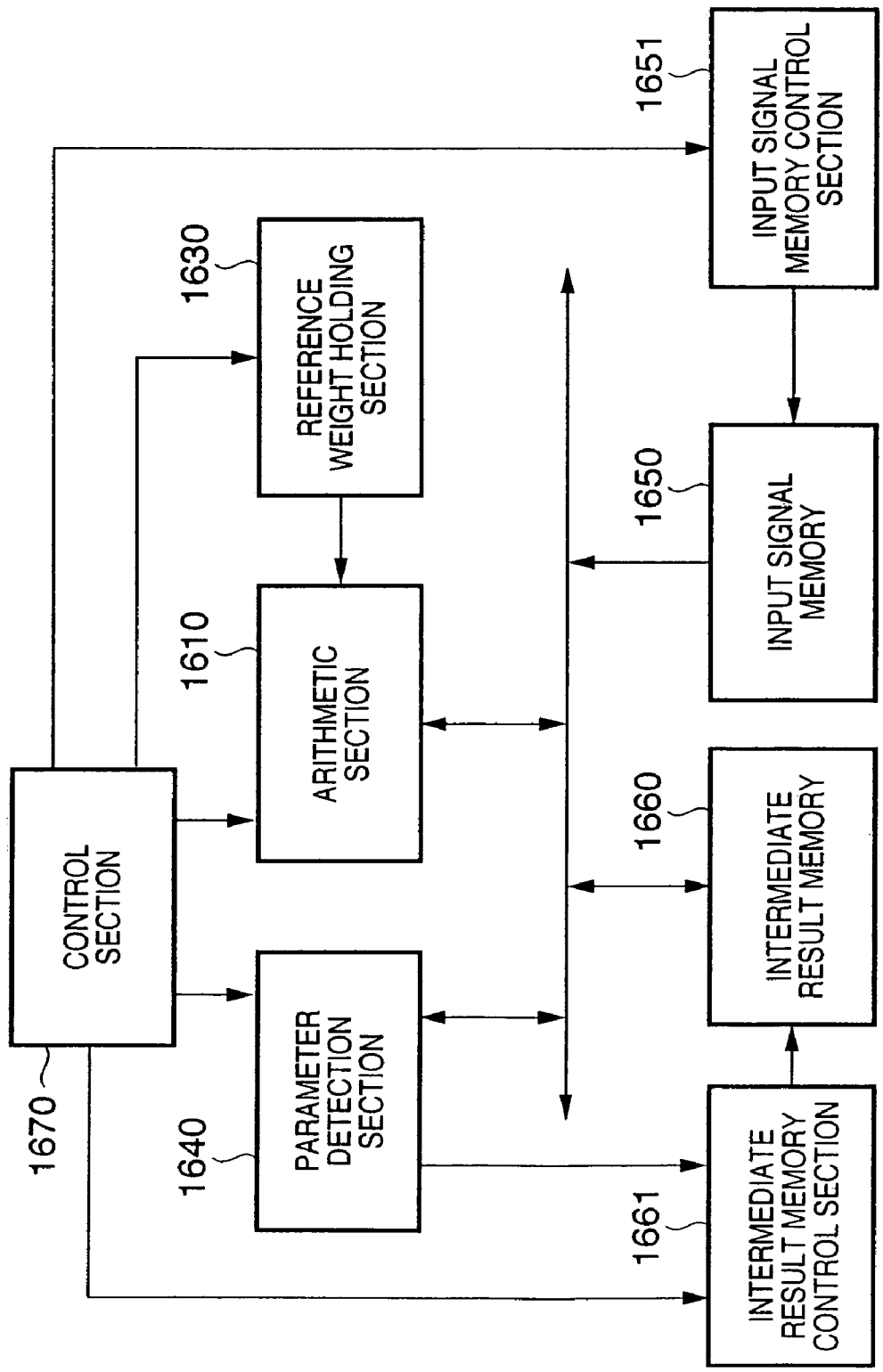
FIG. 38 is a block diagram showing the arrangement of an information processing apparatus in the ninth embodiment.

FIG. 38 shows an information processing apparatus of this embodiment. This apparatus has a function of a pattern recognition device shown in FIG. 27.

More specifically, this information processing apparatus includes a control section 1670, arithmetic section 1610, reference weight holding section 1630, parameter detection section 1640, input signal memory 160, input signal memory control section 1651, intermediate result memory 1660, and intermediate result memory control section 1661, as shown in FIG. 38.

Note that the information processing apparatus of this embodiment has basically the same functions as those of the information processing apparatus (see FIG. 34) in the eighth embodiment, except that this apparatus does not have any function corresponding to the weight setting section 1220, and the parameters calculated by the parameter detection section 1640 are supplied to the intermediate result memory control section 1661 and arithmetic section 1610.

That is, in the eighth embodiment, the parameters are calculated from the processing results of the previous stage, and weight data used to detect features are set based on the parameters. However, in this embodiment, reference weight data held by the reference weight holding means 1630 are directly used as eight data, and the detection result of the previous stage which corresponds to the receptive field and is held in the intermediate result memory 1660 undergoes size change using interpolation or the like instead.

Figure 39:
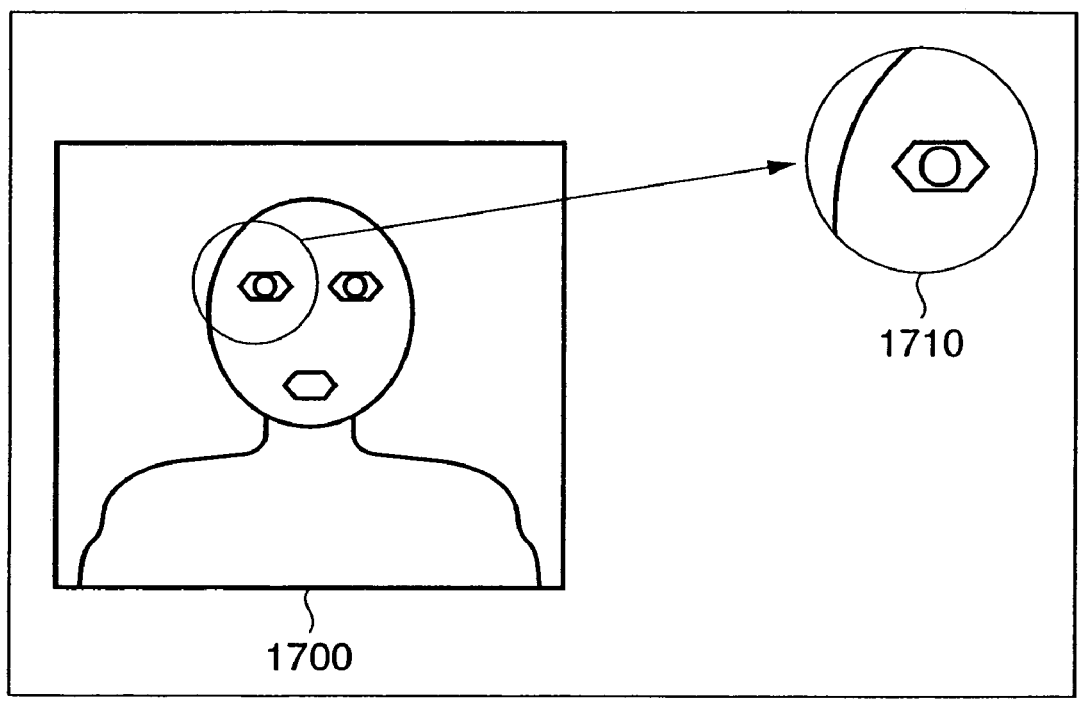
FIG. 39 is a view for explaining a size change function using models.

For this reason, for example, when an eye feature as a tertiary feature is to be detected, the information processing apparatus changes size of a normal receptive field of an input image 1700, as shown in FIG. 39, to generate a size changed local image 1710, and executes product sum operations of this changed local image 1710 and reference weigh data held in the reference weight holding section 1630.

Upon obtaining a tertiary feature, the secondary feature detection results held in the intermediate result memory 1660 are used. However, in FIG. 39, the size of the local image of the input image 1700 is changed for the sake of simplicity. In practice, the local region of each secondary feature detection result image is used after its size is changed.

As described above, according to this embodiment, the size of the detection result of the previous stage used to detect features is changed and re-set using the parameters obtained from the detection result of the previous stage, thus improving the detection precision of respective features, and that of the pattern to be finally detected. The detection result size can be easily change since it can be implemented by changing a region to be read out from the memory and an interpolation process.

Other Embodiments by Means of Software and the Like

Note that the present invention may be applied to either a system constituted by a plurality of devices (e.g., a host computer, interface device, reader, printer, and the like), or an apparatus consisting of a single equipment (e.g., a copying machine, facsimile apparatus, or the like)

Also, the present invention is not limited to the apparatus and method for implementing the aforementioned embodiments, and a method that combines the methods described in the embodiments, but the scope of the present invention includes a case wherein the above embodiments are achieved by supplying a program code of software that can implement the functions of the above-mentioned embodiments to a computer (or a CPU or MPU) in a system or apparatus, and making the computer control various devices in the system or apparatus.

In this case, the program code itself read out from the storage medium implements the functions of the above-mentioned embodiments, and the program code itself, and means for supplying the program code to the computer (i.e., a storage medium which stores the program code) are included in the scope of the present invention.

As the storage medium for storing such program code, for example, a Floppy® disk, hard disk, optical disk, magneto-optical disk, CD-ROM, magnetic tape, nonvolatile memory card, ROM, and the like may be used.

The program is included in the scope of the embodiments not only when the functions of the above embodiments are implemented by controlling various devices according to the supplied program code alone but also when the functions of the embodiments are implemented by collaboration of the program and an OS (operating system) or another application software running on the computer.

Furthermore, the scope of the present invention includes a case wherein the functions of the above-mentioned embodiments are implemented by some or all of actual processing operations executed by a CPU or the like arranged in a function extension board or a function extension unit, which is inserted in or connected to the computer, after the supplied program code is written in a memory of the extension board or unit.

As described above, according to the above embodiment, pattern recognition with low processing cost that allows identification robust against input pattern variations and can reduce the probability of occurrence of identification errors can be realized.

Note that the above embodiments are merely practical examples upon practicing the present invention, and do not limit the technical scope of the present invention. That is, the present invention can be practiced in various forms without departing from its technical scope or principal features.

The present invention is not limited to the aforementioned embodiments, and various changes and modifications of the invention are available. Therefore, the technical scope of the present invention is determined based on the scope of the appended claims.

The invention claimed is:

1. A pattern identification method for hierarchically extracting features of input data, and identifying a pattern of the input data, comprising:

performing by a pattern identification device the following:

a first feature extraction step of extracting features of a first layer;

a determination step of determining a model to be used for extracting features of a second layer higher than the first layer on the basis of feature extraction results in the first feature extraction step; and a second feature extraction step of extracting features of the second layer by using the model determined in the determination step.

2. The method according to claim 1, wherein determination step includes a step of analyzing a distribution of feature extraction results in the first feature extraction step, and determining the model based on the analyzed distribution.

3. The method according to claim 2, wherein the determination step includes a step of calculating likelihood values of a plurality of features of the second layer on the basis of the distribution, and determining features which have the calculated likelihood values not less than a predetermined value as objects to be extracted.

4. The method according to claim 2, wherein the determination step includes a step of analyzing distributions of the plurality of feature extraction results, and analyzing a relative relationship among the individual analysis results.

5. The method according to claim 2, wherein the determination step includes a step of analyzing a distribution of at least one feature extraction result within a specific range.

6. The method according to claim 2, wherein the determination step includes a step of analyzing if the feature is extracted or not extracted within a predetermined range in a distribution of at least one feature extraction result.

7. The method according to claim 2, wherein the determination step includes a step of analyzing a barycentric position of a distribution of at least one feature extraction result.

8. The method according to claim 2, wherein the determination step includes a step of analyzing a size of a range from which the feature is extracted or not extracted in a distribution of at least one feature extraction result.

9. The method according to claim 2, wherein the determination step includes a step of analyzing a sum total of likelihood values or feature detection levels of at least one feature extraction result.

10. The method according to claim 1, wherein the first or second feature extraction step includes a step of extracting features obtained by applying predetermined conversions to a predetermined feature.

11. The method according to claim 1, further comprising are extraction step of re-extracting features of a lower layer on the basis of the feature extraction results of an upper layer in the second feature extraction step.

12. The method according to claim 1, wherein the first feature extraction step includes a step of extracting features by setting models, and a model used in the second feature extraction step is formed by combining predetermined models used in the first feature extraction step, the first detection step includes a step of calculating feature amounts of the models with respect to forming parts of the pattern by comparing the models used in the first detection step and the forming parts of the pattern, and the determination step includes a step of determining a specific model to be a model to be set on the basis of feature amounts of models which form the specific model.

13. The method according to claim 12, wherein the determination step determines a specific model, when all the models which form the specific model have a predetermined feature amount.

14. The method according to claim 12, wherein a predetermined reference model is held, and the determination step includes a step of determining a model obtained by convening the reference model using the calculated feature amount as a model to be determined.

15. The method according to claim 1, wherein the determination step determines a plurality of models which are formed by rotating an identical model at a plurality of angles.

16. The method according to claim 15, wherein the determination step includes a step of selecting rotation angles of low order models having feature amounts not less than a predetermined amount of the calculated feature amounts of the low order models, and determining high order models corresponding to the selected rotation angles as the models to be determined.

17. The method according to claim 15, wherein the determination step includes a step of selecting rotation angles of low order models, which have higher order in the order of feature amounts, of the calculated feature amounts of low order models and determining high order models corresponding to the selected rotation angles as the models to be determined.

18. The method according to claim 15, further comprising a change step of changing a rotation interval of a plurality of angles upon setting a plurality of models rotated at the plurality of angles, wherein the change step includes a step of decreasing the rotation interval of models in a higher order layer.

19. The method according to claim 1, wherein the determination step includes a step of limiting the number of models to be determined on the basis of feature amounts calculated for the models.

20. The method according to claim 19, wherein the rotation angles of low order models are measured on the basis of the calculated feature amounts of the low order models, and the number of high order models is limited using the measured rotation angles.

21. The method according to claim 1, wherein a predetermined reference model is held, and the determination step includes a step of determining the model used in the second feature extraction step on the basis of the reference model and feature extraction results in the first feature extraction step.

22. The method according to claim 21, wherein the determination step includes a step of determining a model to be used at each spatial position of an input signal.

23. The method according to claim 21, wherein the reference model is data used to detect a plurality of features which form a typical pattern of the predetermined pattern, the determination step includes a step of convening the held reference data on the basis of a positional relationship between the plurality of features extracted in the first feature extraction step, and the second feature extraction step includes a step of determining a presence/absence of the predetermined pattern included in the input signal on the basis of correlation between the converted reference model and the input signal.

24. The method according to claim 1, wherein the determination step includes a step of determining a size of an input range from a detection result of a previous layer used in feature detection in the first feature extraction step on the basis of the feature extraction results in the first feature extraction step.

25. The method according to claim 24, wherein the determination step includes a step of determining a size of the input range for each spatial position of an input signal.

26. The method according to claim 1, further comprising:
a result holding step of holding the feature extraction results in the first feature extraction step;
a parameter acquisition step of obtaining a parameter on the basis of the detection results held in the result holding step; and
a change step of changing the feature detection results to be read out in the second feature extraction step on the basis of the parameter obtained in the parameter acquisition step.

27. The method according to claim 1, wherein the input data is an image, and each of the first and second feature extraction steps includes a step of extracting features which form a face.

28. A pattern identification device for hierarchically extracting features of input data, and identifying a pattern of the input data, comprising:

a first feature extraction unit adapted to extract features of a first layer;
a determination unit adapted to determine a model to be used for extracting features of a second layer higher than the first layer, on the basis of feature extraction results in the first feature extraction unit; and
a second feature extraction unit adapted to extract features of the second layer by using the model determined by said determination unit.

29. The device according to claim 28, further comprising image sensing unit adapted to sense and input an image as the input data.

30. A computer-readable storage medium storing a pattern identification program, which makes a computer hierarchically extract features of input data, and identify a pattern of the input data, said program making the computer execute:
a first feature extraction sequence for extracting features of a first layer;
a determination sequence for determining a model to be used for extracting features of a second layer higher than the first layer, on the basis of feature extraction results in the first feature extraction sequence; and
a second feature extraction sequence for extracting features of the second layer by using the model determined in the determination sequence.

* * * * *